(12) United States Patent
Ramanujan et al.

(10) Patent No.: US 10,587,509 B2
(45) Date of Patent: Mar. 10, 2020

(54) LOW-OVERHEAD ROUTING

(71) Applicant: Architecture Technology Corporation, Eden Prairie, MN (US)

(72) Inventors: Ranga S. Ramanujan, Medina, MN (US); Benjamin L. Burnett, Prior Lake, MN (US); Barry A. Trent, Chanhassen, MN (US); Jafar Al-Gharaibeh, Bloomington, MN (US)

(*) Notice: Subject to any disclaimer, the term of this patent is extended or adjusted under 35 U.S.C. 154(b) by 0 days.

(21) Appl. No.: 15/425,364

(22) Filed: Feb. 6, 2017

(65) Prior Publication Data

US 2017/0155580 A1    Jun. 1, 2017

Related U.S. Application Data

(63) Continuation-in-part of application No. 14/613,894, filed on Feb. 4, 2015, now abandoned.

(60) Provisional application No. 61/935,661, filed on Feb. 4, 2014.

(51) Int. Cl.
| | |
|---|---|
| *H04L 12/741* | (2013.01) |
| *H04L 12/751* | (2013.01) |
| *H04L 12/729* | (2013.01) |
| *H04W 40/00* | (2009.01) |
| *H04L 12/707* | (2013.01) |

(52) U.S. Cl.
CPC ............. *H04L 45/74* (2013.01); *H04L 45/02* (2013.01); *H04L 45/125* (2013.01); *H04L 45/24* (2013.01); *H04W 40/00* (2013.01)

(58) Field of Classification Search
CPC ....... H04L 45/74; H04L 45/02; H04L 45/125; H04L 45/24; H04W 40/00

USPC ......................................................... 370/392
See application file for complete search history.

(56) References Cited

U.S. PATENT DOCUMENTS

| | | | |
|---|---|---|---|
| 5,115,433 A | 5/1992 | Baran et al. | |
| 6,658,481 B1* | 12/2003 | Basso | H04L 45/00 370/351 |
| 6,985,476 B1* | 1/2006 | Elliott | H04L 45/00 370/349 |
| 7,317,733 B1 | 1/2008 | Olsson et al. | |
| 9,225,637 B2 | 12/2015 | Ramanujan et al. | |

(Continued)

OTHER PUBLICATIONS

"Airborne Network Laydown", Final Report, ATC-NY, pp. 1-116, Jun. 30, 2009.

(Continued)

*Primary Examiner* — Faisal Choudhury
(74) *Attorney, Agent, or Firm* — Carlson, Caspers, Vandenburgh & Lindquist, P.A.

(57) ABSTRACT

A method of routing an Internet Protocol (IP) packet from a routing device is provided. The method includes receiving a first IP packet having a first IP header and a first IP data field, the first IP packet having a final destination corresponding to a destination device communicatively coupled to the routing device via a network route including at least two hops between the routing device and the final destination. A second IP packet having a second IP header and a second IP data field is generated. The second IP data field is a copy of the first IP data field, and a destination IP address field in the second IP header includes an IP address of a next hop on the network route. The second IP packet does not include an IP address of the final destination in the second IP header.

20 Claims, 67 Drawing Sheets

(56) References Cited

U.S. PATENT DOCUMENTS

| | | | |
|---|---|---|---|
| 2001/0027484 A1 | 10/2001 | Nishi | |
| 2003/0046390 A1 | 3/2003 | Ball et al. | |
| 2003/0112808 A1 | 6/2003 | Solomon | |
| 2003/0125028 A1 | 7/2003 | Reynolds | |
| 2004/0032873 A1* | 2/2004 | Basso | H04L 12/56 370/401 |
| 2006/0187858 A1 | 8/2006 | Kenichi et al. | |
| 2008/0049641 A1 | 2/2008 | Edwards et al. | |
| 2010/0061231 A1 | 3/2010 | Harmatos et al. | |
| 2010/0142395 A1* | 6/2010 | Yasuie | H04L 43/0888 370/252 |
| 2010/0235514 A1 | 9/2010 | Beachem | |
| 2010/0268935 A1* | 10/2010 | Rodgers | H04L 63/164 713/153 |
| 2010/0329270 A1 | 12/2010 | Asati et al. | |
| 2011/0075552 A1 | 3/2011 | Mitsumori | |
| 2011/0125921 A1 | 5/2011 | Karenos et al. | |
| 2011/0211463 A1 | 9/2011 | Matityahu et al. | |
| 2012/0063316 A1* | 3/2012 | Ghanwani | H04L 47/10 370/235 |
| 2012/0082073 A1* | 4/2012 | Andreasen | H04L 12/4633 370/310 |
| 2012/0106566 A1 | 5/2012 | Zarrabi et al. | |
| 2012/0327811 A1* | 12/2012 | Nozaki | H04L 12/462 370/255 |
| 2013/0215810 A1* | 8/2013 | Wang | H04L 69/22 370/311 |
| 2014/0105033 A1 | 4/2014 | Vasseur et al. | |
| 2014/0348024 A1 | 11/2014 | Mishra et al. | |
| 2014/0363152 A1 | 12/2014 | Hironaka et al. | |
| 2014/0369489 A1 | 12/2014 | Ermann et al. | |
| 2015/0010002 A1* | 1/2015 | Duda | H04L 45/74 370/392 |
| 2015/0124586 A1* | 5/2015 | Pani | H04L 12/18 370/219 |
| 2015/0215210 A1 | 7/2015 | Shen et al. | |
| 2015/0257081 A1 | 9/2015 | Ramanujan et al. | |
| 2015/0318911 A1 | 11/2015 | Samios | |
| 2016/0255667 A1* | 9/2016 | Schwartz | H04W 76/12 455/445 |

OTHER PUBLICATIONS

"OSPF Design Guide", Cisco, pp. 1-55, 2005.
"Tactical Targeting Network Technology, Dynamic, Robust Waveform enabling NetCentric Communications for Today's Warfighter", Rockwell Collins, pp. 1-8, 2009, USA.
"Talk II—SINCGARS, Multiservice Communications Procedures for the Single-Channel Ground and Airborne Radio System", Marine Corps, pp. 1-77, May 1996.
"Wideband Gapfiller System", GlobalSecurity.org, http://www.globalsecurity.org/space/systems/wgs.htm, pp. 1-5, Oct. 4, 2016.
Spagnolo, Phillip A., et al., "Boeing Quagga Software", The Boeing Company, pp. 1-32, 2006.
U.S. Patent and Trademark Office, "Office Action", U.S. Appl. No. 14/613,894, dated May 9, 2017, pp. 1-4.
"Internet Protocol, DARPA Internet Program Protocol Specification", Sep. 1981, pp. 1-50, USA.
"Transmission Control Protocol, DARPA Internet Program Protocol Specification", Sep. 1981, pp. 1-90, USA.
Berry, et al., "PPP over Ethernet (PPPoE) Extensions for Credit Flow and Link Metrics", Internet Engineering Task Force, Feb. 2010, pp. 1-21, USA.
Burbank, Jack L. et al. "Key Challenges of Military Tactical Networking and the Elusive Promise of MANET Technology," IEEE Communications Magazine, Nov. 2006, pp. 39-45.
Chau, Chi-Kin et al. "IDRM: Inter-Domain Routing Protocol for Mobile Ad Hoc Networks," Technical Report No. 708, 2008. UCAM-CL-TR-708, ISSN 1476-2986 University of Cambridge, Jan. 2008, pp. 1-24.
Lee, Seung-Hoon, "Inter MR: Inter-MANET Routing in Heterogeneous MANETs," Proceedings of MASS' 2010, Nov. 2010, 10 pages.
Macker, Joseph P. et al. "Heterogeneous Architecture Support for Wireless Network Dynamics and Mobility," Naval Research Laboratory NRL/MR/5520-00-8513. Dec. 29, 2000, 32 pages.
Pei, Dan et al. "BGP-RCN: Improving BGP Convergence Through Root Cause Notification," Computer Networks. Sep. 28, 2004, 20 pages.
Perkins, C., "Minimal Encapsulation within IP", Internet Engineering Task Force, Oct. 1996, pp. 1-6, USA.
Pizzi, Steven V. "A Routing Architecture for the Airborne Network" MILCOM Paper Tracking No. 248, Version 5.40. 2007 The MITRE Corporation. May 21, 2007, pp. 1-7.
Rekhter, Y. et al. "A Border Gateway Protocol 4 (BGP-4)" IETF RFC 1771, Mar. 1995, [online] [retrieved on Jul. 16, 2014], retrieved from the internet 50 pages.
Rekhter, Y. et al. "Application of the Border Gateway Protocol in the Internet" IETF RFC 1772. Mar. 1995, 19 pages.
U.S. Patent and Trademark Office, "Office Action", U.S. Appl. No. 14/613,894, dated Aug. 30, 2016, pp. 1-14.
U.S. Patent and Trademark Office, "Examiner Interview Summary", U.S. Appl. No. 15/253,173, dated Mar. 6, 2019, pp. 1, 2.
U.S. Patent and Trademark Office, "Final Office Action", U.S. Appl. No. 15/253,173, dated Sep. 19, 2018, pp. 1-17.
U.S. Patent and Trademark Office, "Notice of Allowance", U.S. Appl. No. 15/253,173, dated Mar. 6, 2019, pp. 1-8.
U.S. Patent and Trademark Office, "Notice of Allowance", U.S. Appl. No. 15/593,883, dated Sep. 12, 2019, pp. 1-7.
U.S. Patent and Trademark Office, "Final Office Action", U.S. Appl. No. 15/593,883, dated May 6, 2019, pp. 1-13.

* cited by examiner

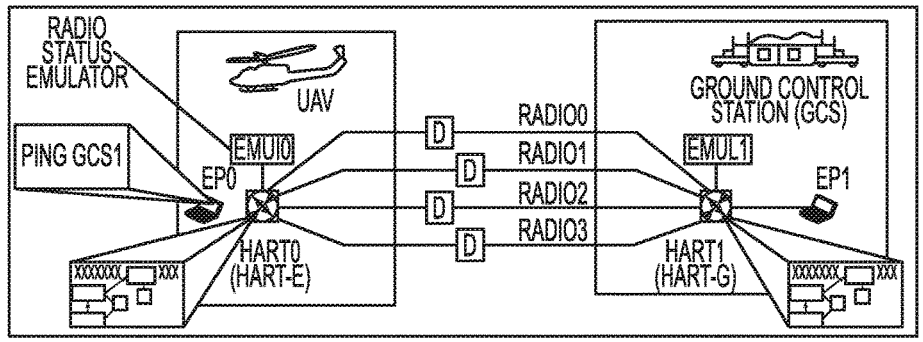
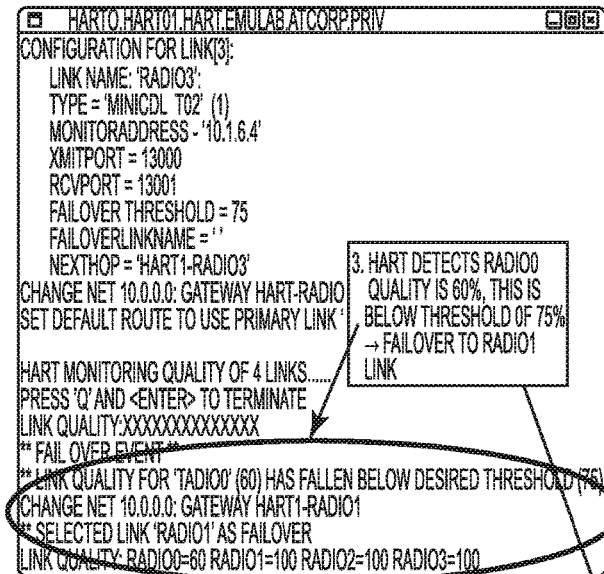 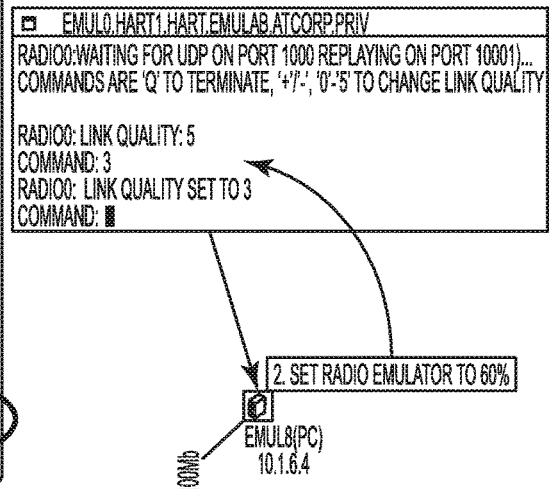
Figure 23
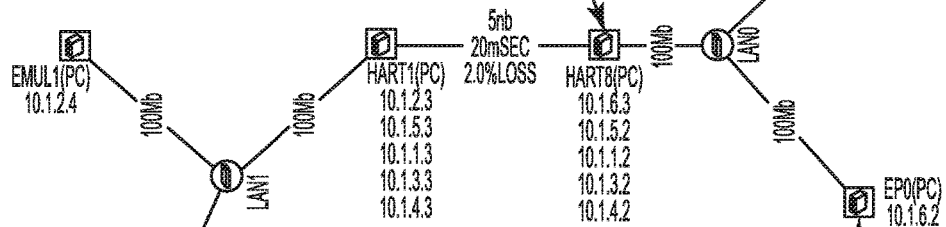
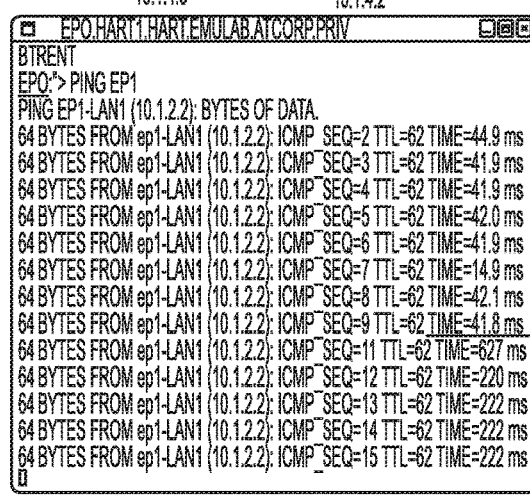 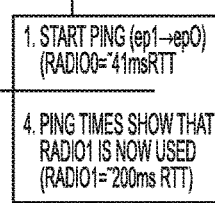
Figure 24

A. MULTIPLE LINKS WITHOUT LOAD BALANCING

B. MULTIPLE LINKS WITH LOAD BALANCING

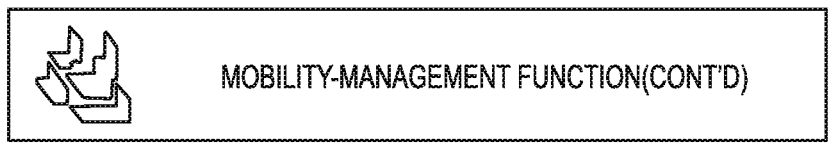
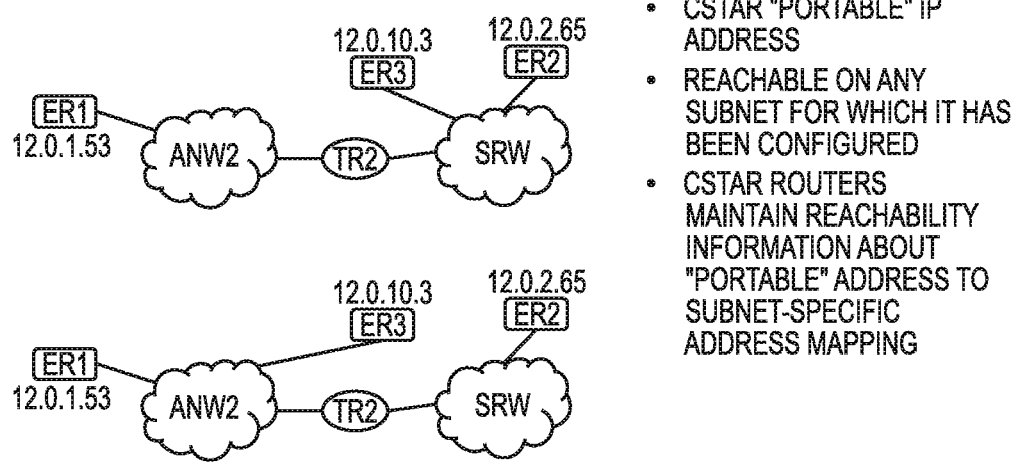
- CSTAR "PORTABLE" IP ADDRESS
- REACHABLE ON ANY SUBNET FOR WHICH IT HAS BEEN CONFIGURED
- CSTAR ROUTERS MAINTAIN REACHABILITY INFORMATION ABOUT "PORTABLE" ADDRESS TO SUBNET-SPECIFIC ADDRESS MAPPING
Figure 42

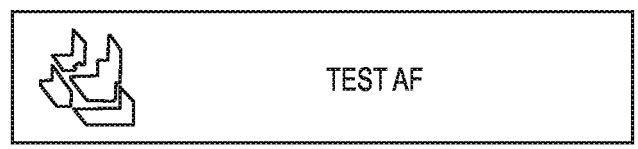
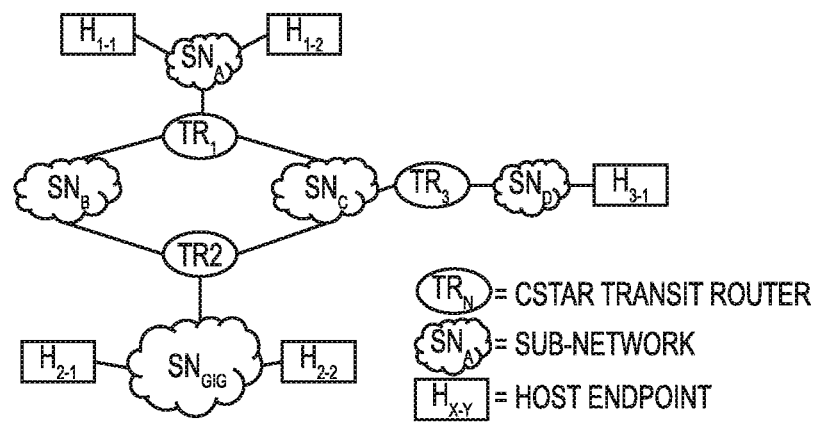
Figure 46

INITIAL STATE / SETUP (BEFORE JOIN)

HART-E: EDGE ROUTER
HART-I: INTERIM ROUTER
HART-G: GATEWAY ROUTER
◯ = PLATFORM / VEHICLE

- HG1 DETECTS GIG AND DECLARES "I'M A GATEWAY ROUTER"
  - BROADCASTS ITSELF AS "DEFAULT ROUTE" TO GIG
- HG2 DETECTS GIG AND DECLARES "I'M A GATEWAY ROUTER"
  - BROADCASTS ITSELF AS "DEFAULT ROUTE" TO GIG
- HI1 DETECTS NO GIG AND DECLARES "I'M AN INTERIM ROUTER" (DEFAULT)
  - RECEIVES "DEFAULT ROUTE" FROM JALN(HG1 AND HG2, FOR SPECIFIED SUBNETS)
- HI2 DETECTS NO GIG AND DECLARES "I'M AN INTERIM ROUTER" (DEFAULT)
  - RECEIVES "DEFAULT ROUTE" FROM JALN(HG1 AND HG2, FOR SPECIFIED SUBNETS)
  - BECOMES "DEFAULT ROUTE" FOR TTNT RADIO SUBNET TO LINK THEM TO GIG(THRU JALN)

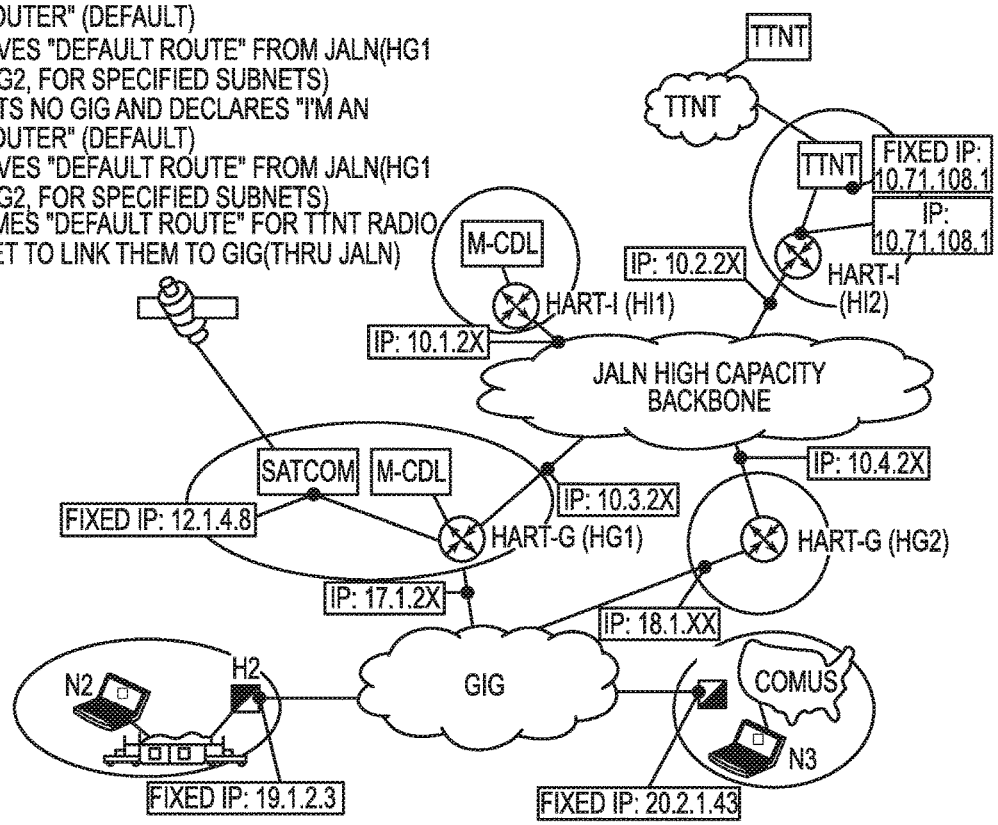

Figure 48

LOW-OVERHEAD ROUTING

RELATED APPLICATIONS

This application is a continuation-in-part of U.S. patent application Ser. No. 14/613,894, filed on Feb. 4, 2015, entitled "HYBRID AUTONOMOUS NETWORK AND ROUTER FOR COMMUNICATION BETWEEN HETEROGENEOUS SUBNETS", which claims priority to U.S. Provisional Application No. 61/935,661, filed on Feb. 4, 2014, entitled "HYBRID AUTONOMOUS ROUTER FOR TACTICAL COMMUNICATION", both of which are hereby incorporated herein by reference.

GOVERNMENT CONTRACTS

This invention was made with government support under contract FA8750-12-C-0213 awarded by the Air Force Research Laboratory (AFRL) Small Business Innovation Research (SBIR). The government has certain rights in the invention.

TECHNICAL FIELD

The present invention relates to networking systems and components in general and, more particularly to networking systems and components having an ability to connect heterogeneous wireless networks.

BACKGROUND

Various networking systems, protocols and networking equipment and software exist to connect various discrete components together into a communication network.

However, existing networking approaches are incapable of integrating heterogeneous wireless networks. Such existing networks have:

inability to adapt dynamically to topology changes in the network;

need for excessive manual configuration;

lack of scalability with network size;

inability of routing protocols to factor wireless link quality into routing decisions, resulting in sub-optimal network performance.

SUMMARY

A hybrid router, an autonomous IP based network integration solution that provides end-to-end sensor-to-shooter connectivity across a heterogeneous tactical network is disclosed. This network consists of IP sub-networks of various types such as TTNT (Tactical Targeting Network Technology), mini-CDL (Common Data Link), free space optics communications (FSOC), QNT (Quint Networking Technology), and JCAN (Joint Capability for Airborne Networking). These integrated networks provide improved tactical communications and situational awareness. Network integration is the convergence of many IP devices (wired, wireless, radio, optical) each forming IP subnets into a single IP network. Each of the device subnets may be IP capable on their own, but cannot integrate seamlessly and automatically with others.

In an embodiment, a single routable network has a plurality of heterogeneous subnetworks having different network parameters and an integration router containing a plurality of network interfaces, each of the plurality of network interfaces configured to be connected to a different one of the plurality of heterogeneous subnetworks. The integration router is configured to automatically connect with each of the plurality of heterogeneous subnetworks. The integration router providing persistent network connectivity between user nodes across the plurality of heterogeneous subnetworks.

In an embodiment, the integration router is configured to automatically connect with each of the plurality of heterogeneous subnetworks without individual manual configuration of parameters associated with each of the plurality of heterogeneous subnetworks.

In an embodiment, the integration router is configured to provide dynamic route selection between a first node on one of the plurality of heterogeneous subnetworks and a second node on another of the plurality of heterogeneous subnetworks.

In an embodiment, the integration router provides dynamic route selection between the first node on the one of the plurality of heterogeneous subnetworks and the second node on the another of the plurality of heterogeneous subnetworks based on a quality of service.

In an embodiment, the integration router dynamically configures a route selection between the first node on the one of the plurality of heterogeneous subnetworks and the second node on the another of the plurality of heterogeneous subnetworks based on a proactive failover based on degradation of service quality before route communication failure.

In an embodiment, the integration router provides dynamic route selection between the first node on the one of the plurality of heterogeneous subnetworks and the second node on the another of the plurality of heterogeneous subnetworks based on balancing loads over different routes between the first node on the one of the plurality of heterogeneous subnetworks and the second node on the another of the plurality of heterogeneous subnetworks.

In an embodiment, the integration router further comprises a BGP-MX module configured to dynamically discover BGP peers across the plurality of heterogeneous subnetworks.

In an embodiment, the BGP-MX module is further configured to automatically and dynamically establish and adjust a route between the first node on the one of the plurality of heterogeneous subnetworks and the second node on the another of the plurality of heterogeneous subnetworks.

The integration routed is a routing module, which includes a processor readable medium having software stored thereon. The software, when executed by one or more processing devices, is configured to implement the actions described herein.

In an embodiment, the integration router is configured to be integrated with a conventional software router.

In an embodiment, the integration router is configured to be integrated within the conventional software router.

In an embodiment, the integration router is configured as an add-on module to a conventional software router.

In an embodiment, the integration router is a program product configured to be programmed within a programmable processing appliance.

In an embodiment, the integration router is a network appliance including the processor readable medium.

In an embodiment, the integration router has an autonomous router configuration module configured to be operatively coupled to a conventional router, a dynamic address map providing topology and address tracking, and a device configuration interface configured to be coupled to each of the plurality of heterogeneous subnetworks.

In an embodiment, each of the plurality of heterogeneous subnetworks are separate autonomous systems.

In an embodiment, a single network has a plurality of heterogeneous subnetworks having different network parameters and a plurality of integration routers containing a plurality of network interfaces, each of the plurality of network interfaces configured to be connected to a different one of the plurality of heterogeneous subnetworks. The integration router is configured to automatically connect with each of the plurality of heterogeneous subnetworks. The integration router providing persistent network connectivity between user nodes across the plurality of heterogeneous subnetworks. A first type of the plurality of integration routers is configured as an interior router to be installed a backbone nodes providing routing to and from a first node on one of the plurality of network interfaces and a second node on another of the plurality of network interfaces. A second type of integration router is configured as an edge router providing routing to and from a node located on one of the plurality of network interfaces. A third type of integration router is configured as a gateway router to be installed a backbone nodes providing routing to and from a first node on one of the plurality of network interfaces and a second node on another of the plurality of network interfaces and to provide links to a global information grid.

In an embodiment, an integration router configured for use on a single routable network having a plurality of heterogeneous subnetworks having different network parameters. The integration router containing a plurality of network interfaces, each of the plurality of network interfaces configured to be connected to a different one of the plurality of heterogeneous subnetworks. The integration router is configured to automatically connect with each of the plurality of heterogeneous subnetworks. The integration router provides persistent network connectivity between user nodes across the plurality of heterogeneous subnetworks.

In an embodiment, the integration router is configured to automatically connect with each of the plurality of heterogeneous subnetworks without individual manual configuration of parameters associated with each of the plurality of heterogeneous subnetworks.

In an embodiment, the integration router is configured to provide dynamic route selection between a first node on one of the plurality of heterogeneous subnetworks and a second node on another of the plurality of heterogeneous subnetworks.

In an embodiment, the integration router is further configured to automatically and dynamically establish and adjust a route between the first node on the one of the plurality of heterogeneous subnetworks and the second node on another of the plurality of heterogeneous subnetworks.

DRAWINGS

FIG. 23 is an illustration of test bed utilizing routers constructed in accordance with an embodiment of the present invention;

FIG. 24 is a diagram illustrating steps utilizing link quality monitoring and proactive link failover;

FIG. 41 and FIG. 42 are diagrams illustrating mobility management function;

FIG. 46 is a diagram illustrating a test which recreates redundant links and verifies load balancing enhancing multicast efficiency;

FIG. 48 is a diagram illustrating a use case of routers constructed in accordance with an embodiment of the present invention showing an initial state and setup before join;

DESCRIPTION

A hybrid router, an autonomous IP based network integration solution that provides end-to-end sensor-to-shooter connectivity across a heterogeneous tactical network is disclosed. This network consists of IP sub-networks of various types such as TTNT (Tactical Targeting Network Technology), mini-CDL (Common Data Link), free space optics communications (FSOC), QNT (Quint Networking Technology), and JCAN (Joint Capability for Airborne Networking). These integrated networks provide improved tactical communications and situational awareness. Network integration is the convergence of many IP devices (wired, wireless, radio, optical) each forming IP subnets into a single IP network. Each of the device subnets may be IP capable on their own, but cannot integrate seamlessly and automatically with others.

The Hybrid Autonomous Router for Tactical Networks (HART) is a self-configuring integration router software module that interconnects heterogeneous subnets of differing IP devices into a single routable network implemented for integration with a mini-CDL radio.

The HART integration router is a software tool that can be added into existing commercial routers on an add-on card, integrated into software routers such as quagga or vyatta, or can be installed in a network appliance where data is sent through the appliance. These HART Integration Routers may be installed on appliances and nodes throughout the black-side of a network.

Figure 1:
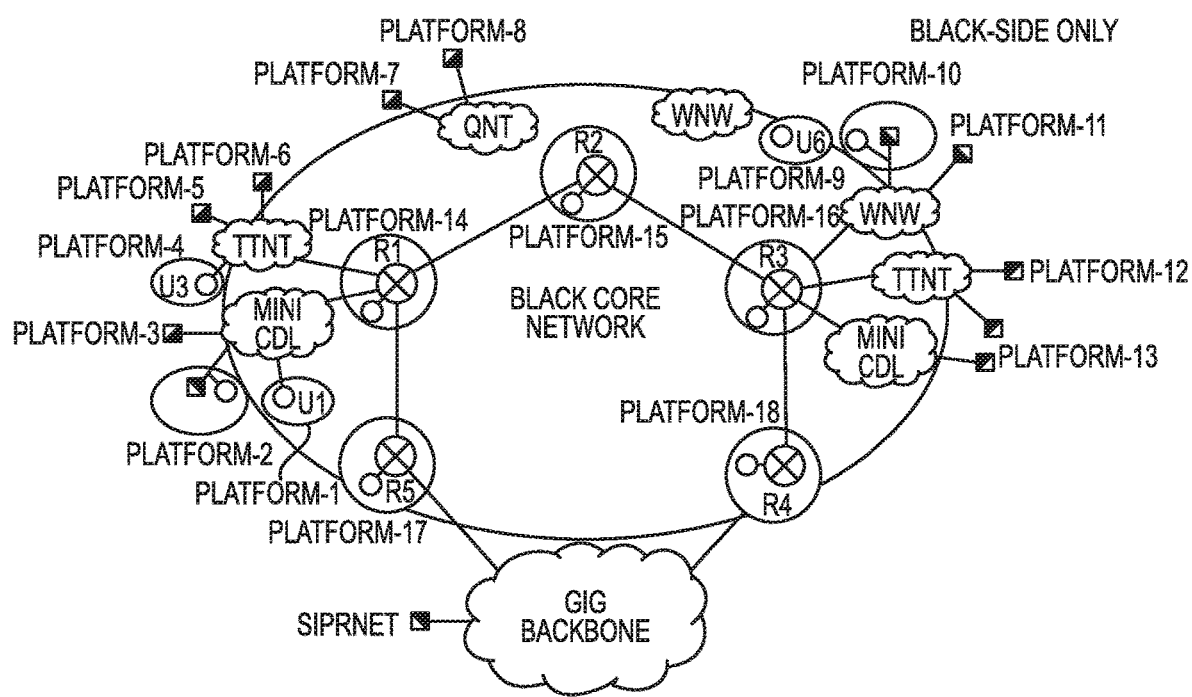
FIG. 1 illustrates an embodiment of an airborne network built from mixed IP devices.

Many different wireless networking technologies are currently used to build airborne networks today. These wireless networks operate on different frequencies, use different waveforms, and provide limited autonomous switching and routing capability. This is shown in FIG. 1.

Existing approaches for integrating these heterogeneous wireless networks suffer from four major limitations overcome by the HART approach:

inability to adapt dynamically to topology changes in the network;

need for excessive manual configuration;

lack of scalability with network size;

inability of routing protocols to factor wireless link quality into routing decisions, resulting in sub-optimal network performance.

HART addresses two major technical challenges that remain unaddressed by the state of the art to achieve the desired capability of an autonomous integration router for tactical edge networks:

Autonomous Mission Persistent Network Connectivity, i.e., the development of a scalable and automatic approach for establishing and maintaining end-to-end connectivity between user nodes in a dynamically changing tactical network topology with intermittent connectivity to the global information grid ("GIG").

Autonomous Mission Optimized Network Connectivity, i.e. the development of an enhanced tactical routing approach that is aware of the dynamic changes in the quality of wireless links within the tactical network and that factors link quality into its computation of end-to-end routes to optimize network and mission performance.

Figure 2A:
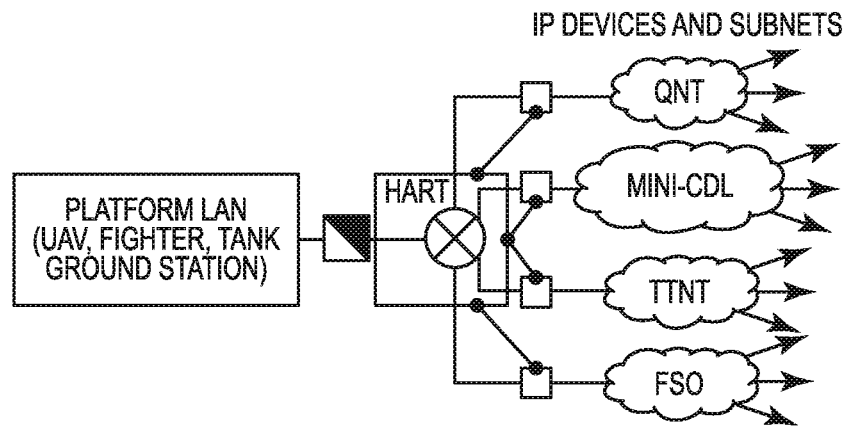
FIG. 2a is a block diagram of hardware of a router constructed in accordance with an embodiment of the present invention.

FIG. 2a shows a block diagram of the hardware where the integration router (HART) contains multiple interfaces, i.e., a LAN interface connected to a HAIPE-fronted platform LAN and WAN interfaces connected to different wireless terminals, e.g., TTNT, QNT, mini-CDL, FSO). Some of these wireless terminals implement bridged IP subnets (e.g., mini-CDL, FSO) while others implement routed IP subnets using proprietary routing protocols (e.g., TTNT, QNT). The software architecture of the HART integration router, shown in FIG. 2b, consists of a core OSPF routing function with plug-in router extensions for each type of wireless terminal. The terminal-specific router extensions implement the HART innovations listed above to enable performance-optimized routing across the heterogeneous collections of bridged and routed IP subnets.

The HART approach has two major beneficial features:

1. It requires no modifications to the software of existing tactical IP radios and optical modems to deliver its network integration and enhanced tactical routing capabilities. This facilitates rapid deployment of the technology in the field by eliminating the need to coordinate software changes with the various vendors of wireless IP terminals.

2. It lends itself to a modular implementation architecture where the HART mechanism and techniques are implemented as plug-in software modules that can either be (1) integrated within existing software routers (e.g., quagga, XORP); or (2) executed on add-on processor modules for commercial hardware routers (e.g., within an AXP card for a Cisco router); or (3) integrated within commercially-available programmable high-speed packet processing appliances (e.g., EZappliance).

Underlying the HART approach for network integration and enhanced tactical routing is a set of innovative techniques and mechanisms that will be implemented within software module that can be installed either as an add-on to existing routers, or as a network appliance within existing networks. To address the challenges and capability gaps described above, the HART software may provide these capabilities:

Hybrid routing;

Quality-aware routing;

Integration with existing Sub-networks.

Hybrid Routing

HART employs a hybrid routing approach to establish and maintain end-to-end connectivity between nodes in a mobile tactical network environment. It employs a direct routing approach for connecting nodes within the tactical AS (Autonomous Systems) and uses a mobile IP based overlay routing approach with tactical enhancements for connecting tactical nodes to nodes in the GIG. The enhanced Mobile IP based technique eliminates the packet encapsulation overhead associated with overlay routing when packets traverse the bandwidth-constrained tactical user sub-nets. The HART Hybrid routing addresses both:

Intra-Tactical-AS Routing;

Routing between the Tactical-AS and the GIG.

Quality-Aware Routing

The proposed approach for enhanced tactical routing is based on dynamic route selection using link quality and using optical and other link types as failover links when primary links failed or degraded. This is now expanded to become more generic to allow more flexibility for Quality aware routing. HART tracks link quality using network monitors, link probes and other techniques. This quality-aware link monitoring will be used to calculate a Link Quality Metric (LQM). The LQM will be stored in HART and updated in the router on the HART machine adding quality-aware routing to existing routers (which do not have a way to monitor and probe the link quality).

Integration with Existing Sub-Networks

The HART module integrates with existing subnets and gateways (e.g. JCAN: Joint Capability for Airborne Networking and BACN: Battlefield Airborne Communications Node) as a separate AS (Autonomous Systems). It uses the innovative BGP-MX (BGP with Mobility Extensions) service to exchange network reachability information with these other ASes. BGP-MX overcomes static manual configuration of BGP peering arrangements by implementing mechanisms that enable transit routers in a mobile AS environment to (1) dynamically discover BGP peers from a different AS and automatically establish a peering relationship; and (2) converge rapidly to a new route in response to changes in the topology of the backbone networks.

Discussion

The HART approach can be used for network integration and enhanced tactical routing in a heterogeneous tactical networking environment. The HART approach may be used to enhance the following:

Analyze Network Integration Requirements;

Develop Design of Protocols and Services;

Evaluate Performance using Simulations;

Develop Product Implementation Architecture.

Analysis

Use cases of diverse multi-subnet environments and situations have been created such as: nodes joining or leaving a network; or nodes moving from one network (using TTNT) to another network (using Mini-CDL). Other use cases involved requested data flows from the ground to an aerial node, the reverse, and data flows from aerial node to aerial node. Some of these Use Cases are included in Appendix B below.

In various embodiments, HART solves:

No changes to existing radios and COTS routers;

Provide GIG to Airborne Network (AN) endpoint connectivity (and reverse);

Provide GIG to Airborne Network (AN) endpoint connectivity (and reverse);

Provide quality aware link and route selection.

These use cases were analyzed to determine what an integration router monitors, and what network dynamics are tracked, and what options are configured in existing hardware (routers and radios).

The HART design is refined by analyzing several real-world use cases of multi-subnet environments with different radio and routing capabilities.

After the design was refined, a subset of functionality was selected to create a prototype to demonstrate the HART approach. The features selected for prototyping were proactive failover across many links and integration with a Mini-CDL radio and interface. With the proactive failover mechanism, the HART router monitors the quality of each radio link to detect when it falls below a specified threshold. Upon detection of unacceptable link degradation, the HART router proactively routes all IP packet flows traversing the degraded link to a backup link of higher quality. If or when the original link recovers its quality, the IP packet flows are switched back to this link. Current systems provide no capability for proactive link failover; failover occurs only after a complete breakdown of a link. Application performance suffers as a consequence. In addition to proactive link selection, the HART prototype implements multi-level policy-based failover (1, 2, 3, 4, 5 or more backup links in a prioritized order), a capability that is not supported within COTS routers. For instance, with conventional routers, if the policy route for an IP flow were to fail it will be routed over the default interface. Unlike HART, secondary and tertiary policy routes cannot be specified with conventional routers.

HART Overview

Network integration is the convergence of many IP devices (wired, wireless, radio, optical) each forming IP subnets into a single IP network. Each of these device subnets may be IP capable on their own, but cannot integrate seamlessly and automatically with others. Appendix A outlines the list of IP device targets, the interface method, and device subnet integration.

HART software provides heterogeneous network integration. HART addresses these problems by integrating the following techniques into Autonomous Integration Routers:
Hybrid routing;
Dynamic subnet domain name service;
Quality-aware link monitoring and routing; and
Mobility-enhanced BGP (or BGP-MX).

Figure 3:
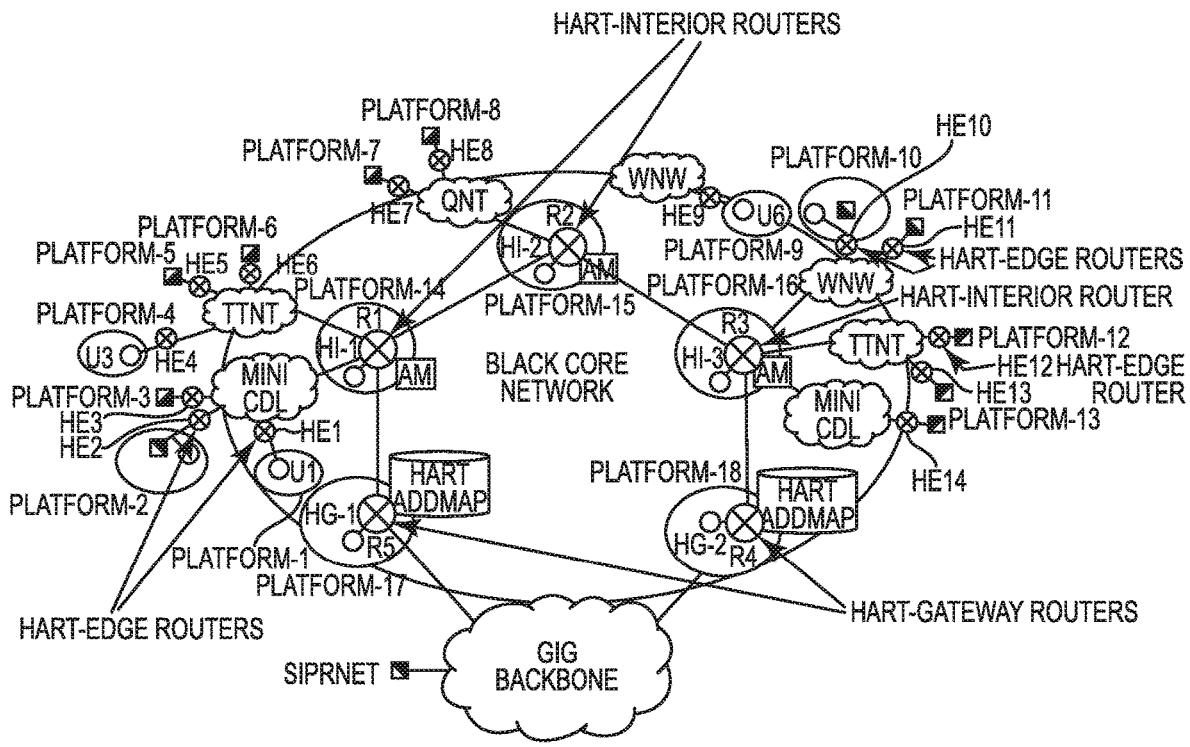
FIG. 3 is a diagram of an airborne network with routers constructed in accordance with an embodiment of the present invention.

These HART Integration Routers may be installed throughout the black-side network, as shown in FIG. 3.

The HART integration router is a software tool that can be added into existing commercial routers on an add-on card, integrated into software routers such as quagga or vyatta, or can be installed in a network appliance and where data is sent through the appliance.

Figure 4:
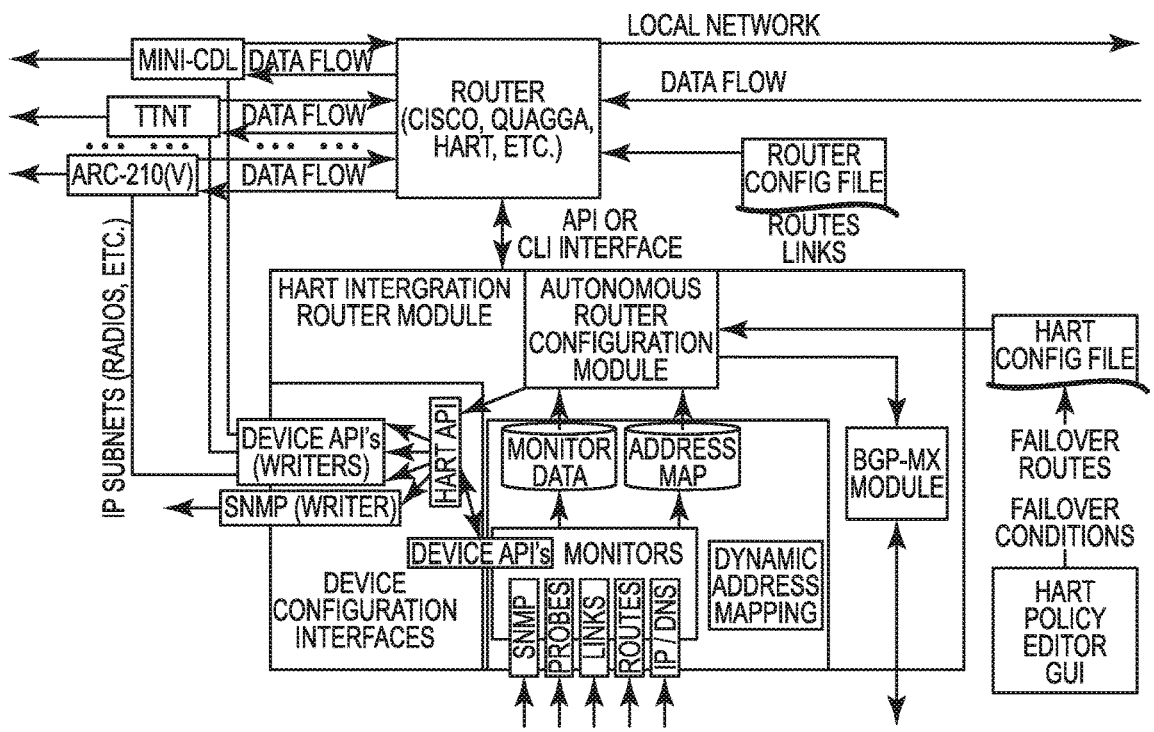
FIG. 4 is a block diagram of software architecture of the present invention.
Figure 5:
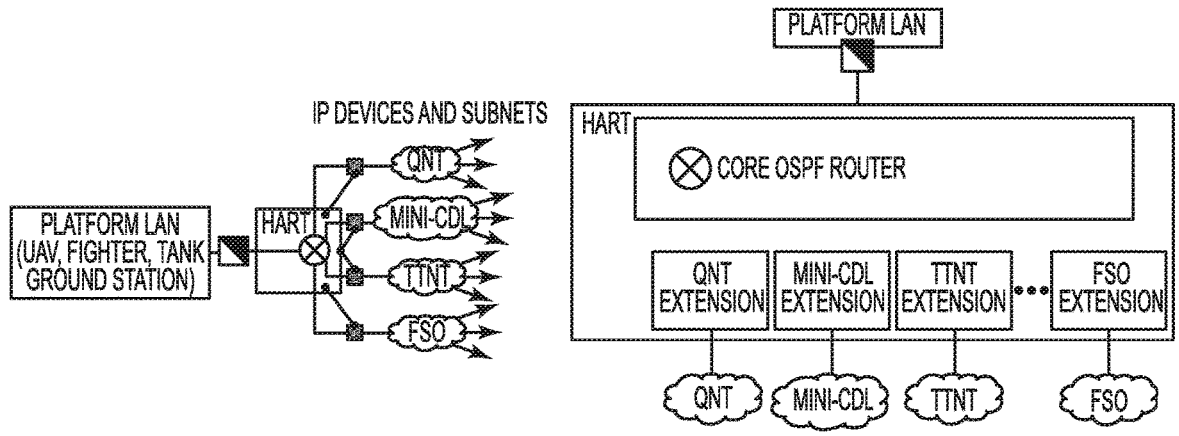
FIG. 5 is a conceptual view of a router constructed in accordance with an embodiment of the present invention containing multiple interfaces.

The HART software module has six components shown in 4. FIG. 4 also shows the data flow between each of these components. The components are:
Topology and Address Tracking (TAT)—Dynamic Address Map;
Autonomous Router Configuration (ARC) Module;
Device Configuration Interfaces (DCI);
HART Policy Editor;
BGP-MX module;
Router.

Core Network Integration

This section describes what configuration options to route IP packets on tactical networks. Each end node has an IP address and default route/router and the routers track routes to other subnets.

The configurations for each node are:
IP address;
Default route/default router/gateway;
Subnet mask and settings;
DNS settings (server/proxy addresses).

The configurations for each subnet are:
Default router;
List of IPs;
DNS settings;
Address allocation.

HART Components

The overall system for HART components:
Both IPv4 and IPv6;
Compatibility, to work with:
a. Existing software/servers/systems: firewalls, proxy servers, caches, switches, routers and appliances, HAIPEs, gateways, filtering tools/appliances/apps, etc.;
b. Hardware vendors: security and network vendors, including: Cisco, Sun, Microsoft, Check Point, and 3com;
c. Applications: ISR, C2 and targeting (sensors to shooters);
d. Various data types: voice, data, video, sound and security;
Scalability: 1000's of nodes, across 10's or 100's of subnets and AS's, all mobile and moving;
Work in red/black networks.

The topology tracker and routing component integrates with the various monitors to track topology and make routing decisions. The topology tracker includes the following:
Integrate with monitors;
IP address assignment, if appropriate;
a. Coordinate across the entire hybrid tactical-AS;
b. IPv4 & IPv6 address spaces;
c. Push address changes to node configuration writers;
Routing: make dynamic route decisions;
a. Route from 1 subnet type to another (TTNT to Mini-CDL);
b. Leverage commercial router practices that provide a common switching fabric while interchanging line cards operating at different data rates (i.e. T1, DS-3, OC-192);
c. Subnet handoff (node moves from TTNT to QNT, or moves from TTNT and adds mini-CDL, and other use cases);
d. Perform multi-link, multi-channel, multi-antenna multi-path routing and communications topology configurations;
e. Perform static routing (mesh, ring, hub and spoke) between multiple subnets;
f. Perform mobile ad hoc routing between multiple subnets node join/leave, net join/leave;
Provide a way to provision tunnels/links/flows;
a. Track a link/flow detail record (FDR).

Monitors integrate with the other components to provide network monitoring data:
Node trackers—SNMP readers (routes, address, location, etc.);
DNS monitor—(new IP's linked to old names, IP changes for names, red/black concerns, DNS probes, etc.);
Link quality probes.

Node configuration writers provide the machine-to-machine interface for automatic configuration. It integrates with the other components to provide a single interface to write configuration options and settings to local and remote routers and wireless IP devices. These writer components may use SNMP and/or device specific API's;

Provide a single option writing API to other components;

Automatic configuration—HART without human involvement;

a. Local and remote programmatic (API) configuration options to set various IP settings [programmatic control of each radio/device/technology];

b. Use SNMP and/or other protocols/services;

c. May include radio/device specific API requirement.

Dynamic DNS proxy integrates with the other components to track DNS names, changes to DNS entries, and act as a DNS proxy to respond to DNS requests with dynamic responses;

Integrate with DNS monitors;

DNS name tracking;

a. HART should act as a proxy for a DNS server;

b. Track DNS name and link to 1 or all IPs for node (each subnet may have a different IP or range);

c. Link Mobile IP "permanent IP" to tactical-AS IP's and DNS name;

Works in Red/black networks (Black side only, but may be aware of red side effects).

Quality aware proxy monitors the various links and paths connected to HART and across the network, then update the link metrics so that the routers can make smarter decisions:

Integrate with link quality monitors;

a. Monitors link quality, bandwidth, latency, packet loss, # of retransmits, usage level, available bandwidth (total-used), etc. run these through a formula to produce a "quality metric";

b. Characterize static link and network performance, bit error rate, packet loss;

Implement an RFC 5578 proxy;

Initiate link-quality measuring probes;

Make/help with routing decisions to optimize based on link quality;

a. Develop, demonstrate and analyze link fade, optical polarization rotation, pointing and tracking, antenna gain, link margins, bit error rates;

b. Update link metrics in local and remote routers and devices.

BGP-MX

HART treats other network integration system as separate ASs. This provides automatic configuration and integration with other networking systems in use Integrate seamlessly with BGP routers Dynamically discover BGP peers from other ASs and setup peering relationships Converge new routes rapidly in response to changes in topology Integrate with external ASs such as:

a. JCAN: Joint Capability for Airborne Networking subnets b. GIG: Global Information Grid (backhaul/reachback)

c. BACN: Battlefield Airborne Communications Node d. DISN: Defense Information System Network The HART addresses at least two major technical challenges to achieve desired capability of an autonomous integration router for tactical edge networks:

1. Autonomous Mission Persistent Network Connectivity, i.e. the development of a scalable and automatic approach for establishing and maintaining end-to-end connectivity between user nodes in a dynamically changing tactical network topology with intermittent connectivity to the GIG.

2. Autonomous Mission Optimized Network Connectivity, i.e. the development of an enhanced tactical routing approach that is aware of the dynamic changes in the quality of wireless links within the tactical network and that factors link quality into its computation of end-to-end routes to optimize network and mission performance.

Underlying the HART approach for addressing these challenges is a set of techniques that are listed in Table 1 below and described later.

TABLE 1

| Technical Challenges | HART Innovations |
| --- | --- |
| Autonomous Mission Persistent Connectivity | ✓ Hybrid routing with address switching |
| Autonomous Mission Optimized Connectivity | ✓ Autonomous quality aware routing |

Figure 2B:
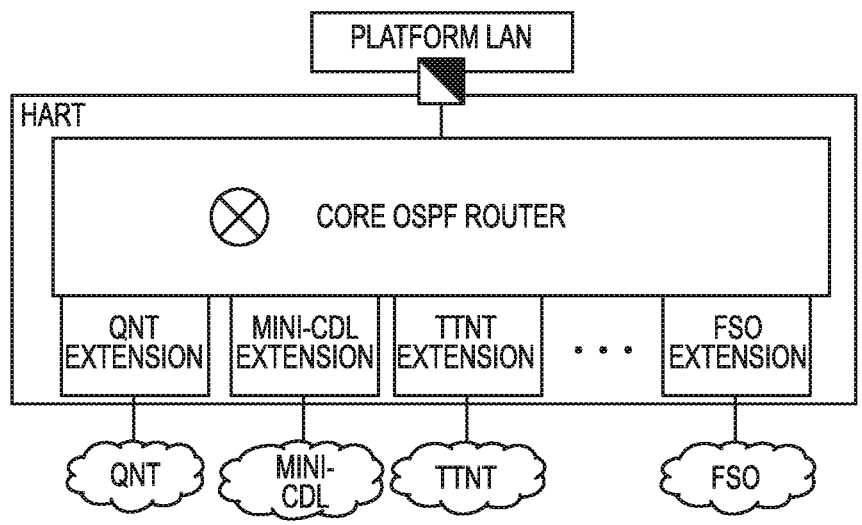
FIG. 2b is an illustration of the software architecture of a router constructed in accordance with an embodiment of the present invention.

FIGS. 2a and 2b show block diagrams of the HART solution where the integration router contains multiple interfaces, i.e., a LAN interface connected to a HAIPE-fronted platform LAN and WAN interfaces connected to different wireless terminals, e.g., TTNT, QNT, mini-CDL, FSO). Some of these wireless terminals implement bridged IP subnets (e.g., mini-CDL, FSO) while others implement routed IP subnets using proprietary routing protocols (e.g., TTNT, QNT). The software architecture of the HART integration router, shown in FIG. 2b, consists of a core OSPF routing function with plug-in router extensions for each type of wireless terminal. The terminal-specific router extensions implement the HART innovations listed above to enable performance-optimized routing across the heterogeneous collections of bridged and routed IP subnets.

The HART approach has two major beneficial features:

It has no modifications to the software of existing tactical IP radios and optical modems to deliver its network integration and enhanced tactical routing capabilities. This facilitates rapid deployment of the technology in the field by eliminating coordination of software changes with the various vendors of wireless IP terminals.

It lends itself to a modular implementation architecture where the HART mechanism and techniques are implemented as plug-in software modules that can either be (1) integrated within existing software routers (e.g., quagga, XORP); or (2) executed on add-on processor modules for commercial hardware routers (e.g., within an AXP card for a Cisco router); or (3) integrated within commercially-available programmable high-speed packet processing appliances (e.g., EZ appliance).

In an overview, HART software will provide heterogeneous network integration. The HART approach for addressing these problems will integrate the following innovative techniques into Autonomous Integration Routers:

Hybrid routing Dynamic Topology and Address Tracking

Quality-aware link monitoring and routing

Mobility-enhanced BGP (or BGP-MX)

HART Hybrid routing enables OSPF-based dynamic route discovery and maintenance in a mobile ad hoc airborne network with a diverse set of bridge IP subnets (mini-CDL, FSOC) and routed IP subnets (TTNT, QNT). HART uses OSPF [Boe06, Ci05] between HART nodes and then export routes to (and import routes from) existing routers and radio hardware that may implement proprietary routing protocols. This is in contrast to current solutions that use conventional tunneling of data packets across subnets such as TTNT and thereby incurring excessive network overhead. To eliminate the overhead associated with tunneling data packets across routed IP subnets, such as TTNT, HART will use a novel packet forwarding technique called "address switching" for TTNT, QNT and other tactical routed IP subnets.

To support address switching, HART tracks the names and addresses of node as they join and leave the various subnets. This data is used to track aliases (names or labels) of the nodes in the network as they move. This data forms a topology of the network that HART uses to augment the routing within the network. The topology information is similar to a routing table and is stored as "alias-tag" entries which form the Topology and Address Tracking (TAT) Database. HART uses this alias-tag table along with HART policies to determine routes to use and configuration changes to make on the routers. The policies define link augmentations like replicate data across two or more links to provide for redundancy, or failover priority if links fail or degrade.

In addition to topology data, HART tracks link quality using network monitors, link probes and other techniques. This quality-aware link monitoring is used to calculate a Link Quality Metric (LQM). The LQM is stored in HART and updated in the router on the HART machine adding quality-aware routing to existing routers (which do not have a way to monitor and probe the link quality).

In tactical and airborne networks other domains (groups of subnets) form ASes (Autonomous Systems). ASes use a protocol called BGP to route between ASes. BGP does not support mobility and dynamic configuration. BGP-MX is a mobility extension for BGP to provide support for mobility and automatic discovery.

The HART Integration Routers are installed on appliances and nodes throughout the black-side (CT side) of a network. FIG. 1 shows the black-side of a notional, multi-subnet airborne network. FIG. 3 shows where HART routers may be installed in the network of FIG. 1.

HART Routers can include three versions, a HART-Edge (HART-E), HART-Interior (HART-I), and HART-Gateway (HART-G). Examples of each of the HART-E, HART-I, and HART-G routers are shown in FIG. 3. HART-Edge (HART-E): These HART Appliances are installed on each edge node in the network and will route data to and from an endpoint, but not as an intermediate hop in a multi-hop path. These appliances track the local nodes on the platform, and routes and default routers to other networks.

HART-Interior (HART-I): These HART Appliances are installed on backbone nodes and provide routing to and from nodes. These nodes will use more storage for extensive tables to track nodes. HART-I nodes will forward data about reachability of edge nodes, addresses and status to the HART-Gateway nodes.

HART-Gateway (HART-G): Same functions as HART-Interior, and also provides links and routes back to the GIG, Internet or other networks. The gateway appliances track the nodes around the network and keep the dynamic address links updated and current.

Figure 6:
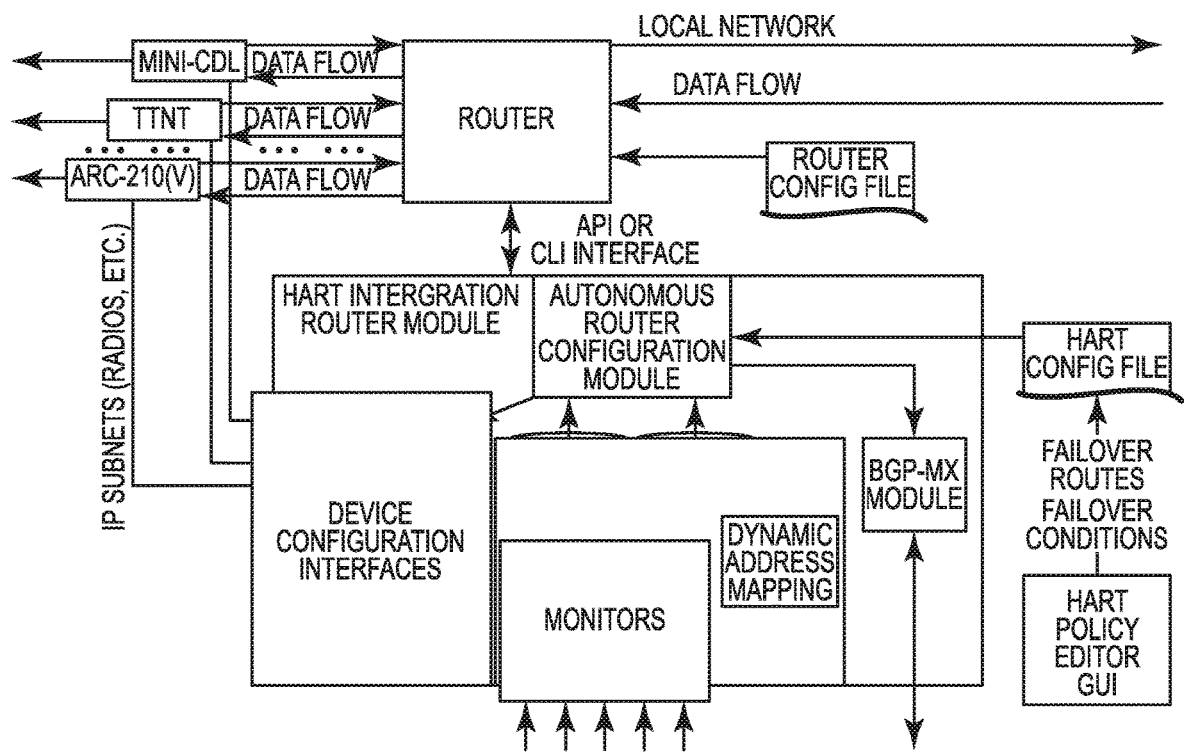
FIG. 6 is a more detailed block diagram of the software architecture of a router constructed in accordance with an embodiment of the present invention.
Figure 7:
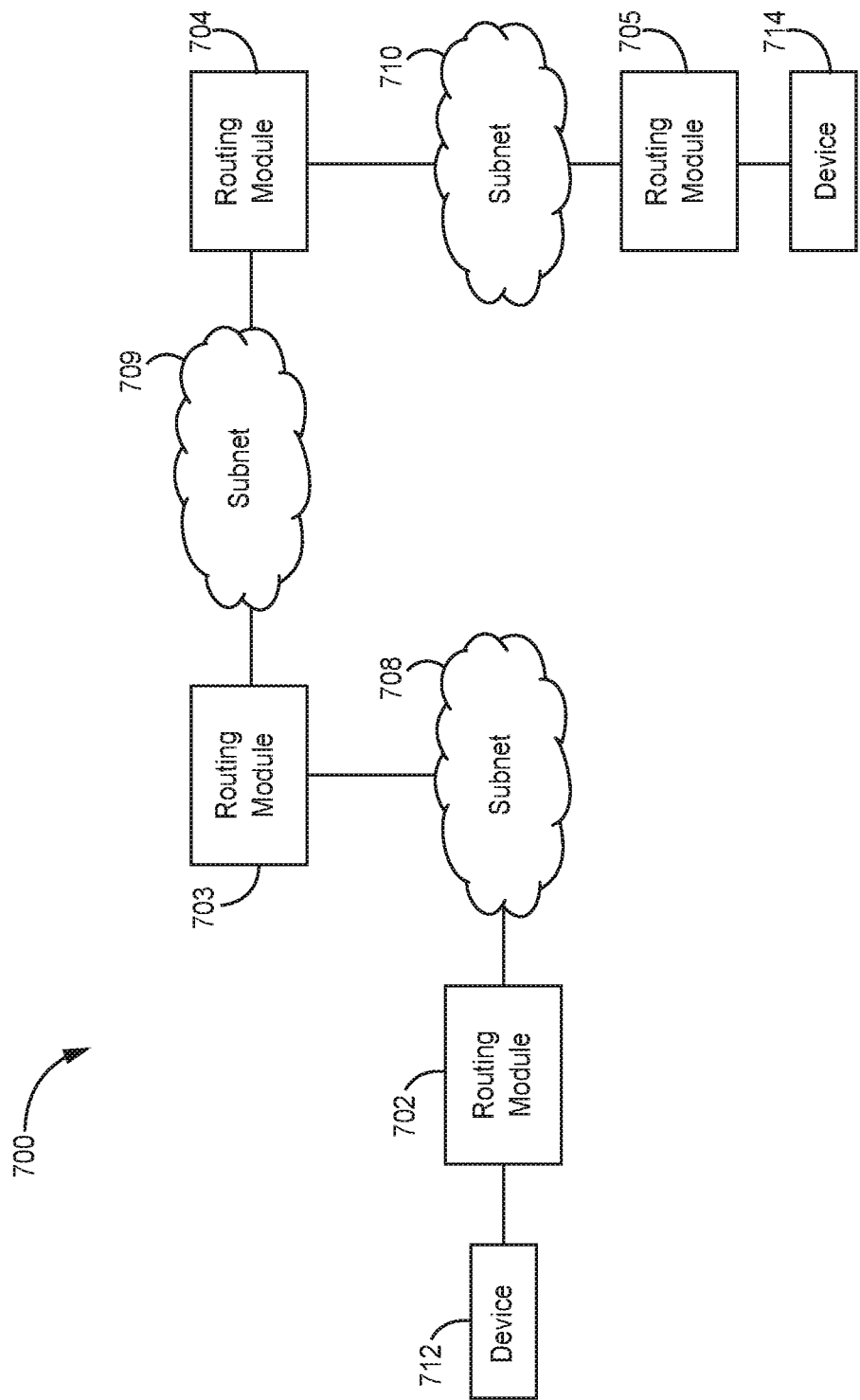
FIG. 7 is a block diagram of an example network including a plurality of HART routing modules.

FIG. 6 is a block diagram of an example network appliance showing the HART suite of components implemented therein. FIG. 6 shows the data flow between each of these HART components. The HART components are:

Topology and Address Tracking (TAT)—Dynamic Address Map
  Autonomous Router Configuration (ARC) Module
  Device Configuration Interfaces (DCI)
  HART Policy Editor
  BGP-MX module
  Router FIG. 7 is a block diagram of an example network 700 including a plurality of HART routing modules 702-705. The network 700 includes a plurality of subnets 708-710, which each include a plurality of networked nodes (not individually shown). Each subnet 708-710 implements an Internet Protocol (IP) based communication protocol to route IP packets between nodes joined to the subnet 708-710. Each subnet 708-710 also has a distinct, private Internet Protocol (IP) address space and may or may not have a distinct communication protocol from other subnets 708-710. Some example communication protocols for subnets 708-710 of network 700 include TTNT (Tactical Targeting Network Technology), mini-CDL (Common Data Link), FSOC (free space optics communications), QNT (Quint Networking Technology), JCAN (Joint Capability for Airborne Networking), JALN (Joint Aerial Layer Network), GIG (Global Information Grid), BACN (Battlefield Airborne Communications Node), and DISN (Defense Information System Network). Other IP based communication protocols can also be used.

One or more nodes (referred to herein as "endpoint nodes") in one of the respective subnets 708-710 may also be joined to another subnet (not shown) in addition to subnet 708 or subnet 710. Such endpoint nodes may bridge or otherwise communicatively couple the other subnet to the subnet 708-710 respectively using conventional IP protocols. Such endpoint nodes, therefore, can provide a network route between nodes on the respective subnet 708-710 and nodes on the other subnet.

The HART routing modules 702-705 provide additional functionality over a conventional endpoint node that communicatively couples two subnets together. In particular, the HART routing modules 702-705 cooperate to communicatively couple together subnets/devices that are more than one subnet away from another subnet/device. In the example shown in FIG. 7, HART routing modules 702-705 communicatively couple device 712, which is not joined to subnet 708 with device 714, which is not joined to subnet 710. Thus, HART routing modules 702-705 enable packets from device 708 to be routed to device 714 and vice-versa. Although network 700 includes only three subnets 708-710, more than three subnets 708-710 can also be communicatively coupled together with HART routing modules 702-705, and or additional HART routing modules.

The HART routing modules 702-705, communicatively couple together disparate and separated subnets by tunneling packets through intermediate subnets to route the packets to their final destination. The HART routing modules 702-705 send and receive (e.g., route) Internet Protocol (IP) packets.

To send a packet from device 712 to device 714, the packet is sent from device 712 to the routing module 702. Routing module 702 tunnels the packet through subnet 708 to routing module 703. Routing module 703 tunnels the packet through subnet 709 to routing module 704. Routing module 704 tunnels the packet through subnet 710 to routing module 706, which sends the packet to device 714. In this way, routing modules 702-705 cooperate to send packets between devices 712, 714, which are not members of a common subnet.

More generally, routing modules 702-705 can communicatively couple together different subnets having the same or different communication protocols, such that the nodes in the different subnets can communicate with nodes/devices outside of those subnets, even if the other devices are on subnets using different communication protocols.

Use Case: How HART Routes Packets

Each HART routing module 702-705 joins the one or more subnets 708-710 that it is in direct communication with. For example, HART routing module 702 joins subnet 708, HART routing module 703 joins both subnet 708 and subnet 709, HART routing module 704 joins both subnet 709 and subnet 710, and HART routing module 706 joins subnet 710. HART routing module 702 is not joined to subnet 709 or subnet 710, HART routing module 703 is not joined to subnet 710, HART routing module 704 is not joined to subnet 708, and HART routing module 706 is not joined to subnet 708 or subnet 709.

To route data through a network of mixed subnets, a HART routing module 702-705 can track nodes in the subnets to which the HART routing module 702-705 is joined. The HART routing modules 702-705 then share node/subnet information (e.g., the IP address of nodes or IP address space of a subnet) they have collected with the other HART routing modules 702-705. Using this shared information, the HART routing modules 702-705 can build tables of the addresses with information on how to get from subnet to subnet through the HART routing modules 702-705. These tables are also referred to herein as alias-tag tables. The alias-tag table is similar to a routing table, and will be used by a HART routing module 702-705 for routing and address switching. The process of sharing of information and building these alias-tag tables is also referred to herein as Topology and Address Tracking.

Figure 8A:
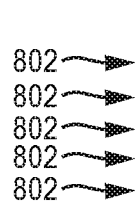
FIG. 8A is an illustration of an example alias tag table.
Figure 8B:
FIG. 8B illustrates an example alias tag of an alias tag table.

FIG. 8A illustrates an example of an alias-tag table 800. The alias-tag table 800 includes one or more alias-tags 802. Each alias-tag 802 is shown as a row in the Figures herein. An example alias-tag 802 is shown in FIG. 8B. As discussed above, each HART routing module 702-705 can maintain its own (a distinct) alias-tag table 800. Each alias-tag 802 in an alias-tag table 800 corresponds to a network route from the routing module 702-705 maintaining the alias-tag table 800 to a final destination for a packet. The final destination can be represented with a specific IP address or more generally as an IP address space. The routing module 702-705 maintaining a given alias-tag table 800 is also referred to herein as the "owner routing module" for that alias-tag table 800.

Each alias-tag 802 in an alias-tag table 800 includes at least a final destination address (e.g., a specific IP address or subnet IP address space) and a next hop address for a network route from the owner routing module of the alias-tag table 800 to that final destination address (i.e., the final destination address of the same alias-tag 802). As mentioned above, the HART routing modules 702-705 tunnel a packet between respective HART routing modules 702-705 to route the packet to its final destination. Since the packet is tunneled or transparently (from the HART routing module's perspective) routed through the subnets 708-710, the "HART-level" network route does not "see" the subnets 708-710. As such, each hop in the HART-level network route corresponds to a HART routing module along the route. The non-HART routing module nodes in the subnets 708-710 in between the respective hops (HART routing modules 702-705) are ignored (not included) in the HART-level network route, because those subnets 708-710 are tunneled through. For example, the HART-level network route from routing module 702 to device 714 of FIG. 7 consists of routing module 703 as its first hop, routing module 704 as its second hop, routing module 705 as its third hop, and routing module 706 as its fourth hop. Other nodes in subnets 708-710 are ignored.

Accordingly, the next hop address in the alias-tag table 800 for a network route is the IP address of the HART routing module that is next in the HART level network route from the owner routing module to the final destination address. As used herein a "network route" refers to a HART level network route. Accordingly, a "hop" for a network route refers to the next peer HART routing module 702-705 on the network route. That is, the "hops" for a route include only the peer HART routing modules, and do not include other non-peer nodes along the route (e.g., non-peer nodes within a subnet 708-710). A communicative coupling between two routing modules 702-705 (which corresponds to a single "hop" on a network route) is also referred to herein as a virtual link or simply a link on such a network route. As used herein a "peer routing module" or a "peer HART routing module" is a routing module 702-705 that is configured to communicate with another routing module 702-705 to implement the tunneled routing schemes to connect disparate subnets/devices as described herein. Each alias-tag 802 can also optionally include the total number of hops for the network route, the Link Quality Metric (LQM) for the network route, and the capacity for the network route corresponding to that alias-tag 802. Multiple network routes to a common final destination (i.e., routes through one or more distinct HART routing modules) may be possible and, if so, each distinct route is included as a separate alias-tag 802 in the alias-tag table 800.

When a HART routing module 702-705 is first set up, the HART routing module 702-705 initializes itself and joins the subnets 708-710 that it is in direct communication with. The HART routing module 702-705 then starts building its alias-tag table 800 with the IP address space/specific IP address corresponding to each subnet 708-710 that the HART routing module 702-705 has joined as well as any other devices in direct communication with the routing module 708-710. During this process, the HART routing module 702-705 can discover other HART routing modules 702-705 that are joined to those subnets 708-710 (i.e., joined to the same subnet as the initialized HART routing module is joined). That is, the initializing HART routing module 702-705 can determine that a particular node joined to a subnet is a peer routing module 702-705. The peer routing modules 702-705 can be discovered using known protocols such as the BGP peer discovery protocols and/or based on the periodic multicast Hello messages discussed below. Once one or more peer routing modules 702-705 that are joined to a common subnet 708-710 with the initializing routing module 702-705 are discovered, the initializing routing module 702-705 can communicate with those peer routing modules 702-705 to discover other peer routing modules 702-705 that are joined to other subnets. In an example, the initializing routing module 702-705 includes a BGP-MX module configured to dynamically discover BGP peers across the plurality of subnets. For example, the initializing routing module 702-705 can dynamically discover BGP peers from a different AS and automatically establish a peering relationship.

Once peer routing modules 702-705 are discovered, the initializing routing module 702-705 can communicate with the peer routing modules 702-705 to identify network routes (HART level network routes) to various final destinations communicatively coupled to the peer routing modules 702-705. In an example, the network routes are discovered using an OSPF-based dynamic route discovery. The routing modules 702-705 can use OSPF [Boe06, Ci05] between the routing modules 702-705 and export routes to (and import routes from) peer routing modules 702-705 and radio hardware that may implement proprietary routing protocols.

Figure 9:
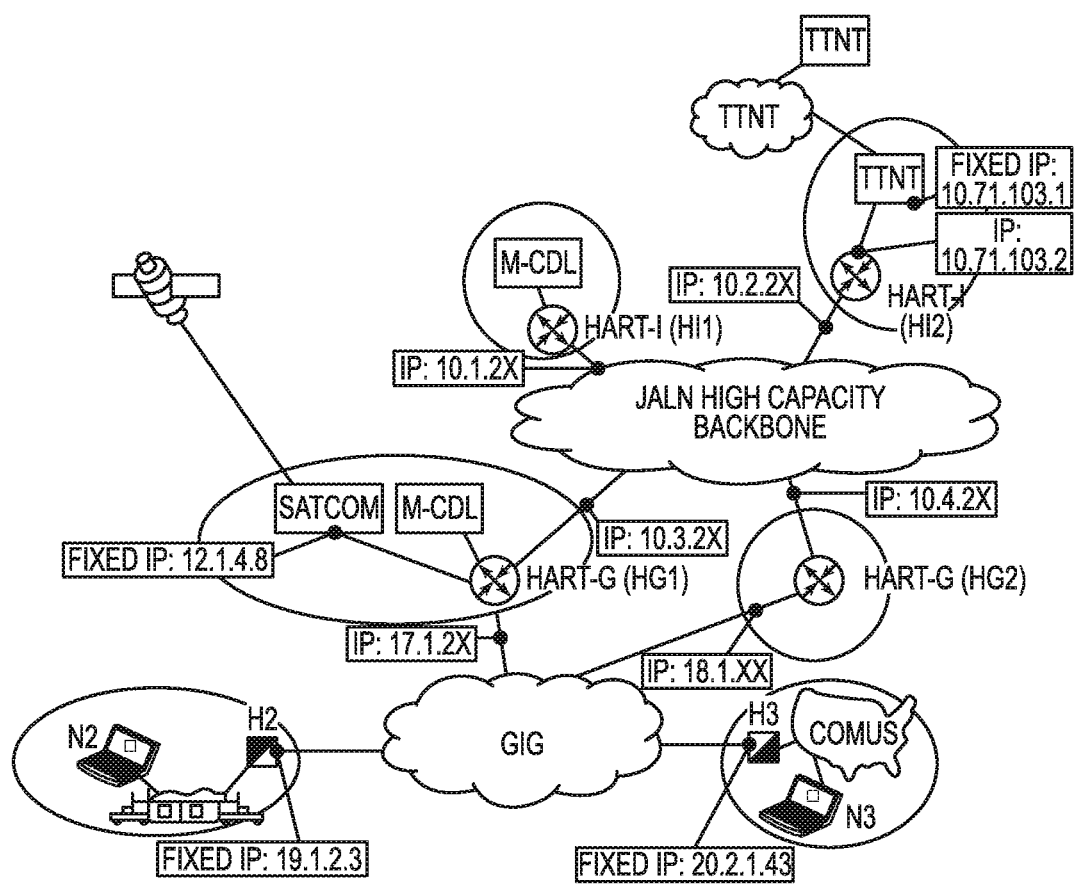
FIG. 9 is an illustration of an initial state of an embodiment of multi-subnet network.
Figure 10:
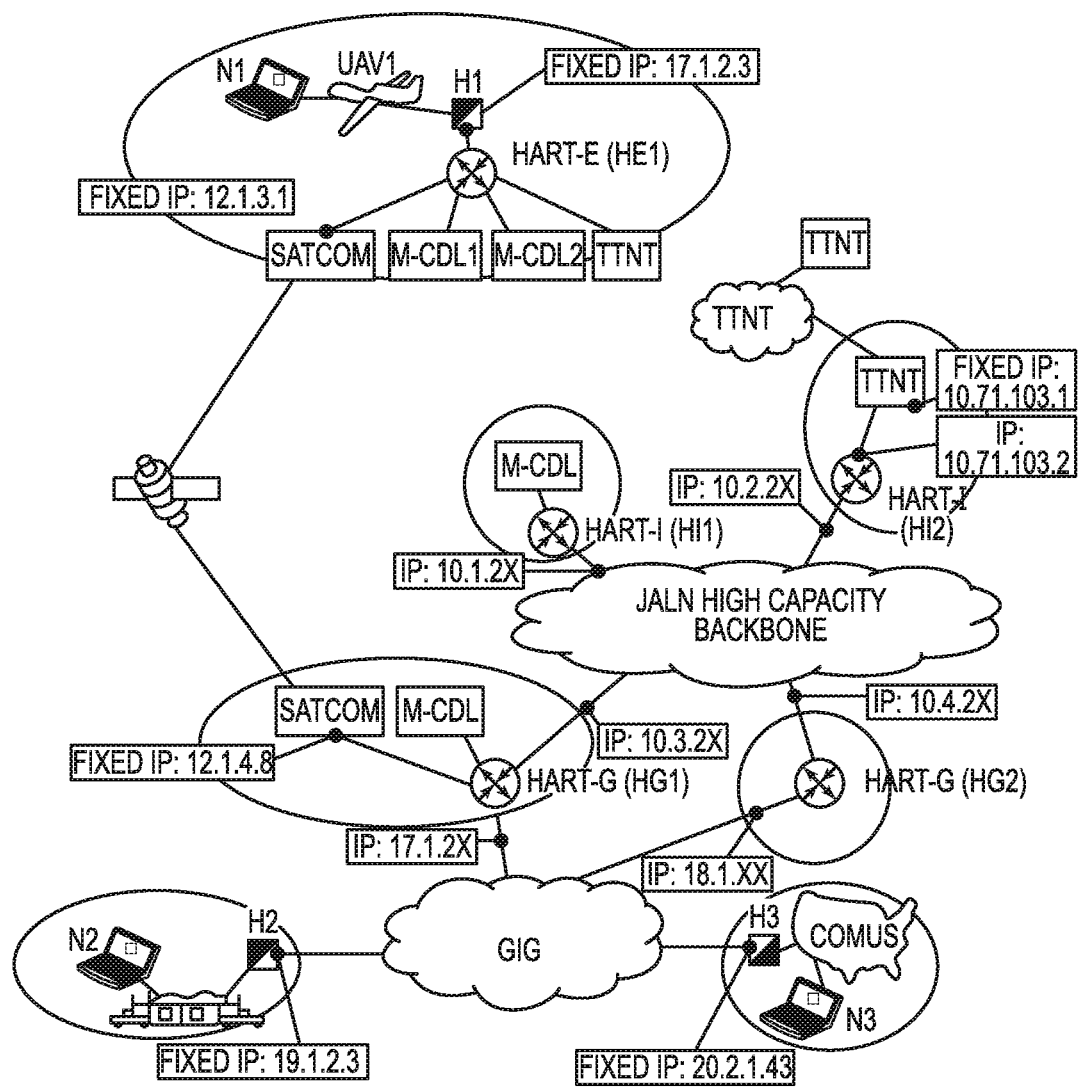
FIG. 10 is an illustration of the multi-subnet network of FIG. 9 as a UAV joins the network.

As nodes join or leave the joined subnets 708-710 of a routing module 702-705, the HART routing module 702-705 updates its alias-tag table 800 communicates with the peer routing module 702-705 throughout the network 700 so that the peer routing modules 702-705 can update their alias-tag tables 800 as well. These updates to the alias-tag tables 800 are used by each routing module 702-705 to maintain its alias-tag table 800 such that the alias-tag table 800 has up-to-date information for each network route to a destination. Below is a use case of how this is done with reference to FIG. 9.

Initial setup process (FIG. 9):
HG1 detects GIG and declares "I'm a gateway router"
a. Broadcasts itself as "default route" to GIG.
HG2 detects GIG and declares "I'm a gateway router"
a. Broadcasts itself as "default route" to GIG.
HI1 detects no GIG and declares "I'm an Interior router" (default)
a. Receives "default route" from JALN backbone (HG1 and HG2, for specified subnets)
HI2 detects no GIG and declares "I'm an Interior router" (default)
a. Receives "default route" from JALN backbone (HG1 and HG2, for specified subnets)
b. Becomes "default router" for TTNT radio subnet to link them to GIG (thru JALN backbone)

Figure 11:
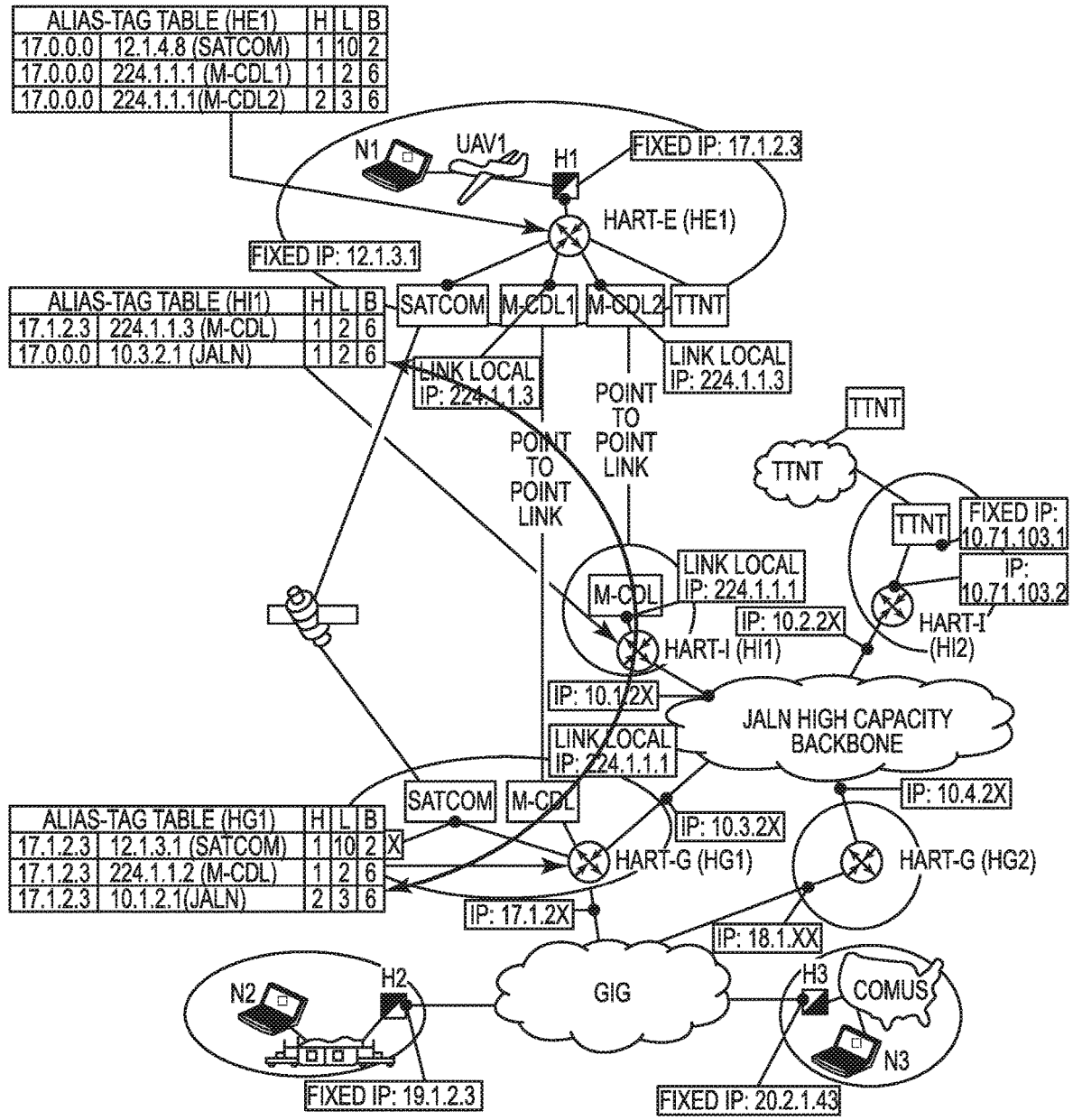
FIG. 11 is an illustration of the multi-subnet network of FIG. 10 after step 4 of the UAV joining the network.
Figure 12:
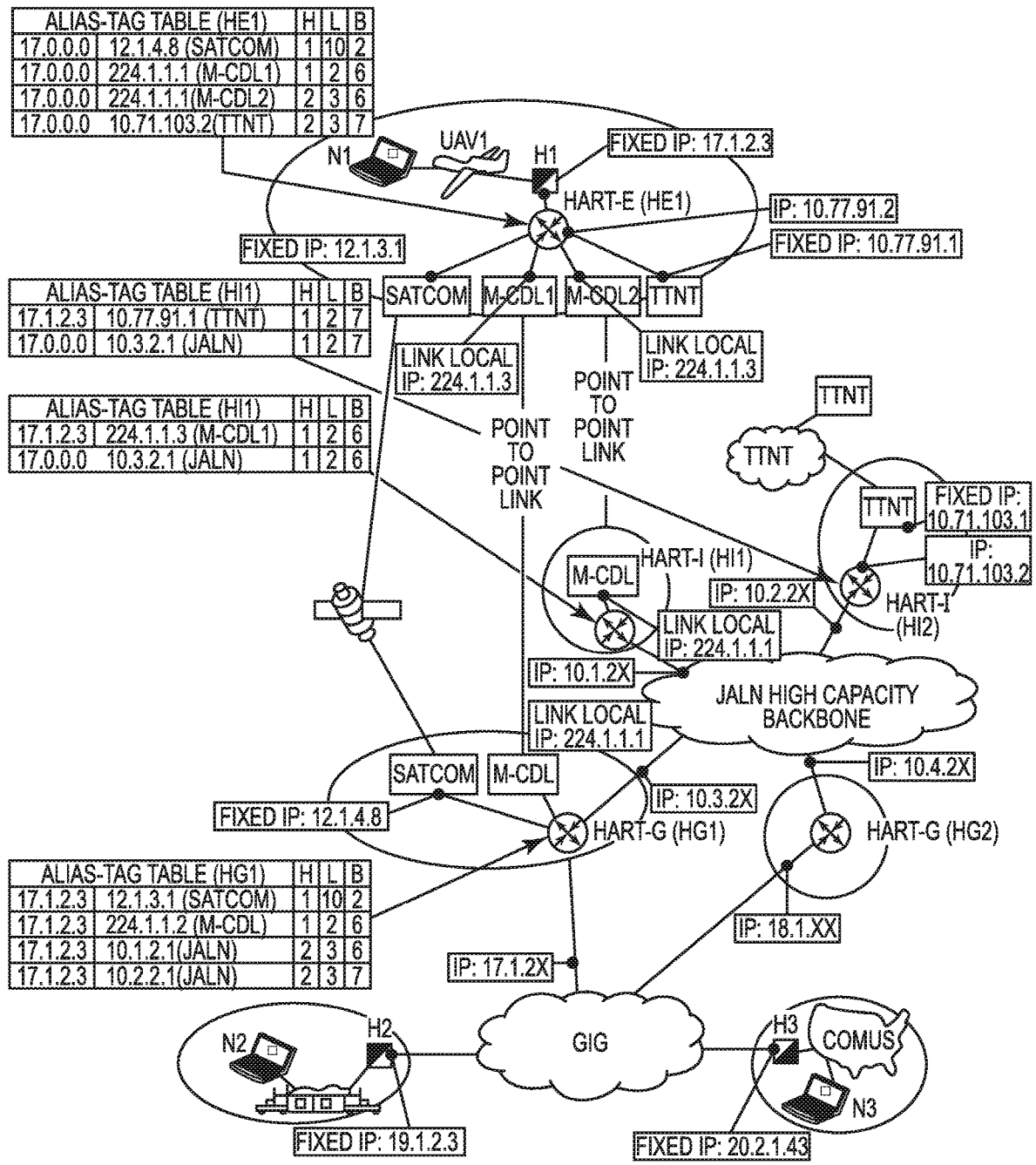
FIG. 12 is an illustration of the multi-subnet network of FIG. 11 with completed alias-tag tables.

When a Node Joins the network, HART routers (e.g., Hart routing modules 702-705) monitor and probe the network to test links and configure the alias-tag tables that will be used for address switching later. The process is described below.
Step 1:
Establish each link from that node to the existing network
Add alias-tags at various endpoints in the network to enable address switching (faster than routing) (enabled by HART dynamic address and label tracking)
a. Step 2:
SatCom connects: Uses fixed SatCom IP to connect to the other SatCom endpoint (12.1.4.8)
HE1 adds an alias-tag for 17.0.0.0->12.1.4.8
HG1 adds an alias-tag for 17.1.2.3->12.1.3.1
a. Step 3:
First Mini-CDL Radio connects
a. Establishes "link local" addresses on both endpoints
HE1 adds an alias-tag for 17.0.0.0->224.1.1.1
HG1 adds an alias-tag for 17.1.2.3->224.1.1.2
a. Step 4 (FIG. 11):
Second Mini-CDL Radio connects
a. Establishes "link local" addresses on both endpoints
b. HI1 requests 224.1.1.2 first, but HE1 already is using, so responds with 224.1.1.3
HE1 adds an alias-tag for 17.0.0.0->224.1.1.1
HI1 adds an alias-tag for 17.1.2.3->224.1.1.3
HI1 forwards alias-tag to HG1, HG1 adds it as:17.1.2.3->10.1.2.1 (arrow in FIG. 11)
HI1 adds reverse alias-tag
a. Step 5:
TTNT Radio connects
a. Uses fixed TTNT IP to connect to the TTNT cloud
b. Finds default router in TTNT cloud (HI2)->sets default router to HI2
HE1 adds an alias-tag for 17.0.0.0->10.71.103.2
HI2 adds an alias-tag for 17.1.2.3->10.77.91.1
HI2 forwards alias-tag to HG1:17.1.2.3->10.2.2.1
HI2 adds reverse alias-tag
The completed alias-tag tables are shown in FIG. 12.
Packet Routing and Rerouting
To route data from H2 (Gnd) to H1 (Air):
Packet leaves H2
a. Packet: Src=19.1.2.3; Dst=17.1.2.3; Data
b. H2→GIG→HG1
HG1 looks up H1
a. Next hop=224.1.1.2(M-CDL): <=1 hop→no address switching
b. Packet: Src=19.1.2.3; Dst=17.1.2.3; Data
c. HG1→M-CDL→HE1

Figure 13:
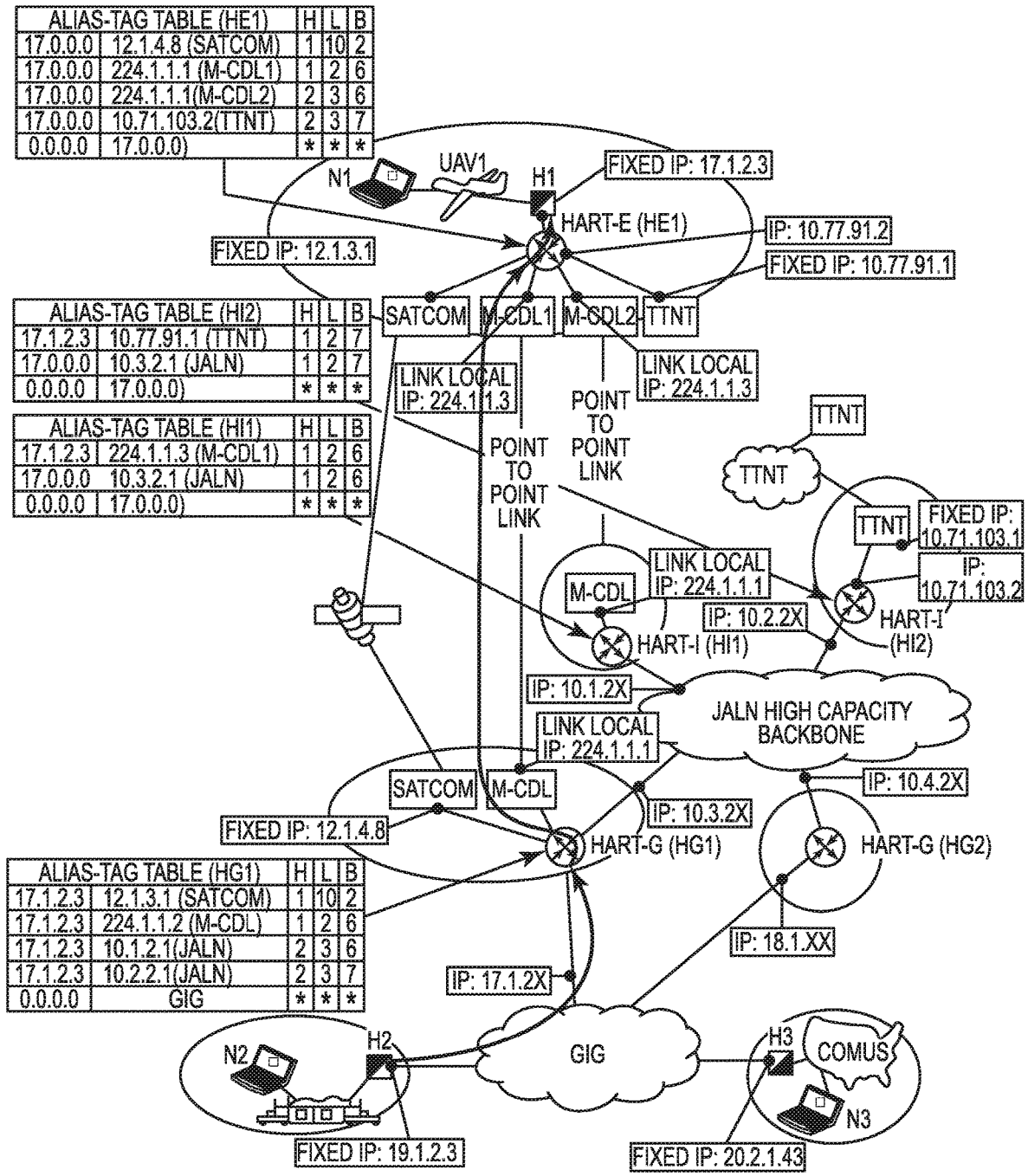
FIG. 13 is an illustration of the multi-subnet network showing an example of a data path route.
Figure 14:
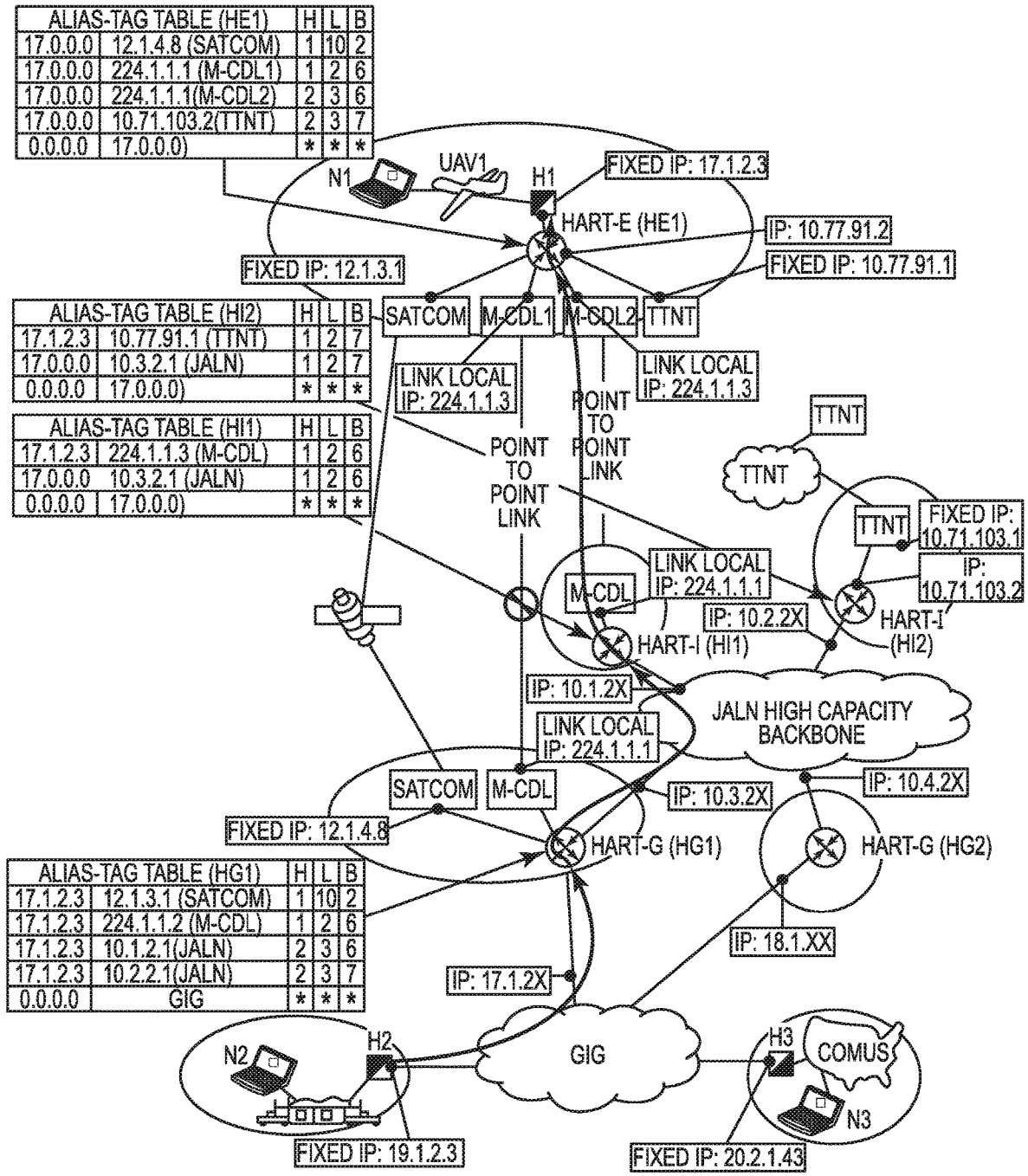
FIG. 14 is an illustration of the multi-subnet network showing dynamic failover and rerouting along a different path.
Figure 15:
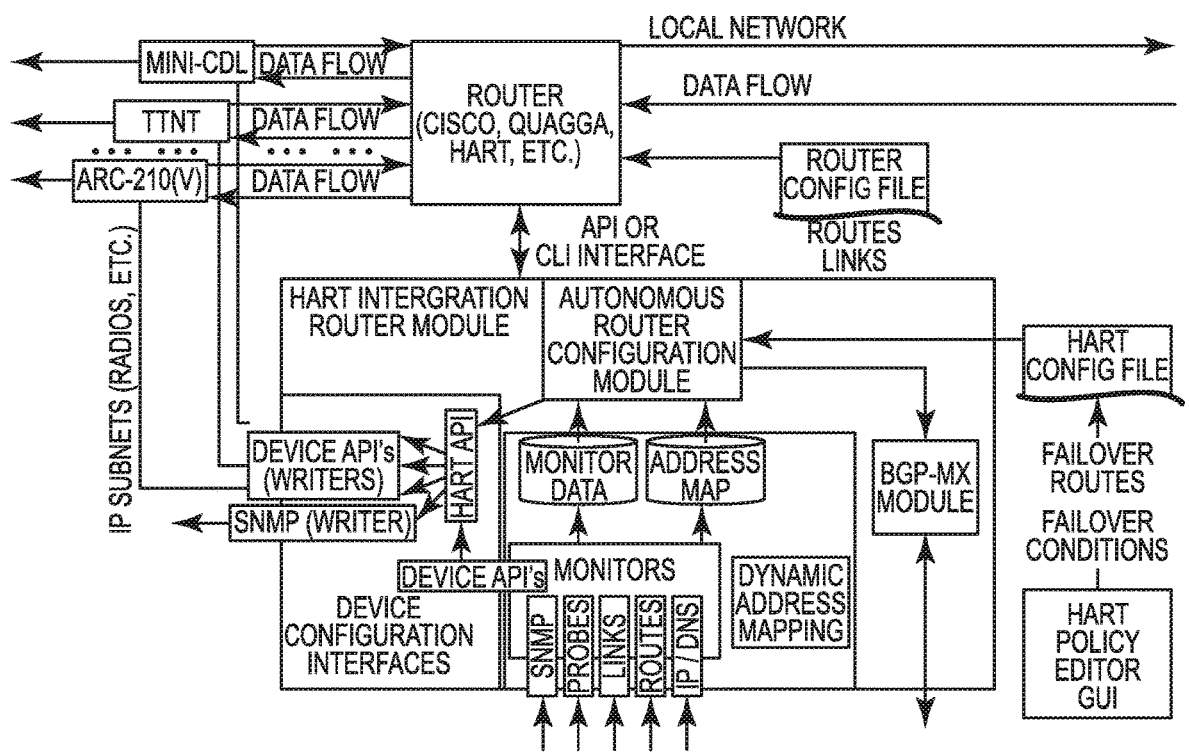
FIG. 15 is a detailed architecture overview of a router constructed in accordance with an embodiment of the present invention.

HE1 receives
a. Packet: Src=19.1.2.3; Dst=17.1.2.3; Data
b. HE1→H1
c. See FIG. 13
But then an error causes the M-CDL1 link to fail. The flow (H2 (Gnd) to H1 (Air)) is rerouted:
HG1 looks up next path to H1
a. Next hop=10.1.2.1(JALN): 2 hop→address switching
b. Packet: Src=19.1.2.3; Dst=10.1.2.1 (JALN); Dst'=17.1.2.3; Data
c. HG1→JALN→HI1
HI1 looks up H1
a. Next hop=224.1.1.3(M-CDL): <=1 hop→no address switching
b. Restore packet: Src=19.1.2.3; Dst=17.1.2.3; Data
c. HG1→M-CDL→HE1
HE1 receives
a. Packet: Src=19.1.2.3; Dst=17.1.2.3; Data
b. HE1→H1
c. See FIG. 14
HART Router Features
The above use case illustrates the HART functionality to provide dynamic network convergence. To do this HART uses three flavors of the Integration router:
a. HART-Edge Routers
b. HART-Interior Routers
c. HART-Gateway Routers
The HART-Edge Routers have these features:
a. Reads and acts on HART Policies.
b. Local topology and link quality monitors (SNMP, and other APIs).
c. Autonomous device, router and radio configuration (SNMP, and other APIs).
d. Forwards data to HART-Interior nodes using (address switching, IP routing, bridging, and repeating).
The HART-Interior Routers, same as HART-E, plus these features:
a. Same as HART-Edge Routers.
b. Autonomous data switching and routing (address switching, IP routing, bridging, and repeating).
i. Advanced routing/switching to other subnets and hosts.
ii. Ability to setup/configure tunnels.
Regional/Domain monitoring of node availability, topology (next hop, path), names, connection status, and quality (SNMP, and other).
a. Stores this data in an internal table to use for routing/switching data.
b. Shares this data with neighbor HART routers.
Capable of using OSPF and other generic or "default" routing algorithms (enhanced with link quality metrics).
The HART-Gateway Routers, same as HART-I, plus these features:
Same as HART-Interior Routers.
Collects and Tracks IP addresses and next-hop information for nodes on the hybrid network. This data is used to update the dynamic address links (e.g., alias tags) so nodes outside the dynamic hybrid network can reach the nodes as they move and shift addresses within the hybrid network.
BGP and BGP-MX mobility extensions to interconnect (link, route, switch) to external networks (GIG, other Autonomous Systems [ASes]).
HART Architecture Overview
Each of the three flavors of routers is built from the same core components. These components are shown in Error! Reference source not found. and described in further detail below.

HART Monitors

This is the HART Topology and Address Tracking system. The HART monitors are a collection of monitoring and capture tools that gather data about the network, nodes, links, topology, quality, etc. These tools use various methods to collect and gather this data from many sources: SNMP, Radio APIs, network probes, etc. As this data is collected it is stored in two databases. The first stores the majority of monitored data (topology, link quality metrics, etc.) the second is the address map database that stores the alias-tag tables that are used for routing. The address map is constantly maintained and kept small to enable fast routing lookups.

Node trackers—SNMP readers (routes, address, location, etc.)

Address and label monitor—(new IP's linked to old/existing names, IP changes for names, red/black concerns, DNS probes, etc.)

Link quality probes a. Monitor link quality, bandwidth, latency, packet loss, # of retransmits, usage level, available bandwidth (total-used), etc. These are combined through a formula to determine a Link Quality Metric (LQM)

b. Characterize static link and network performance, bit error rate, packet loss.

As nodes are discovered they will be added to the tracking data by using "Node Join" commands.

Dynamic address mapping and topology tracking module integrates with the monitor and database components to follow dynamic mobile nodes and update the mappings of links to the fixed addresses of edge platforms. This allows GIG connected nodes to find and route traffic to dynamic mobile end points with minimal overhead. This service is also used to track and link DNS names of mobile nodes with alternative IP addresses (maintained by HART) to reach those nodes.

Integrate with HART Monitors

Store most current data about network status, IP addresses of nodes, link status and link quality Track Link/Flow Detail Records Topology and Address Tracking—Dynamic Address Mapping and name tracking a. Track a platform's "permanent IP" and DNS names (through different radio subnets)

b. Link "permanent IP" to 1 or all dynamic IPs within the tactical-AS for the node (each radio subnet may have a different IP or range)

c. HART should act as a proxy for a DNS server requests d. Level and amount of Topology and Address Tracking data stored by HART on a node depends on if the node is a HART-Edge (next hops, default routes), HART-Interior (region or AS based data), or HART-Gateway (GIG scale, multi-AS, very large scale)

Works in Red/black networks (Black side only, but be aware of red side effects)

Alias-tag Table

As discussed above, each HART node maintains a table of "alias tags" (incl. address labels and "next hops") to reach specific final destinations (e.g., end points or subnets). Alias tags are used for the address switching done by HART. These tags are also used as routes to nodes and subnets.

As discussed above, each alias-tag can include:

Destination

Next hop (e.g., Local radio or subnet to use)

Link Quality Metric (LQM)

Link/route Capacity (or bandwidth)

An example alias-tag is shown in FIG. 8B.

The LQM is calculated based on some combination of number of hops to get to the destination through that radio subnet (H); and expected latency to get to the destination through that radio subnet (L) calculated over some time period. The H, L and capacity values are the minimal values for link quality selection. Other values that may be used include:

Name (Node name, DNS, etc.)

Location (lat., long.)

Other link quality metrics, such as: (ave. packet loss, ave. # of retransmits, bit error rate) can also be used.

HART-E routers maintain only a limited table (an alias-tag table 800) of how to connect to the larger network and default routers (or the closest HART-I or HART-G router), an example format of this data is shown in FIG. 8B. HART-I and HART-G routers maintain alias-tags in their alias-tag table 800 that allow cross routing and switching between radio subnets without requiring to route through a GIG node.

(Note: H, L, B will be replaced with LQM and Capacity)

The HART autonomous router configuration (ARC) module uses OSPF and the information from the TAT Database to make routing decisions and to auto configure various aspects of the network and resources. This module is able to send data by routing, address switching, bridging or repeating. It is able to replicate and load balance data across multiple links as well. This module also integrates with existing routers through OSPF, RIP or other standards.

Integrate with (use) Topology and Address Tracking tables (alias-tags).

Act autonomously using policies as framework.

IP address assignment if appropriate a. Coordinate across the entire hybrid tactical-AS b. IPv4 & IPv6 address spaces c. Push address changes to node configuration writers Able to send data by address switching, routing, tunneling, bridging or repeating Make dynamic data forwarding decisions a. Implement OSPF between HART nodes b. Route from 1 subnet type to another (TTNT to Mini-CDL)

c. Leverage commercial router practices (OSPF, RIP or other standards) that provide a common switching fabric while interchanging line cards operating at different data rates (i.e. T1, DS-3, OC-192)

d. Develop and demonstrate static routing (mesh, ring, etc.) between subnets e. Develop and demonstrate mobile ad hoc routing between multiple subnets node join/leave, net join/leave f. Subnet handoff (node moves from TTNT to QNT, or moves from TTNT and adds mini-CDL, and other use cases)

g. Replicate (increase reliability) and load balance data (increase throughput) across multiple links.

h. Develop, demonstrate and analyze multi-link, multi-channel, multi-antenna multi-path routing and communications topology configurations i. Autonomously provision tunnels/links/flows Use quality aware extensions a. Use monitored link quality data (e.g., monitored data of HART-level network links) to update the link metrics of routing protocols (OSPF, etc.) so routers (non-HART also) can optimize based on link quality. Thus, the HART routers can determine a quality for the HART-level link between two adjacent hops on a network route. As described above with respect to FIG. 7, this HART-level link can be made up of multiple smaller "local" (e.g., intra-subnet) links, which together form the HART-level link (communicative coupling) between the two HART routers. The quality for the HART-level link is based on a combination of the qualities of each individual local link on the HART-level link. The qualities of each individual local link can be combined to form the HART-level link quality (an example of which is the LQM values discussed herein) in any suitable manner. The particular characteristics of the HART-level link that are determined (e.g., monitored) include any of the link quality characteristics described herein such as bandwidth, latency, packet loss, # of retransmits, usage level, available bandwidth (total-used). The HART-level link quality can be monitored based on data form the link quality monitors described herein. The HART-level link quality value(s) can then be input into the link quality value of a conventional routing protocol, such as OSPF, running on the router. Since conventional routing protocols measure only the local link coupling the router to its adjacent "local" node, the quality value in the conventional routing protocol may not be indicative of the quality of the HART-level link. Thus, the HART algorithm operates on top of the conventional routing protocol and replaces the conventional routing protocols link quality value with the determined HART-level link quality value for the HART-level link corresponding to that local link of the conventional routing protocol. The HART routers can then run the conventional routing protocols in their normal manner with the updated link quality information and the conventional routing protocols will make routing decisions based on this updated link quality information. Examples of such routing decisions are provided below with respect to FIGS. 23-25B as well as elsewhere, and is also referred to as Quality-Aware Routing.

i. Develop, demonstrate and analyze link fade, optical polarization rotation, pointing and tracking, antenna gain, link margins, and bit error rates.

ii. Update link metrics in local and remote routers and devices.

Integrate with existing routers through OSPF, RIP or other standards.

HART Routing Priority and Format

The HART routing modules 702-705 can tunnel packets from a first routing module 702 to a second, peer, routing module 704 using a modification of Minimal Encapsulation (ME) tunneling. ME tunneling is described in the RFC 2004 standard. The modification includes using ME tunneling for one or more initial packets in a data flow and then switching to use a "cut-through routing" technique, which is described below. These techniques can be used to send packets through incompatible subnets 708-710, or through subnets 708-710 that do not compatibly export routing information to route packets to the final destination.

Tunneling techniques such as General Routing Encapsulation (GRE) protocol add a full IP header (20 bytes) and a GRE header (4 bytes) to each packet. This overhead consumes part of the available bandwidth. Minimal Encapsulation tunneling mitigates the overhead by using a shorter header for the tunnel (8 or 12 bytes) to reduce the footprint of the tunnel.

The HART routing modules 702-705 use each of GRE tunneling, ME tunneling, and the cut-through routing technique send packets through the network of routing modules 702-705. GRE tunnels are used to pass control packets for routing protocols, such as OSPF. GRE tunnels are also used for tunneling a packet to a non-peer device (i.e., a device that does not support the combined approach of ME tunnels and CTR discussed below). The combined approach of ME tunnels and CTR can be used for all other packets, including packets carrying data to/from endpoint devices (e.g., device 712, 714).

The combined approach of ME and CTR uses ME for some packets in a data flow (e.g., conversation) and uses CTR for the remaining packets in the data flow. In an example, ME is used for some packets to set-up and maintain the state information for the data flow and CTR is used for the remaining packets.

In an example, one or more initial packets in a data flow can be sent using ME. ME swaps the IP address in the destination IP address field of an IP header of an incoming packet with a temporary IP address corresponding to the next hop routing module 702-705. The original IP address is saved in an options field of the IP header of the outgoing packet. ME tunneling is also referred to as "address switching".

Figure 16:
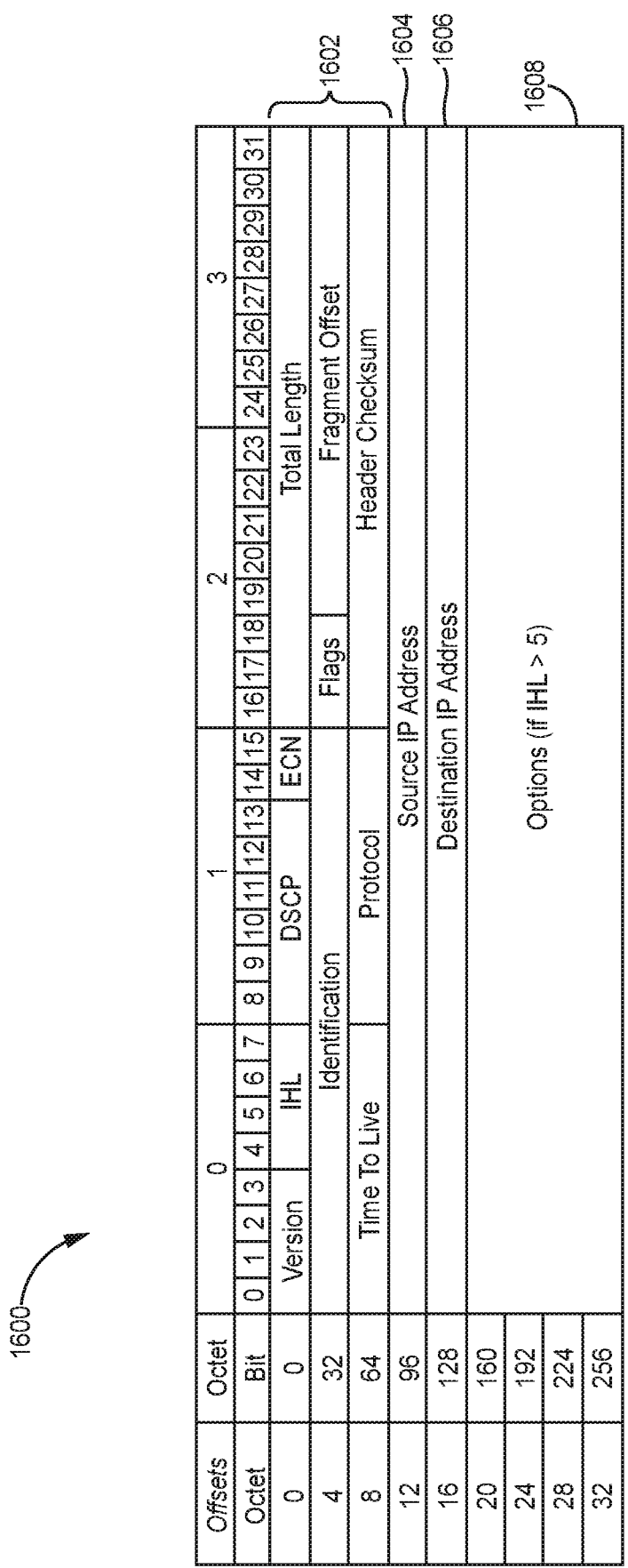
FIG. 16 is a table showing the format of an IP header according to the IPv4 standard.

FIG. 16 is a table showing the format of an IP header according to the IPv4 standard. The IPv4 standard is described in the Internet Engineering Task Force (IETF) publication RFC 791. The IP header in the IPv4 standard includes 13 required fields 1602, 1604, 1606, and may optionally include a 14$^{th}$ options field 1608. The 13 required fields 1602, 1604, 1606 include the first 11 fields 1602: Version, Internet Header Length (IHL), Differentiated Services Code Point (DSCP), Explicit Congestion Notification (ECN), Total Length, Identification, Flags, Fragment Offset, Time to Live, Protocol, and Header Checksum, as well as the Source IP Address field 1604, and Destination IP Address field 1606. The IPv4 header includes octets 19 if no options field is included and from up to 35 octets if the full options field is included. The first 11 fields 1602 are in octets 0-11. The source IP address field 1604 is in octets 12-15 and the destination IP address field is in octets 16-19. The optional options field 1608 is included in octets 20 up to 25.

Figure 17A:
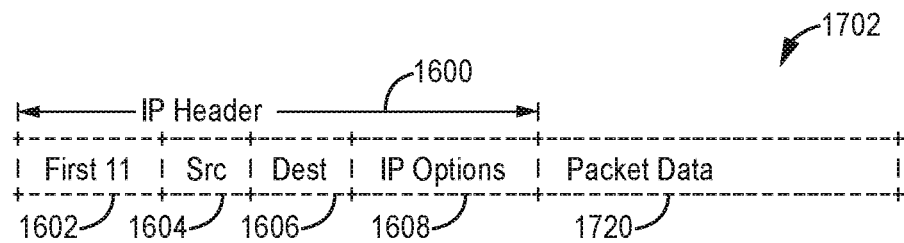
FIG. 17A is an illustration of an example non-address switched IP packet.

FIG. 17A is an illustration of an example non-address switched IP packet 1702. As shown, the IP packet 1702 includes an IP header 1600 followed by a data field 1720. The IP header 1600 includes the first 11 fields 1602, the source IP address field 1604, the destination IP address field 1606, and optionally the options field 1608. In the non-address switched IP packet 1702, the source IP address field 1604 contains the IP address (shown as "Src") of the source of the packet 1702. The destination IP address field 1608 contains the IP address (shown as "Dent") of the final destination of the packet 1702.

Figure 17B:
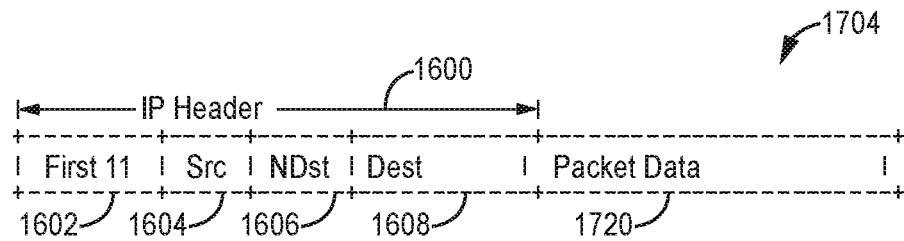
FIG. 17B is an illustration of an example address switched IP packet according to the minimal encapsulation tunneling protocol.

FIG. 17B is an illustration of an example address switched packet 1704 as generated by a HART routing module 1602, 1604, 1606 implementing its ME tunneling on the non-address switched packet 1702. That is, the packet 1704 is an example of an outgoing packet sent when implementing the ME tunneling on the packet 1702 as an incoming packet.

Similar to the non-address switched packet 1702, the address switched packet 1704 includes an IP header 1600 followed by a data field 1720. As the address-switched packet 1704 is used to send the data of the original non-address switched packet 1702, the data field 1720 of the address switched packet 1704 is a copy of (identical to) the data field 1720 of the original packet 1702.

The IP header 1600 of the address switched packet 1704 includes the first 11 fields 1602, the source IP address field 1604, the destination IP address field 1606, and the options field 1608. Instead of including the IP address ("Dest") of the final destination, the destination IP address field 1606 includes the HART level next hop address (shown as "NDst") for a network route to the final destination from the HART routing device 1602 sending the packet 1704. The IP address ("Dest") of the final destination is then included in the options field 1608 of packet 1704 along with any other options data as desired.

Figure 17C:
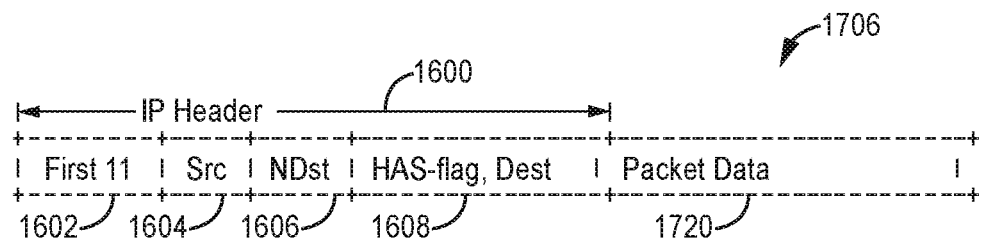
FIG. 17C is an illustration of another example address switched IP packet according to the minimal encapsulation tunneling protocol.
Figure 17D:
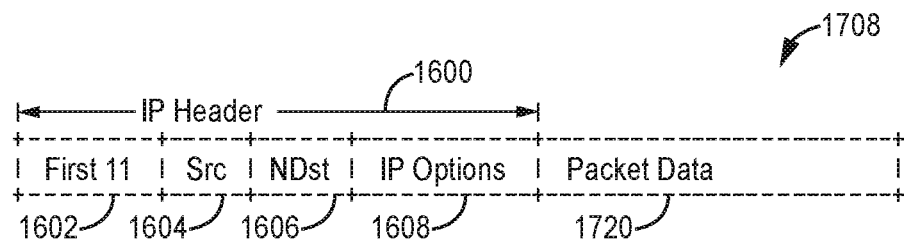
FIG. 17D is an illustration of an example address switched IP packet according to the cut-through routing protocol.

FIG. 17C is an illustration of another example address switched packet 1706 as generated by a HART routing module 1602, 1604, 1606 implementing its ME tunneling on the non-address switched packet 1702. The address switched packet 1706 is identical to the address switched packet 1704, except that a flag (also referred to here as a HAS-flag) is included in the options field 1608 along with the IP address of the final destination and any other options data. The HAS-flag is used to indicate to the next hop peer routing module 1602, 1604, 1606 that the packet 1706 is an address-switched packet as well as to identify a data-flow (conversation) to which the packet 1706 corresponds. The HAS-flag can indicate an address switched packet and/or can be a specific DSCP value or an IP Protocol code (or combination of these indicators).

As an example, a routing module 702 receiving an incoming non-address packet 1702 (e.g., from device 712) with an IP address in its destination IP field 1606 corresponding to device 714, generates an outgoing address switched packet 1704, 1706 having the IP address in the destination IP field 1606 switched, such that the IP address in the destination IP field 1606 of the IP header of the outgoing packet 1704, 1706 is an IP address corresponding to the next hop peer routing module 704 on a HART level network route from the current routing module 702 to the final destination (device 714). The IP address that was in the destination IP field 1606 of the incoming packet 1702 is included in the options field 1608 of the IP header 1600 of the outgoing packet 1704, 1706.

A routing module 702 uses its alias-tag table 800 to determine what the next hop for an incoming packet 1702 is. Since the alias-tag table 800 associates a destination with a next hop peer routing module, the routing module 702 can determine a next hop peer routing module by finding alias-tags 802 with destination IP addresses corresponding to the IP address in the destination IP field 1606 of the incoming packet 1702. The IP address of the next hop in such an alias-tag 802 can be used for the IP address in the destination IP address field 1606 of the outgoing packet 1704, 1706. In situations in which there are multiple network routes to a given destination (and correspondingly multiple alias-tags) the routing module 702 can select one of the network routes according and use the next hop for that network route in the destination IP address of the outgoing packet 1704, 1706. The selection of which network route to use can be accomplished in any suitable manner including through the replication and/or load balancing processes described herein.

The data field 1720 of the outgoing packet 1704, 1706 is identical to the data field 1720 of the incoming packet 1720. In fact, both the IP header 1600 and IP data field 1702 of the outgoing packet 1704, 1706 can be identical to the IP header 1600 and IP data field 1720 of the incoming packet 1702, with the exception that the destination IP field 1606 of the outgoing packet 1704, 1706 includes the next hop address instead of the final destination and the final destination is included in the options field 1608. Using this approach can add 8-12 extra bytes to the outgoing packet 1704, 1706 compared to the incoming packet 1702, wherein the extra bytes are used for the inclusion of the original IP address (final destination) in the options field 1608 of the outgoing packet 1704, 1706.

The above description corresponds to the ME protocol at an initial routing module 702 on the network route implementing ME tunneling. An "initial routing module" is a routing module that receives an incoming non-address switched packet 1702. Intermediate routing modules 704 on the network route implementing the ME tunneling operate in a similar, but slightly different manner. As used herein an "intermediate routing module" is a routing module that is along a network route after the initial routing module, and two or more HART level hops away from a final destination. Routing modules that are less than two hops away from a final destination are referred to herein as "final routing modules".

It is slightly different for the intermediate routing modules, because the intermediate routing modules receive an incoming packet 1704, 1706 that already has its address switched and includes the IP address of the final destination in its options field 1608. In the example of a packet sent from device 712 to device 714 along the network route shown in FIG. 7, routing module 703 is an intermediate routing module because there are two HART level hops (routing module 704 and routing module 705) between routing module 703 and device 714. The intermediate routing module 703 again switches-out the IP address in the destination IP address field 1606 to generate an outgoing packet 1704, 1706 having an IP address in its destination IP address field 1606 corresponding to the next hop from that intermediate routing module 703 on a network route to the final destination. In the example of a packet going from device 712 to device 714, the next hop IP address for routing module 703 corresponds to routing module 704. The intermediate routing module 703 determines what the next hop is by identifying the final destination in the options field 1608 of the IP header 1600 of the incoming address switched packet 1704, 1706.

A final routing module, which is less than two HART level hops away from a given HART routing module on a network route does not send an address switched packet 1704, 1706. Instead, the outgoing packet from that HART routing module is reformatted back to a non-address switched packet 802, with the IP address of the original (final) destination in its destination IP address field 1606. The IP address of the original destination can be used because a packet with an IP address of the final destination can be routed through the local subnet by virtue of the next hop routing module 705 advertising its connection to the IP address or IP address space of the final destination using the IP based protocol of that subnet. In the example recited above where a packet is sent from device 712 to device 714, routing module 704 is one hop away from device 714—the one hop being the routing module 705. Routing module 704, therefore, receives an incoming address switched packet 1704, 1706, and generates an outgoing non-address switched packet 1702 based on the incoming packet 1704, 1706. Similar to the intermediate routing module 703, the final routing module 704 can identify the IP address of the final destination from the IP address being included in the options field of the incoming address switched packet 1704, 1706.

In the example of a packet sent from device 712 to device 714, the routing module 705 is also a final routing module and does not need to implement address switching. After receiving the non-address switched packet 1702, the final routing module 705 can route the non-address switched packet towards the final destination using any appropriate (e.g., conventional) routing protocol. The outgoing packet will then be routed to its final destination using the local routing protocols of any subnet in which the final destination is present.

As should be understood, a given routing module 702-705 may be any one or more of an initial routing module, intermediate routing module, or final routing module and will likely be all three concurrently as the initial, intermediate, and final designation of a routing module is not indicative of the physical construction of the routing module, but rather is indicative of the position of the routing module along a particular network route. Thus, a single routing module 702-705 may simultaneously be an initial routing module for a first network route, an intermediate routing module for a second network route, and a final routing module for a third network route.

As mentioned above, the HART routing modules 702-705 can use the ME tunneling protocol for one or more initial packets in a data flow as well as some later packets during a data flow to maintain state information. Where possible the HART routing modules 702-705 can learn and save next hops (paths and routes) to be used for a conversation. This will remove the need to include the Dest in the options field 1608 of every packet, removing the overhead from later packets in the conversation. Thus, the routing modules 702-705 can implement CTR tunneling, which does include the Dest in the options field 1608 of a packet, after one or more ME tunneled packets in the data flow.

To learn and save the next hops (paths and routes) for a conversation, while the initial one or more packets in a data flow (conversation) are sent using the ME tunneling protocol, the routing modules 702-705 on the network route can save an association between the data flow of the ME tunneled packets and one or more next hops for the data flow. Saving an association between one or more next hops and a data flow can be done by saving data flow identifying information from the incoming packet along with an association between that identifying information and the one or more next hops for that data flow. Data flow identifying information is any information in a packet that can be used to reliably identify which data flow a packet corresponds to.

The information in a packet that can be used to reliably identify the data flow depends on a type of the IP packet. For unencrypted IP packets, example data flow identifying information in an IP header 1600 includes the value in the DSCP field, as well as the IP address in the source IP address field 1604. Additionally, example data flow identifying information includes values in the options field 1608 of the IP header 1600, such as a flag (e.g., HAS-flag) added to the options field 1608 by the routing modules 702-705. In examples in which a flag is added to the options field 1608 by the routing modules 702-705, the initial routing module (e.g., routing module 702) on a network route performing the ME and CTR combination tunneling can generate the flag and add it to its outgoing address switched packet 1804, 1806. The downstream routing modules (e.g., routing modules 703-705) can then copy/include that same flag in the outgoing address switched packets based on this incoming address switched packet. In some examples, the routing modules 702-705 can include a custom value in the identification field or fragment offset field, which are respective fields in the first 11 fields of the IP header 1600. The custom value can be used to identify the data flow to which the packet corresponds in the same manner as a flag added to the options field.

If the unencrypted IP packet encapsulates a TCP segment, example data flow identifying information includes, in addition to the above, the values in the source port field or destination port field of the TCP segment. A TCP segment is defined in RFC 793 published by IETF. As known, when a TCP segment is encapsulated by an IP packet, the TCP segment is included in the data field 1820 of an IP packet, and includes a TCP header followed by a TCP data field. The source port field and destination port field of a TCP segment are included the TCP header of the TCP segment.

Figure 18A:
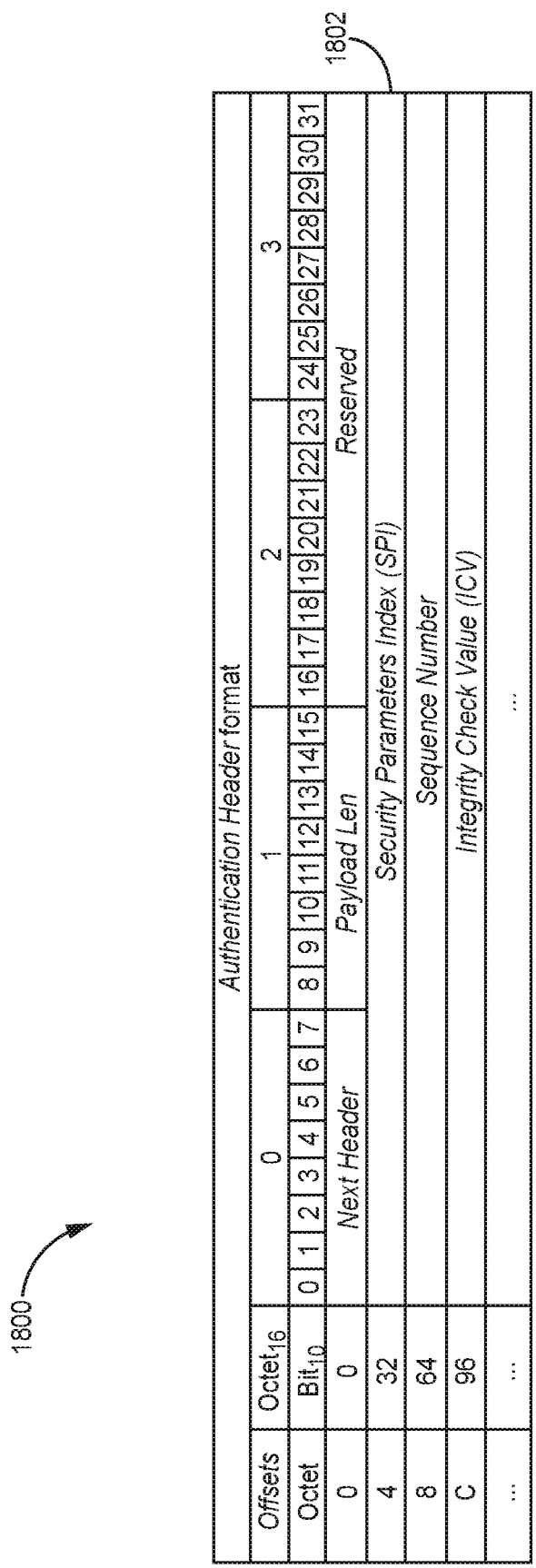
FIG. 18A is a table of an example authentication header, which can be added to an IP packet in accordance with the IPsec standard.

If the IP packet is sent in accordance with the IP Security (IPsec) protocol, other example data flow identifying can be used. The IPsec protocol is standardized by the Internet Engineering Task Force. FIG. 18A is a table of an example authentication header 1800, which can be added to an IP packet in accordance with the IPsec standard. The authentication header 1800 can be added to an IP packet to provide authentication for the IP packet. The authentication header 1800 includes several fields including the security parameters index (SPI) field 1802. The SPI field 1802 is an identification tag that identifies a data flow to which the packet corresponds. For packets sent with an authentication header 1800, in addition to the above example data flow identifying information, the value in the SPI field 1802 is an example of data flow identifying information.

Figure 18B:
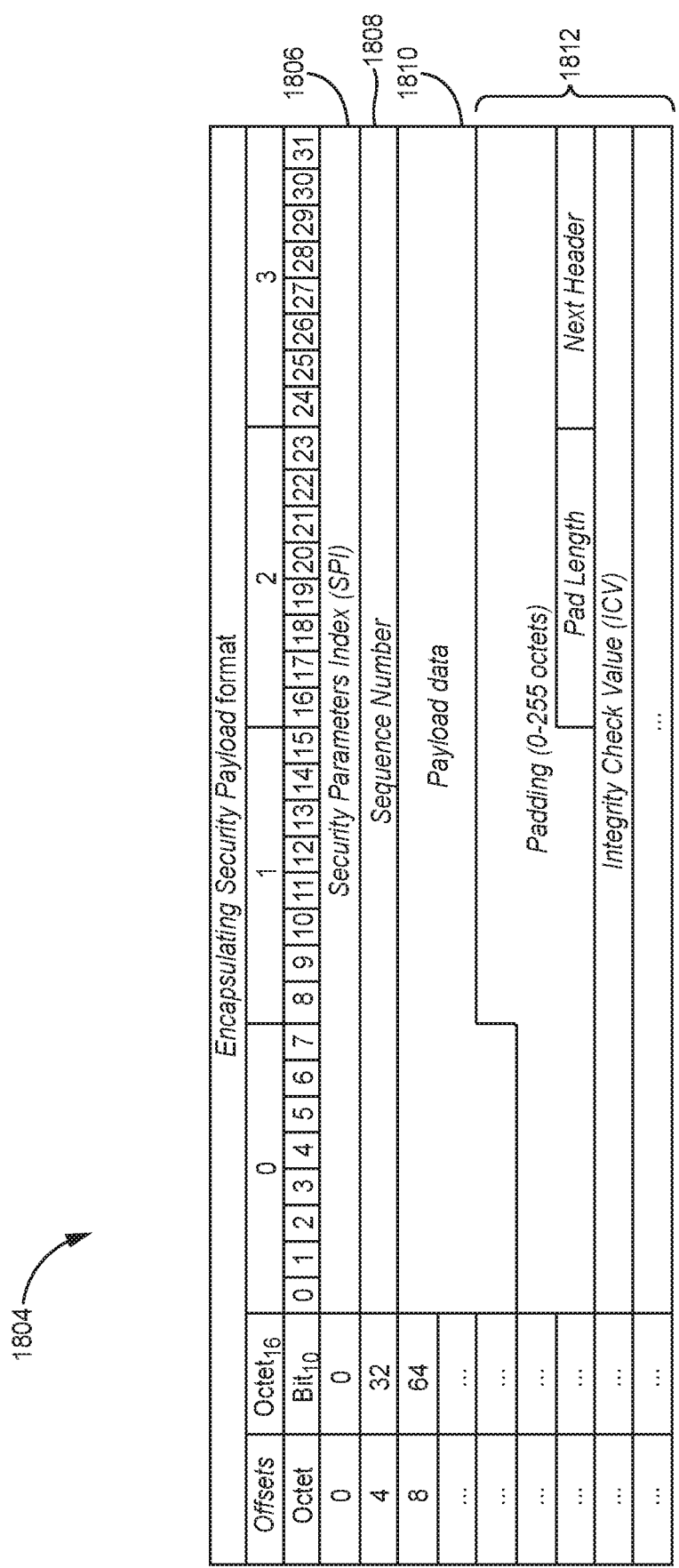
FIG. 18B is a table of an example encrypted packet.

For IP packets that are encrypted, the information in the IP data field is encrypted, and therefore not accessible to the routing modules 702-705. Accordingly, for encrypted IP packets encapsulating a TCP segment, the values in the source port field and destination port field cannot be used as data flow identifying information. FIG. 18B is a table of an example encrypted packet 1804. The encrypted packet 1804 is encrypted in accordance with the encapsulating security payload (ESP) member of the IPsec standard. The ESP encrypted IP packet includes an SPI field 1806 followed by a sequence number field 1808, a data field 1810, which is followed by padding and other fields 1812. Similar to the authentication header 1800, the SPI field 1806 in an ESP packet 1804 is an identification tag that identifies a data flow to which the ESP packet 1804 corresponds. The value in this SPI field 1806 is another example of data field identifying information that can be used by the routing modules 702-705.

In some example, multiple items of information can be used together as data flow identifying information. For example, both the source IP address along with either the value in the DSCP field or the value in the SPI field can be used to identify the data flow identifying corresponding to a packet. Other combinations of information are also possible.

In any case, while a routing module 702-705 is performing address switching according to the ME tunneling protocol, the routing module 702-705 can save the data flow identifying information for that packet along with an association between that data flow identifying information and one or more next hops for that data flow.

The one or more next hops for a data flow can be determined from the alias-tag table 800 maintained by the routing module 702-705. As discussed above, the alias-tag table 800 lists the next hop for each network route to a final destination. Accordingly, the one or more next hops for a data flow are the one or more next hops in the alias-tag table 800 that correspond to the final destination. One next hop will be included in the alias-tag table 800 for each network route to the final destination. Accordingly, the routing module 702-705 can save an association between the data flow identifying information and each alias-tag corresponding to the final destination for that data flow.

Once the association between the data flow and the one or more next hops is saved, the routing modules 702-705 can switch from ME tunneling to cut-through routing (CTR) tunneling any one or more of the remainder of the packets of that data flow.

FIG. 17C is a table of an example packet 1708 in accordance with CTR. CTR tunneling is similar to ME tunneling except the IP address of the final destination is not included in the options field 1608 of the address switched packet 1708. The CTR address switched packet 1708 includes an IP header 1600 and an IP data field 1820. The IP header 1600 includes the first 11 fields 1602, the source IP address field 1604, the destination IP field 1606, and, optionally, the options field 1608. The IP address of the next hop routing module 702-705 is included in the destination IP address field 1606 of the address switched packet 1708 in the same manner as described above for the ME tunneling protocol.

In contrast to the ME tunneling protocol, however, the IP address of the original (final) destination of the packet 1708 is not included in the options field 1608 of the address switched packet 1708 or anywhere else within the IP header 1600 or data field 1820 of the address switched packet. Thus, the CTR address switched packet 1708 has a reduced overhead as compared to an ME tunneling address switched packet 1704, 1706. That is, a CTR address switched packet 1708 can use fewer bytes because of the lack of inclusion of the IP address of the final destination in the address switched packet 1708. This can be from 4 to 12 bytes reduced from a corresponding ME tunneling address switched packet 1704, 1706, enabling the CTR address switched packet 1708 to have the same overhead (i.e., use the same number of bytes) as a non-address switched packet 1702 off of which the CTR address switched packet 1708 is based. In examples in which a flag (e.g., HAS-flag) is added to the options field 1608 of the address switched packet 1708 to indicate an address switched packet and identify a data flow, the flag would add some additional overhead to the address switched packet 1708 as compared to a non-address switched packet 1702 from the which address switched packet 1708 is based.

Although the IP address of the final destination of the address switched packet 1708 is not included in the IP header 1600 of the packet 1708, downstream routing modules 702-705 receiving the address switched packet 1708 as an incoming packet can determine the next hop for the packet 1708 by comparing the data flow identifying information of the incoming packet 1708 with its saved data flow identifying information. Since the incoming packet 1708 is part of a data flow in which the initial packets were sent using ME tunneling, and data flow identifying information was saved by the routing module 702-705 during routing of the ME address switched packet 1704, 1706, the data flow identifying information from the incoming packet 1708 will match the saved data flow identifying information corresponding to the data flow of the incoming packet 1708. The routing module 702-705 identifies this match and uses the one or more next hops that are associated with the matching data flow identifying information to generate its outgoing packet.

If the downstream routing module is an intermediate routing module (e.g., routing module 703 for a packet sent from device 712 to device 714 in network 700), a routing module 703 receiving an incoming CTR address switched packet 1708 generates a corresponding outgoing CTR address switched packet 1708. Accordingly, the routing module 703 generates a CTR address switched packet 1708, which has the IP address of the next hop in the destination IP address field 1606 and does not include the IP address of the final destination in the options field 1608. The intermediate routing module 1606 determines the next hop for the outgoing CTR address switched packet 1708 by identifying which data flow identifying information the routing module 703 has saved, matches the data flow identifying information of the incoming CTR address switched packet 1708 as discussed above. A next hop corresponding to the matching data flow identifying information is then included in the destination IP address field 1608 of the outgoing CTR address switched packet 1708. The intermediate routing module 703 determines whether to implement the ME tunneling protocol or the CTR tunneling protocol based on whether the incoming address switched packet is an ME address switched packet 1704, 1706 or a CTR address switched packet 1708. In particular, the intermediate routing module 703 generates an outgoing address switched packet having the same type as the incoming address switched packet. If the incoming address switched packet is an ME address switched packet 1704, 1706, the intermediate routing module 703 generates an outgoing ME address switched packet 1704, 1706. If the incoming address switched packet is a CTR address switched packet 1708, the intermediate routing module 703 generates an outgoing CTR address switched packet 1708.

For final routing modules (e.g., routing module 704 for a packet sent from device 712 to device 714) receiving an incoming CTR address switched packet 1708 non a network route, the final routing module 704 generates an outgoing non-address switched packet 1702 corresponding to the incoming CTR address switched packet 1708. The final routing module 704 can determine the IP address of the final destination by identifying the matching data flow identifying information in the manner described above. The IP address of the final destination is then included in the destination IP address field 1606 of the outgoing non-address switched packet 1702.

After the one or more initial packets in a data flow are sent using the ME tunneling protocol any number, including all, of the subsequent packets in that data flow can be sent using CTR tunneling. Thus, the vast majority of packets sent for the data flow can be sent using CTR tunneling. Over time, this has an extremely low average overhead compared to other tunneling approaches (e.g., $\frac{1}{10}$ of the overhead of GRE alone).

In an example, routing modules 702-705 are configured to determine whether to implement the ME plus CTR protocol for a given data flow by determining, for the initial packet in a data flow, first whether the selected network route for the packet is less than two HART level hops away from the final destination. If the particular routing module 702-705 is less than two HART level hops away from the final destination, address switching is not used and the packet is routed according to the routing protocols of the local subnets 708-710.

Figure 17E:
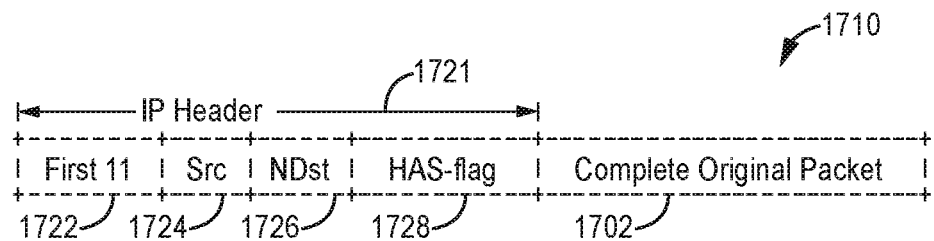
FIG. 17E is an illustration of an example full tunneled IP packet.

If the final destination is two or more HART-level hops away from the final destination, the routing module 702-705 then determines whether the next hop on the selected network route can implement the ME and CTR address switching protocols. If the next hop cannot implement the ME and CTR address switching, the routing module 702-705 sends a full tunneled packet 1710. FIG. 17E is a table of an example full tunneled packet 1710. The full tunneled packet 1710 can conform to any suitable tunneling protocol, such as GRE. The full tunneled packet 1710 encapsulates the complete original non-address switched packet 1702 inside a new packet having a new IP header 1721. That is, the original non-address switched packet 1702 including the IP header 1600 and the data field 1720 of the original non-address switched packet 1702 is included in a data field of the full tunneled packet 1710. A new IP header 1721 is then included in front of the original non-address switched packet 1702. The new IP header 1721 includes the first 11 fields 1722, the source IP address field 1724, the destination IP address field 1726, and an options field 1728. The IP address of the next hop on the selected network route is included in the destination IP address field 1726 of the new IP header 1721, and a flag can be included in the options field 1728 of the new IP header 1721. The full tunneled packet 1710 can add an additional 40 bytes to the original non-address switched packet 1702. The additional 40 bytes due to the addition of the new IP header 1721 in front of the original non-address switched packet 1702.

If the next hop can implement the ME and CTR address switching protocol, the routing module 702-705 sends an ME tunneled packet 1704, 1706 and implements the ME and CTR tunneling protocols for the data flow of that packet in the manner described above. In particular, the initial one of more packets in the data flow can be sent using the ME tunneling protocol and subsequent packets in the data flow can be sent using CTR tunneling. The number of packets in a given data flow sent using the ME protocol (prior to switched to CTR) for the initial one or more packets can be set, for example, during compile time of the routing module. In an example, the number of packets sent using the ME protocol can be set from 1 to 10 packets. Higher numbers of packets can be used to account for links with higher loss to ensure at least one ME tunneled packet gets through.

Also, as mentioned above, after switching from ME tunneling to CTR for a given data flow, the routing modules 702-705 can switch back to ME tunneling for a period of time or for a set number of packets in the data flow, after which the routing modules 702-705 can return to using CTR for the data flow. Switching to ME tunneling for a period of time or a set number of packets can be used to unsure the routing modules 702-705 have accurate data flow identifying information for the data flow. Thus, the routing modules 702-705 can verify and/or update their data flow identifying information in the manner described above based on the ME tunneled packets. In an example, the routing modules 702-705 can perform the temporary switch back to ME tunneling every X packets sent (e.g., 20 packets) or every X seconds (e.g., 10 seconds) during the data flow, whichever of the X packets or X seconds comes first. In some examples, the routing modules 702-705 are configured to perform the temporary switch back to ME tunneling on demand. For example, the routing modules 702-705 can be configured to detect errors for packets on the data flow and to perform the temporary switch back to ME tunneling if the errors reach a threshold. The threshold can be set in any appropriate manner such as a total number of errors, a frequency of errors, etc. In some examples, the routing modules 702-705 can adjust the frequency of the temporary switch back to ME tunneling and/or the number of packets sent using ME tunneling during the temporary switch back based on the detected errors. If the errors increase, the frequency of the temporary switching back and/or the number of packets sent during the temporary switch can be increased. If the errors decrease, the frequency of the temporary switching back and/or the number of packets sent during the temporary switch can be decreased. If the errors rise to a high enough level (e.g., an upper threshold), CTR can be discontinued for that data flow and ME tunneling can be used exclusively.

Although the combined ME tunneling and CTR protocol is described herein with reference to IPv4, other IP standards can also be used including IPv6.

Inter-HART Communication Commands

Inter-HART communication commands define any HART to HART messages to share data.

Leave/Join Update Message

When a node leaves one subnet or joins a new subnet, the HART routers send an update. This update will be sent on the old subnet after a timeout period. Another update will be sent on the new subnet after a join is completed. These updates will serve the purpose of informing the HART-I and HART-G routers of where edge and interior nodes can be found (after moving), and any new or updated paths to get to those nodes or quality metrics along the paths.

Node Join
Destination node
HART-E router for node
Route (Next hop) (or NULL for endpoint) (this gets filled after the first hop)
Hops (increment for each hop)
Latency
Bandwidth
TBD—Other Quality Metrics
Node Leave
Route/path Drop flag
Destination node
HART-E router for node
HART Device Configuration Interfaces HART device configuration interfaces provide the machine-to-machine interface for automatic configuration. It integrates with the other components to provide a single interface to write configuration options and settings to local and remote routers and wireless IP devices. These writer components may use SNMP and/or device specific APIs.

Provide a single configuration API to other components
Automatic configuration—HART without human involvement
a. Local and remote programmatic (API) configuration options to set various IP settings [programmatic control of each radio/device/technology]
b. Use SNMP and/or other protocols/services
c. May include radio/device specific API requirement
Device Configuration Commands Basic IP configuration of devices use (in an embodiment, minimally) the commands described below. HART defines a single, unified API to connect and set these commands for each radio device supported by HART (Mini-CDL radios, SNMP devices, TTNT, etc.).

Set/Get IP Address
Get/set flag
Interface to get/set address
Address
Subnet Mask
Default Router
Set/Get Route
Get/set flag
# of Route to set (Entry # in a table, 0=default route)
Destination (address or subnet)
Route (Next hop)
Set/Get DNS Settings (Server/Proxy Addresses)
Get/set flag
Primary DNS Server (or HART DNS Proxy)
Secondary DNS Server (or HART DNS Proxy)
Set/Get IP Address Allocation settings (DHCP)
Get/set flag
IP range Start address
IP range Stop address
Subnet Mask of Range
Default Router of Range
Primary DNS Server (or HART DNS Proxy) of Range
Secondary DNS Server (or HART DNS Proxy) of Range
HART Policy Editor The HART Policy Configuration GUI allows the user to setup and maintain the policies used by the HART routers. This tool allows the user to define the default link for traffic and the order of backup or failover links to use. Once the default is setup, the user can specify different traffic types based on matching DSCP (differentiated services code point) and/or protocol ID fields. For each traffic type a primary link can be selected and then the other links can be ordered as to which link(s) will be used to failover that traffic type.

A policy option in the HART prototype is multi-link forwarding. For a specified traffic type (specific DSCP and/or protocol ID) multiple links can be specified to replicate packets on. This option sends the same packet or data frame across multiple links to provide improved reliability. If the primary link fails the data will not be lost or interrupted, the flows will continue across the other specified links without affecting the data flow at all.

Policy types:
Default Policy: primary and backup links for all non-specified traffic.
Automatic Failover Policy: primary and backup links for all specific traffic. Specific traffic defined by DSCP and protocol ID fields.
Multi-Link Forwarding Policy: specify primary link and replication links to replicate specific traffic on. Specific traffic defined by DSCP and protocol ID fields.
Load Balancing Policy: specify group of links to spread specific data across (not replicate). Each link will be used in a rotating fashion. Different data packets will be sent simultaneously across several links arriving at the same time. This has the effect of increasing throughput. Specific traffic defined by DSCP and protocol ID fields.
Example:
If DSCP==18 (AF21) then PrimaryLink=Mini-CDL1 and FailoverLinkOrder=AN/ARC-210(V); Mini-CDL2; WGS; Inmarsat
Provide a GUI tool to edit policies
Write policy files.
Read existing policy files
Policy Table Entry
Each Policy will have these values:
DSCP value (or NULL)
And/or flag (0-AND, 1-OR)
IP Protocol Code (or NULL, especially if DSCP is NULL)
Policy Type (0-Default Policy; 1-Automatic Failover Policy; 2-Multi-Link Forwarding Policy; 3-Load Balancing Policy)
Primary Link Identifier
Secondary Link Identifier Priority List
BGP-MX Module
HART treats other network integration systems as separate ASes. This provides automatic configuration and integration with other networking systems in use. An extension to BGP is used to add mobility awareness and dynamics.
BGP-MX:
Integrates seamlessly with BGP routers
Dynamically discover BGP peers from other ASs and setup peering relationships
Converge new routes rapidly in response to changes in topology
Integrate with external AS's such as:
a. JCAN: Joint Capability for Airborne Networking subnets
b. GIG: Global Information Grid (backhaul/reachback)
c. BACN: Battlefield Airborne Communications Node
d. DISN: Defense Information System Network
HART Design Details
HART is designed for several real-world use cases of multi-subnet environments with different radio and routing capabilities.

A subset of functionality was selected to create a prototype to demonstrate the HART approach. The features selected for prototyping were proactive failover across many links and integration with a Mini-CDL radio and interface. With the proactive failover mechanism, the HART router monitors the quality of each radio link to detect when it falls below a specified threshold. Upon detection of unacceptable link degradation, the HART router proactively routes all IP packet flows traversing the degraded link to a backup link of higher quality. If or when the original link recovers its quality, the IP packet flows are switched back to this link. Current systems provide no capability for proactive link failover; failover occurs only after a complete breakdown of a link. Application performance suffers as a consequence.

Figure 19:
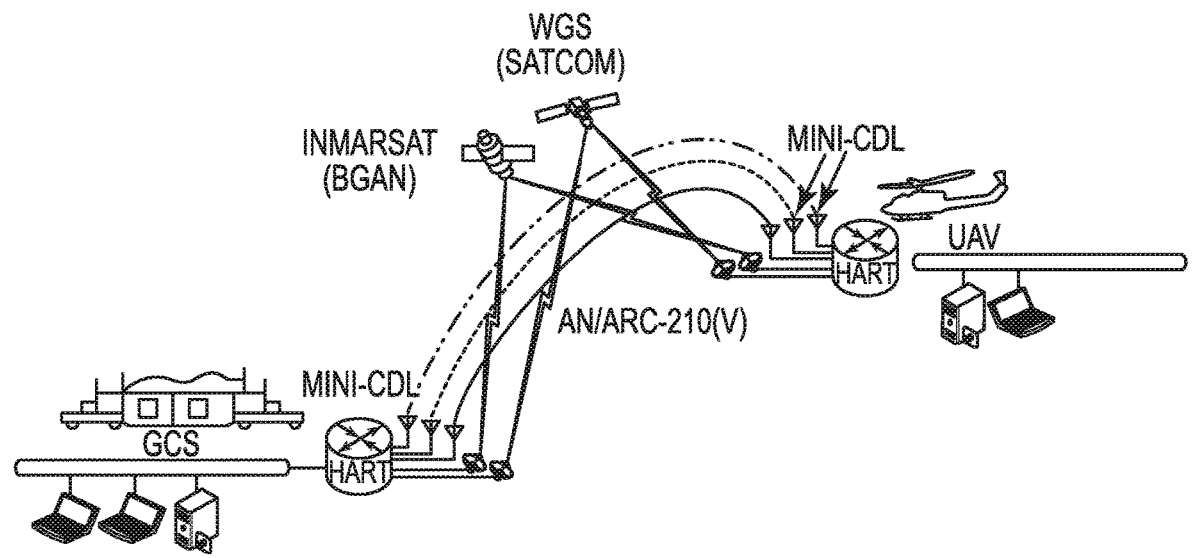
FIG. 19 is an illustration of the multi-subnet network with a UAV scenario.

As shown in FIG. 19, the UAV platform has two Mini-CDL radios, an AN/ARC-210(V) radio, an Inmarsat (BGAN) SatCom and a WGS SatCom. The GCS (Ground Control Station) in this case will have the same five endpoint radios. HART in this case exploits the redundant data paths to provide increased reliability of the IP-based connection between the GCS and the UAV. This system does not use HAIPEs to create a red/black network.

In an embodiment, HART consists of two kinds of appliances: the HART-Edge appliance resident on the UAV and the HART-Gateway appliance resident at the GCS.

Figure 20:
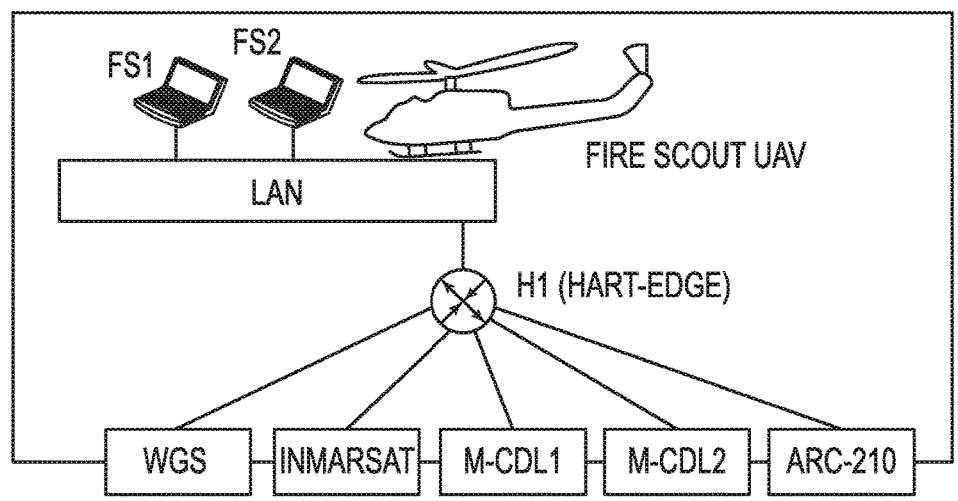
FIG. 20 is a block diagram of an AV network configuration illustrating ports available on a router constructed in accordance with an embodiment of the present invention.

The HART-Edge Appliance has eight Ethernet ports. Five of these ports are used to connect to the five RF links as shown in FIG. 20. The other three ports are available for use by on-board hosts and sensors on the UAV to connect to the tactical network via the HART-Edge appliance. In this case, each on-board IP device (sensor or CPU) will use the HART router as its "default router".

Ground Control Station (GCS) Network

Figure 21:
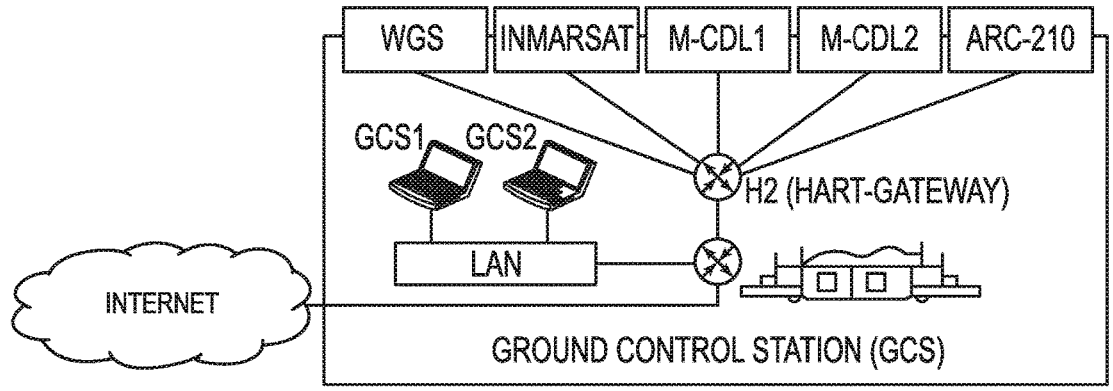
FIG. 21 is a block diagram of a router constructed in accordance with an embodiment of the present invention utilized as a ground control station coupled to the internet.

There is an Ethernet network (LAN) at the GCS to connect various hosts and servers. This ground network uses a hub or switch to connect all the devices (FIG. 21). The GCS has ground-based transceivers for the various RF/wireless communications devices. Each of these devices has an IP/Ethernet interface.

The HART-Gateway Appliance has eight Ethernet interfaces, one connected to the ground network router and another connected directly to each of the RF/wireless devices (FIG. 21). Optionally, HART could connect to another LAN on the RF side that has the RF/wireless devices connected to a hub or switch.

The GCS may have external networks (i.e. internets) connected to the ground LAN. With proper routing configuration this does not affect HART, and in fact HART will route data to and from the UAV to the external networks as well.

Each RF/wireless radio device used in this scenario is listed above with specifications that are used by HART to make informed policy based routing decisions.

Figure 22:
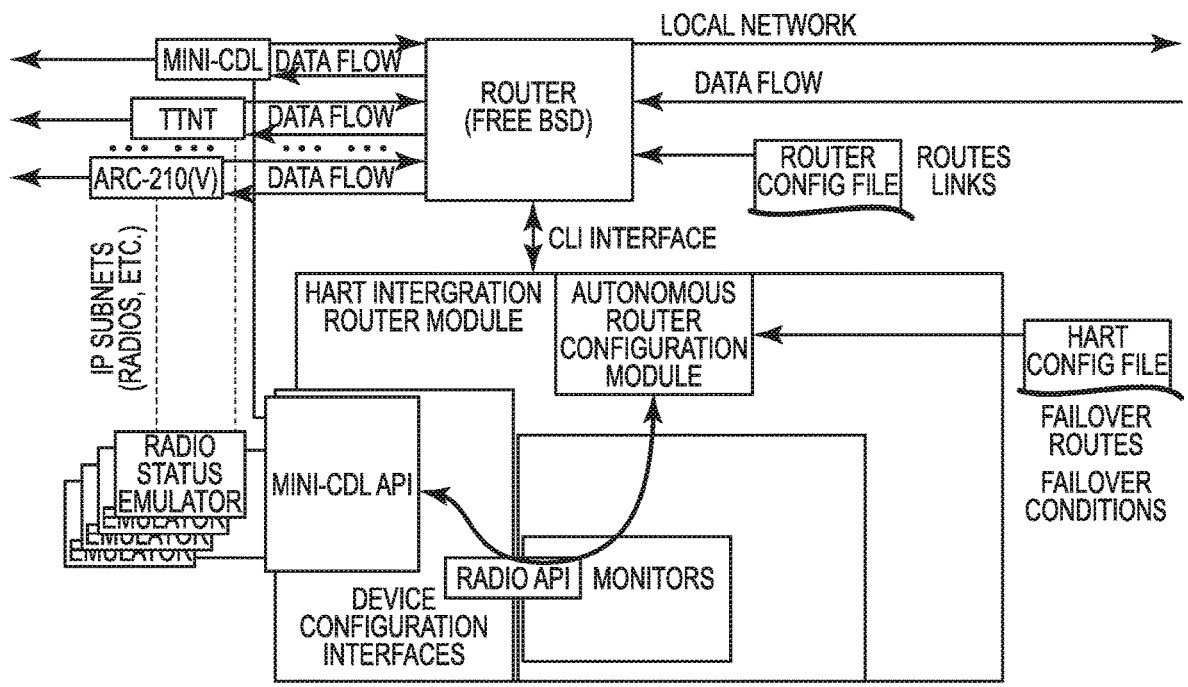
FIG. 22 is a block diagram of an embodiment of the software architecture of a router constructed in accordance with an embodiment of the present invention.

HART Features
FreeBSD PC (version 7.3)
Quad NIC (network interface cards)—at least 5 Ethernet connections
FreeBSD router software
Maintain IP data flows between the GCS and one or more UAVs connected to the GCS
Policy based dynamic link selection
a. Provides automatic link multi-level failover and recovery
Policy based multi-link forwarding (Stretch Goal)
a. Replication provides high reliability communications
Policy configuration GUI (Stretch Goal)
Integration with Cubic Mini-CDL radio hardware An embodiment of the software architecture of HART is shown in FIG. 22.

HART Policy Configuration

HART uses a Policy Configuration file to define the settings used by HART for link failover. This allows the user to define the default link for traffic and the order of backup or failover links to use. Once the default is setup, the user can specify different traffic types based on matching DSCP (differentiated services code point) and/or protocol ID fields. For each traffic type a primary link can be selected and then the other links can be ordered as to which order each will be used to failover that traffic type.

The last policy option in the HART prototype is the multi-link forwarding. For a specified traffic type (specific DSCP and/or protocol ID) multiple links can be specified to replicate packets on. This option will send the same packet or data frame across multiple links to provide improved reliability. If the primary link fails the data will not be lost or interrupted, the flows will continue across the other specified links without affecting the data flow at all.

Three policy types:

Default Policy: primary and backup links for all non-specified traffic.

Automatic Failover Policy: primary and backup links for all specific traffic. Specific traffic defined by DSCP and protocol ID fields.

Multi-Link Forwarding Policy: specify primary link and replication links to replicate specific traffic on. Specific traffic defined by DSCP and protocol ID fields.

a. Example:

b. If DSCP==18 (AF21) then PrimaryLink=Mini-CDL1 and FailoverLinkOrder=AN/ARC-210(V); Mini-CDL2; WGS; Inmarsat HART Emulation Testbed Emulab was used to create a HART testbed (FIG. 23), consisting of:

Two HART routers running on either end of 5 links (hart0&hart1)

Two user nodes running various applications on the endpoints (ep1 & ep1)

Four links emulated by Emulab Delay nodes (D) and Radio Emulators (emul0 & emul1)

a. Radio Emulator are adjusted during the experiment to report lesser quality to HART, causing HART to make route adjustments (e.g. failover)

Radio Link Specifications Details

In a live scenario, the wireless radio devices and specifications used are:

Mini-CDL Radio a. Bandwidth: 8 Mbps (5.4 Mbps-10.7 Mbps)

b. Latency: 400 ms RTT c. Interface: Ethernet d. Data routing: Ethernet Bridge: data comes in over Ethernet, then is transferred directly to the paired endpoint e. Range: LOS: surface-to-surface (sts): ave:4.4 nm/surface-to-air (sta): ave:14.8 nm)

WGS (Wideband Global SATCOM) SatCom a. Bandwidth: >2 Mbps b. Latency: 710 ms RTT c. Interface: Ethernet d. Data routing: IP routed through SatHub e. Range: BLOS Inmarsat (BGAN)

a. Bandwidth: 329 kbps (10 kbps-2 Mbps)

b. Latency: 710 ms RTT c. Interface: Ethernet d. Data routing: IP routed through SatHub e. Range: BLOS AN/ARC-210(V) (ARC-210 gen5)

a. Bandwidth: 80 kbps (48.8 Kbps-97.7 Kbps)

b. Latency: 400 ms RTT c. Interface: Ethernet d. Data routing: Ethernet Bridge: data comes in over Ethernet, then is transferred directly to the paired endpoint e. Range: LOS: surface-to-surface: ~55 nm (31-92 nm); surface-to-air: ~176 nm (119-264 nm)

In the emulation environment to make the configuration and setup simpler, ATC used these link specifications:

| i. Link | Throughput | Latency |
|---|---|---|
| ii. Radio0 | 5 Mb | 20 ms |
| iii. Radio1 | 1 Mb | 200 ms |
| iv. Radio2 | 1 Mb | 300 ms |
| v. Radio3 | 1 Mb | 400 ms |

In addition to proactive link selection, HART implements multi-level policy-based failover (1, 2, 3, 4, 5 or more backup links in a prioritized order), a capability that is not supported within COTS routers such as Cisco. For instance, with Cisco routers, if the policy route for an IP flow were to fail it will be routed over the default interface. Unlike HART, secondary and tertiary policy routes cannot be specified with Cisco routers.

FIG. 24 (steps 1-4) shows HART link quality monitoring and proactive link failover. FIG. 24 shows the Emulab experiment: 2 LANs connected by 4 links through HART routers. Each LAN has 3 nodes: an endpoint (ep), a radio emulator node (emul) and a HART router (hart). The radio emulator node runs an application that ATC built to emulate the Mini-CDL radios' link quality API, and allow for manual quality adjustment. Step 1 shows a ping from ep0 to ep1. Step 2 shows the Mini-CDL radio emulator (for RadioLink0) being set from 100% to 60%.

In step 3, HART detects the new quality metric for RadioLink0 is below threshold of 75%, and then triggers the failover to RadioLink1. Step 4 shows the ping times have increased which shows that RadioLink1 may be used instead of RadioLink0. HART may successfully detect link quality degradation by interfacing with the radio and then change the router on "hart0" to use the failover path of RadioLink1.

HART Radio Integration testbed

Figure 25A:
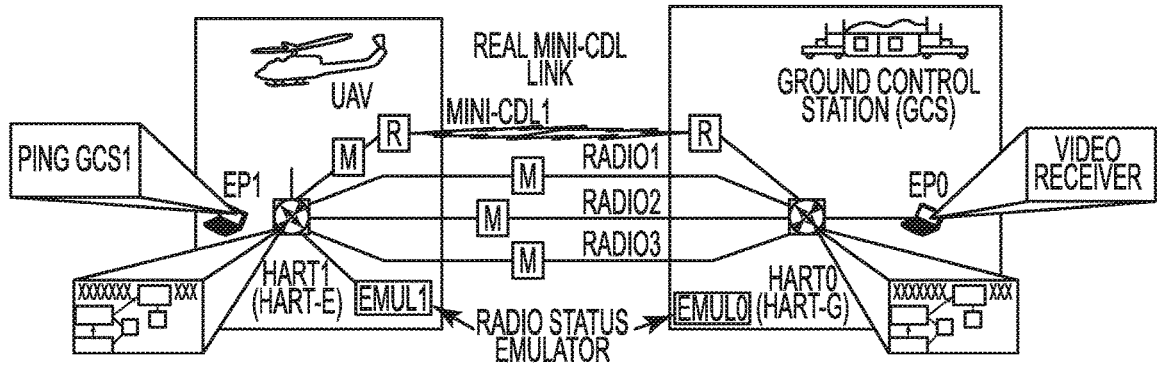
FIG. 25a and FIG. 25b illustrate routers constructed in accordance with an embodiment of the present invention installed in a test bed with mini-CDL radios.
Figure 25B:
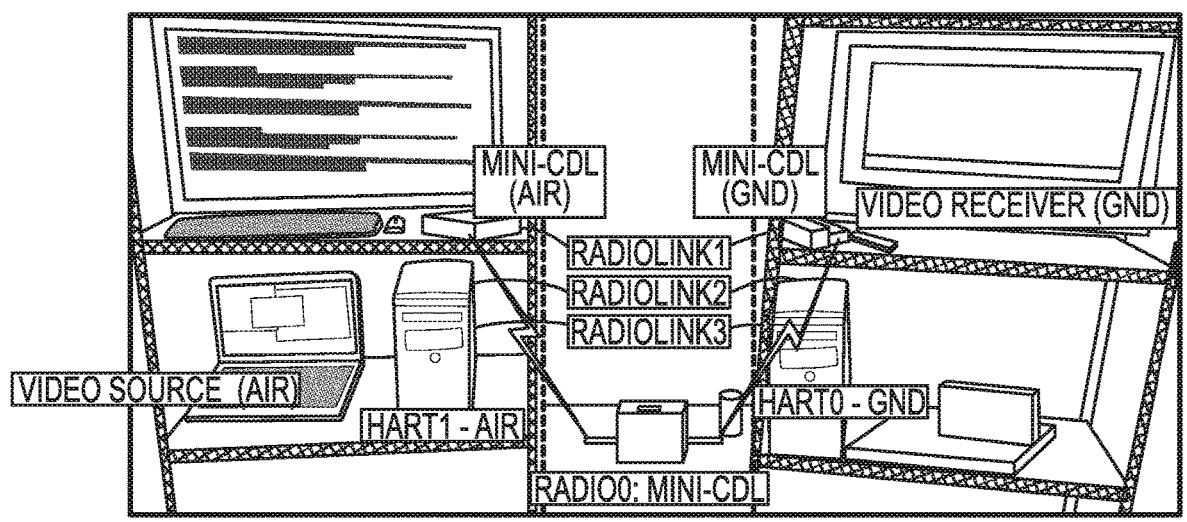

HART may be used with two real Mini-CDL radios (FIG. 25a and FIG. 25b). HART is integrated with the radios and then successfully shows to monitor the status of the live radios (through the Mini-CDL API), making correct autonomous failover configuration updates to the routers (HART0 and HART1 in FIG. 25b). The demonstration shows a video stream being sent over the radio link. As the link degrades below a preset threshold, routing fails over to a series of backup links.

HART neighbor discovery service automatically discovers IP one-hop neighbor HART edge and transit routers on a radio subnet. HART transmits periodic subnet multicast of Hello messages by each HART router to enable dynamic neighbor discovery. A neighbor table is maintained by each HART router with subnet-specific address and alias addresses of each neighbor.

Subnet Convergence Function

The subnet convergence function provides a common IP subnet layer interface for the routing function. It enables automatic formation of virtual point-to-point link with each neighboring HART router. It performs monitoring of quality metrics for each virtual link. It implements network level flow control.

Virtual Link Formation & Maintenance

Virtual link formation and maintenance provides cut-through routing for implementing a virtual link. It maintains per-flow state for each IP data flow using a virtual link. It performs IP packet header restoration for data packets received over a virtual link.

Link-Quality Monitoring

Link-Quality monitoring functions implement a passive technique for sensing packet loss rate on virtual link. It implements an active, passive, or hybrid technique for virtual link capacity sensing. It implements an active, passive, or hybrid technique for sensing virtual link latency. It provides a link quality query interface and asynchronous notification mechanism.

Network-level Flow Control

Network-level flow control provides network-level control of the rate at which packets are sent to an attached radio. It implements adaptive per-virtual-link rate control based on dynamic sensing of virtual link. It may augment radio-supported flow control (e.g., RFC 5578).

Traffic Redirection

Traffic redirection implements a mechanism to provide redirection of an IP packet flow to a different next-hop than the current one for load balancing or for traffic-aware routing. Flow redirection is based on source and destination addresses of IP packets.

QoS-Aware Unicast Routing Service

The QoS-aware unicast routing service provides an OSPF-based core routing protocol for unicast routing over inter-router virtual links. It interconnects radio IP subnets into one HART network. It maintains multiple routing metrics per virtual link. It implements multiple routing tables, one per routing metric. It performs link-aware route selection. It performs traffic-aware route selection.

Load Balancing Function

Load balancing function performs distribution of traffic exiting an IP subnet across multiple egress links, if applicable. It performs distribution of traffic entering an IP subnet across multiple ingress links, if applicable.

Dynamic Link Metrics

When a HART router has multiple connections to the HART internetwork, the HART design allows that HART router to dynamically configure the link metrics based on radio link monitoring.

Dynamic Route Selection

When multiple paths are available to route IP traffic through the HART inter-network, the HART design allows the dynamic selection of the path that an IP packet flow will take based on routing metrics.

Radio-Aware Flow Control

The HART design allows for flow control between the HART router and its connected radios.

Mission-Aware Traffic Management

The HART design allows the HART internetwork to be configured with a set of mission-specific parameters that influence dynamic link selection and dynamic route selection for specified traffic classes.

Load Balancing

Figure 26A:
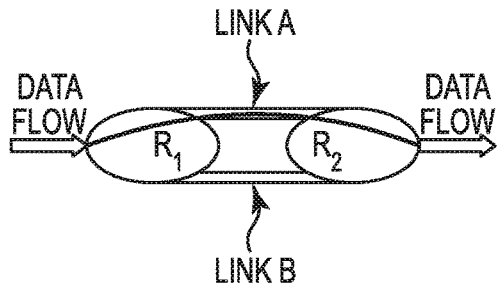
FIG. 26a is a diagram illustrating how data is routed in the absence of load balancing.
Figure 26B:
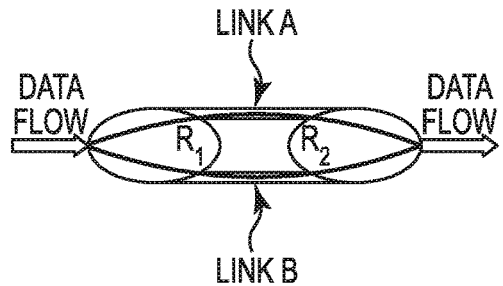
FIG. 26b is a diagram illustrating data flow balanced across available links.

The HART design allows utilization of multiple communication links when such links exist between elements of the HART internetwork. For example, when multiple links exist between two nodes, as shown in FIG. 26a and FIG. 26b, the HART design allows both links (e.g., link a and link b) to be used in parallel to balance traffic flows transiting between the nodes (e.g., $R_1$ and $R_2$). FIG. 26a shows how the data is routed in the absence of load balancing, while FIG. 26b demonstrates how the data flow is balanced across the available links. By load balancing, more data can ultimately be transferred between the two nodes.

Figure 27:
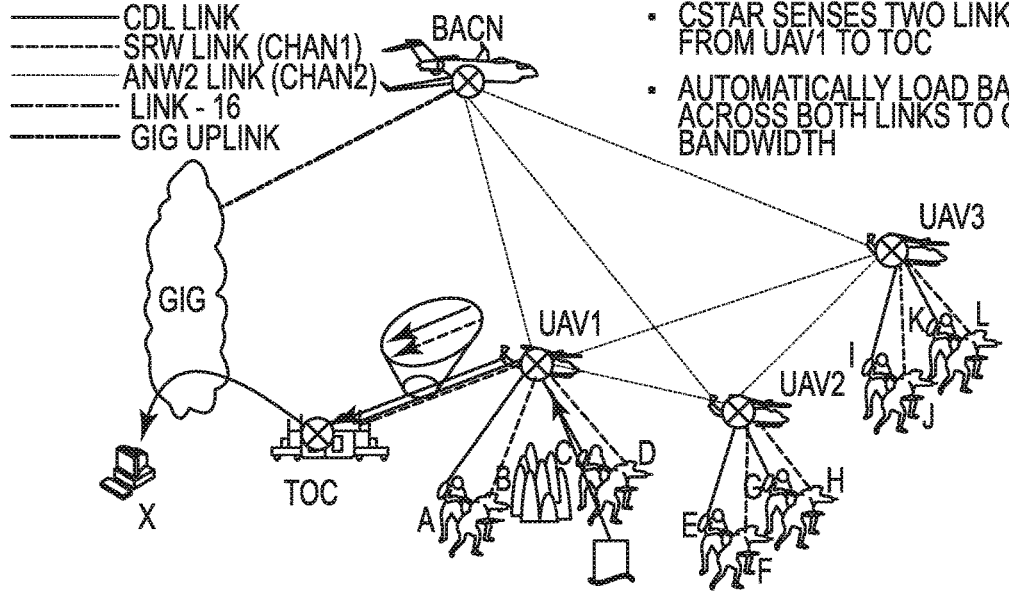
FIG. 27 is an illustration of one scenario of maximized network performance.

An embodiment in which HART Maximizes Network Performance (Scenario 1) is illustrated in FIG. 27 in which C sends a data file to X, a CSTAR router senses two links from UAV1 to TOC. HART automatically load balances across both links to gain more bandwidth.

Figure 28:
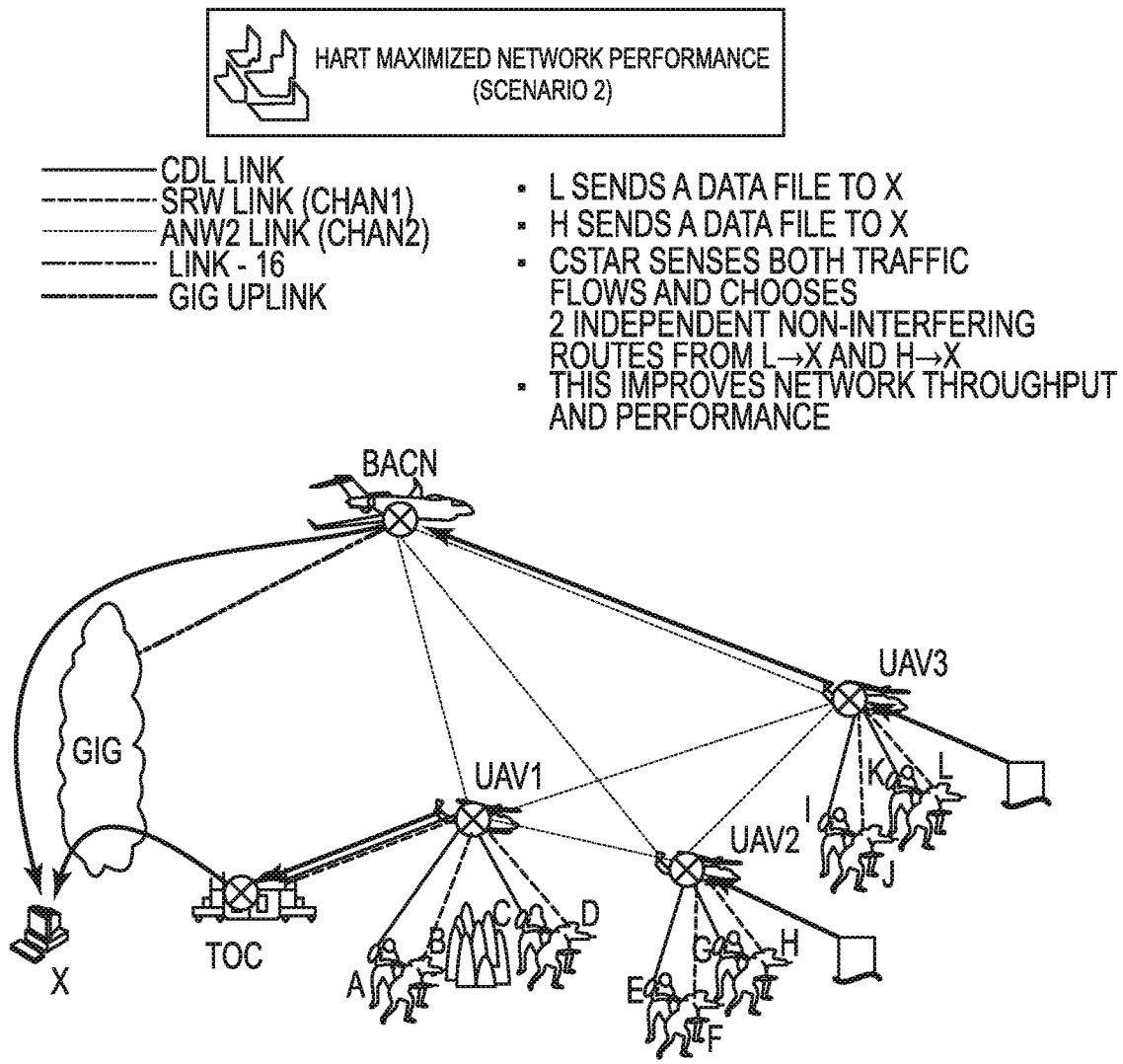
FIG. 28 is an illustration of a second scenario of maximized network performance.

Another embodiment in which HART Maximizes Network Performance (Scenario 2) is illustrated in FIG. 28 in which:

L sends a data file to X

H sends a data file to X

Figure 29:
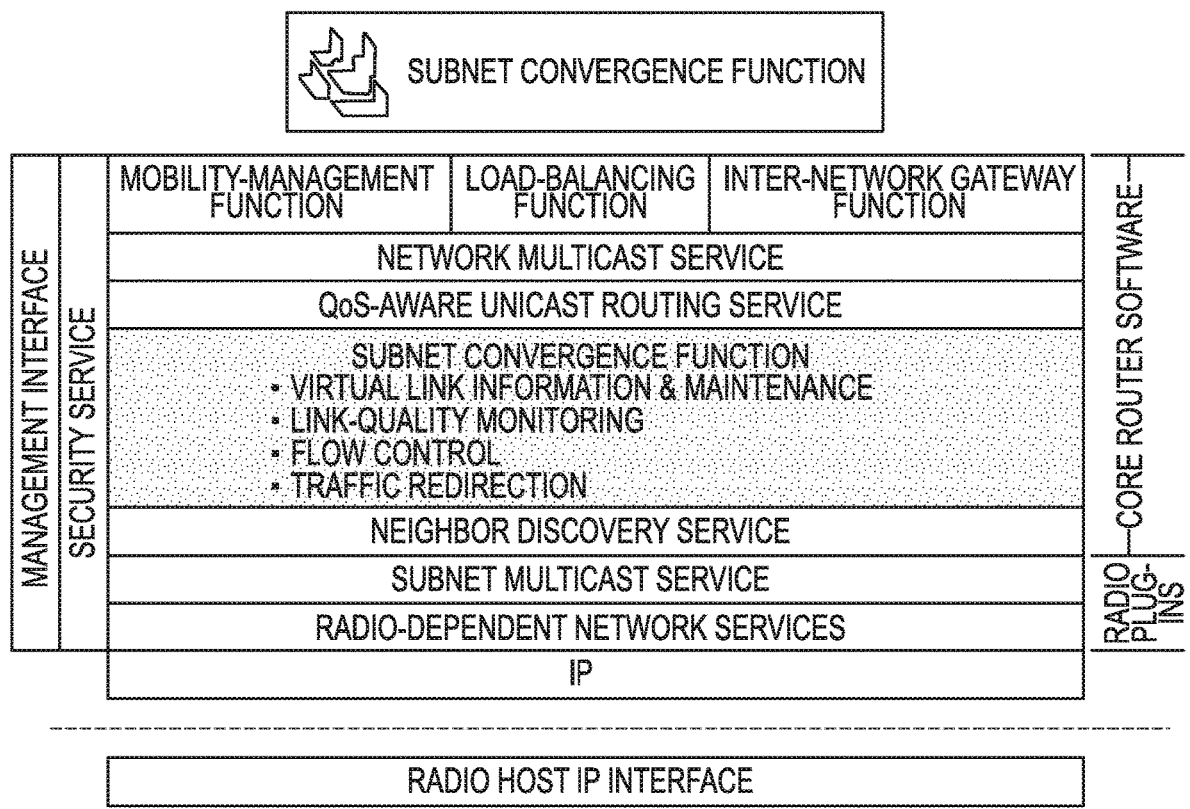
FIG. 29, FIG. 30 and FIG. 31 are diagrams illustrating subnet convergence function with link quality monitoring.

HART senses both traffic flows and chooses 2 independent non-interfering routes from L→X and H→X This improves network throughput and performance A subnet convergence function is illustrated in FIG. 29 in which HART:

Provides a common IP subnet layer interface for routing function

Figure 30:
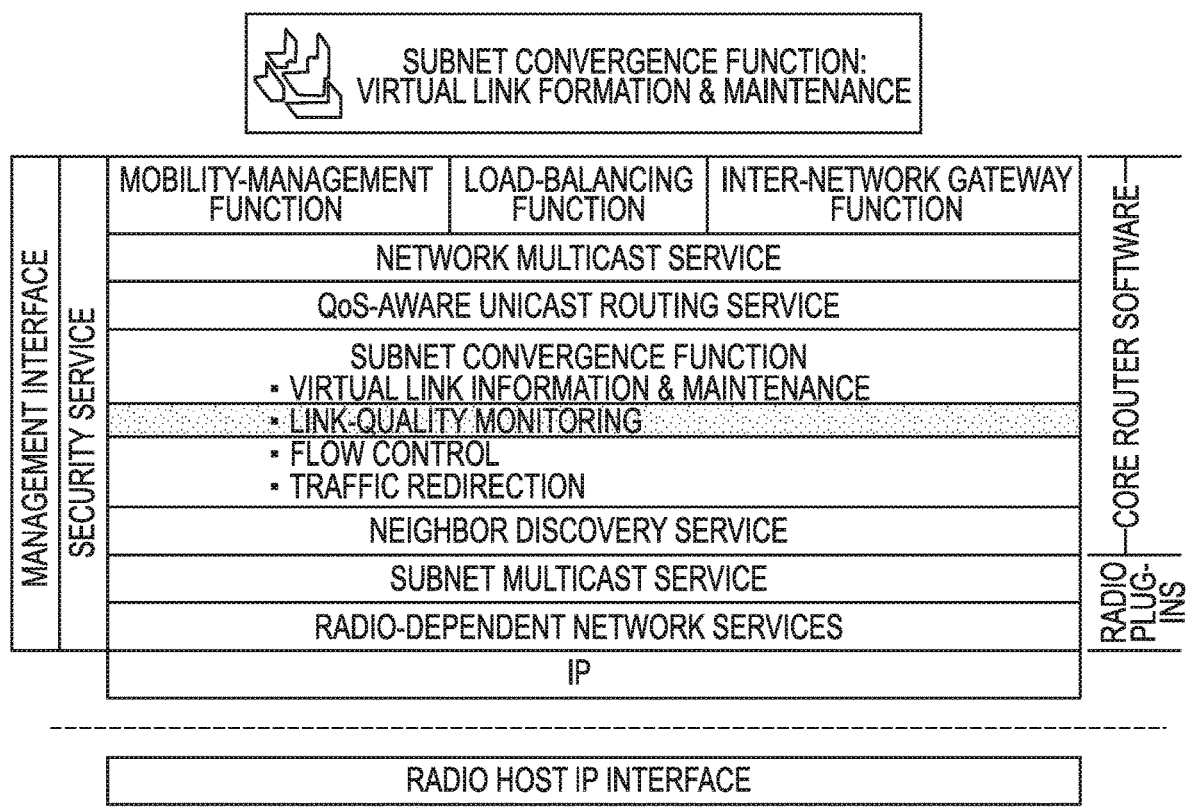
Figure 31:
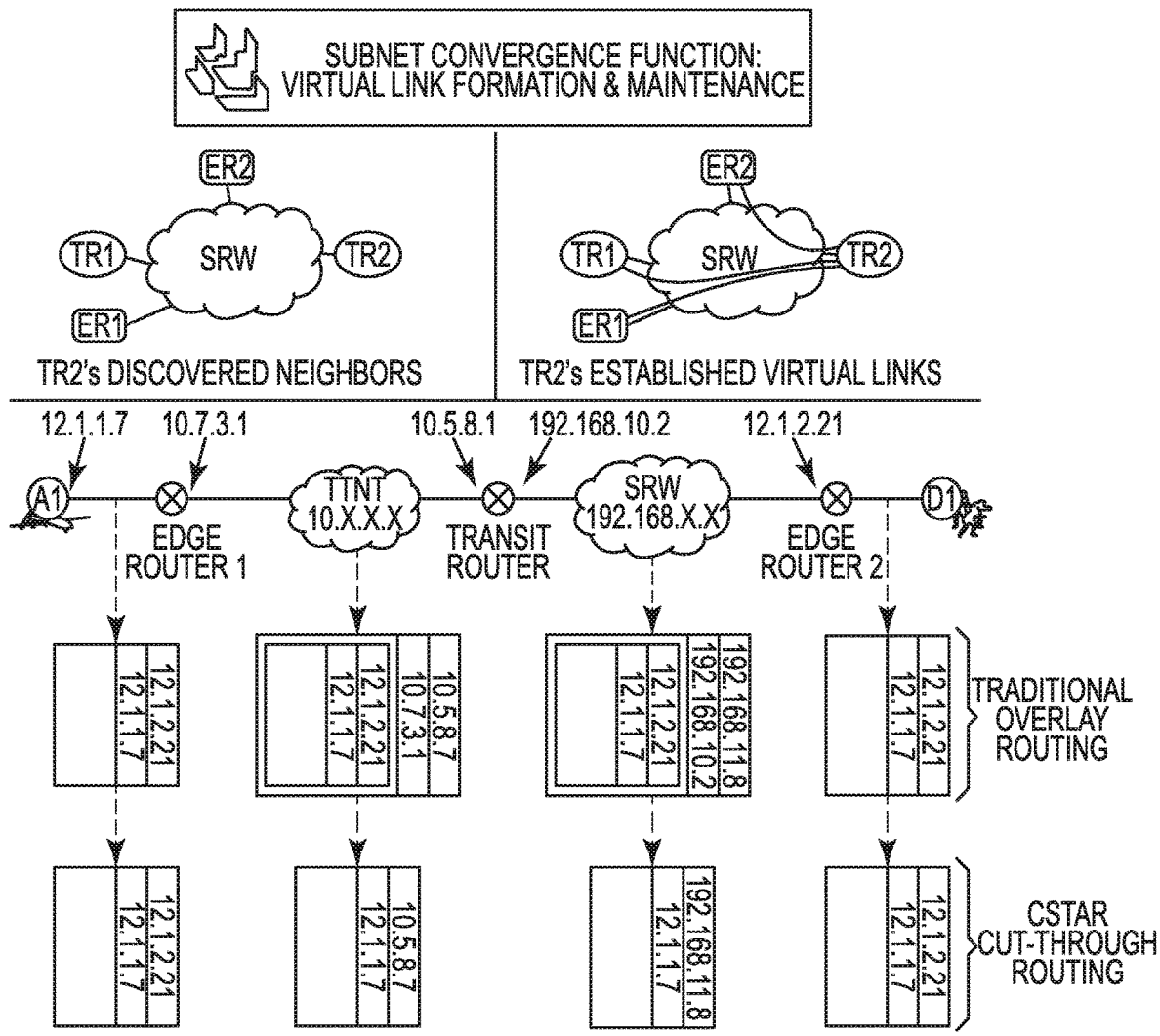

Automatically forms virtual point-to-point links with each neighboring HART router Monitors quality metrics for each virtual link Provides network-level flow control A subnet convergence function: virtual link formation & maintenance is illustrated in FIG. 30 and FIG. 31 in which HART:

Provides a virtual IP 1-hop channel between neighboring HART routers

Cuts-through routing for implementing virtual link

Provides maintenance of per-flow state for each IP data flow using virtual link

Figure 32:
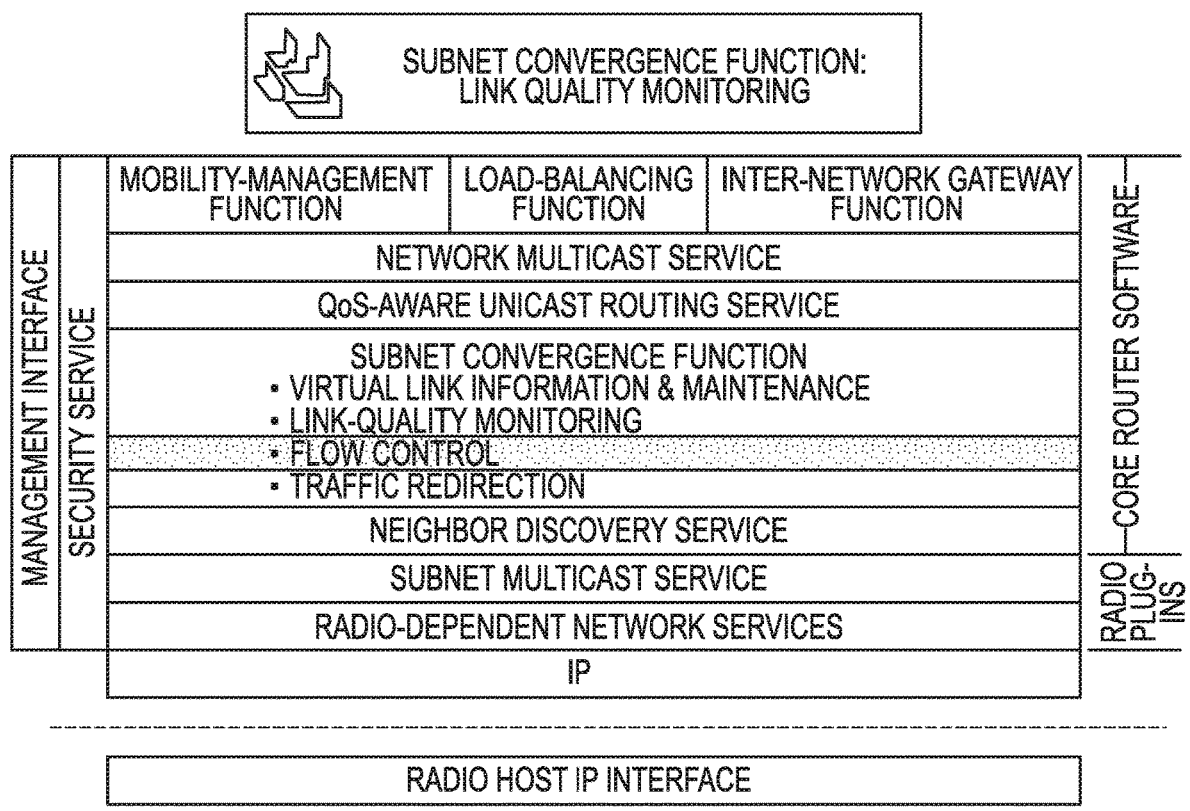
FIG. 32 is a diagram illustrating flow control.

Facilitates IP packet header restoration for data packets received over a virtual link A subnet convergence function: link-quality monitoring is illustrated in FIG. 32 in which HART:

Measures link quality to support link-aware routing

Uses a passive technique for sensing packet loss rate on virtual link

Uses an Active/Passive technique for virtual link capacity sensing

Uses an Active/Passive technique for sensing virtual link latency

Provides link quality query interface and asynchronous notification mechanism

Figure 33:
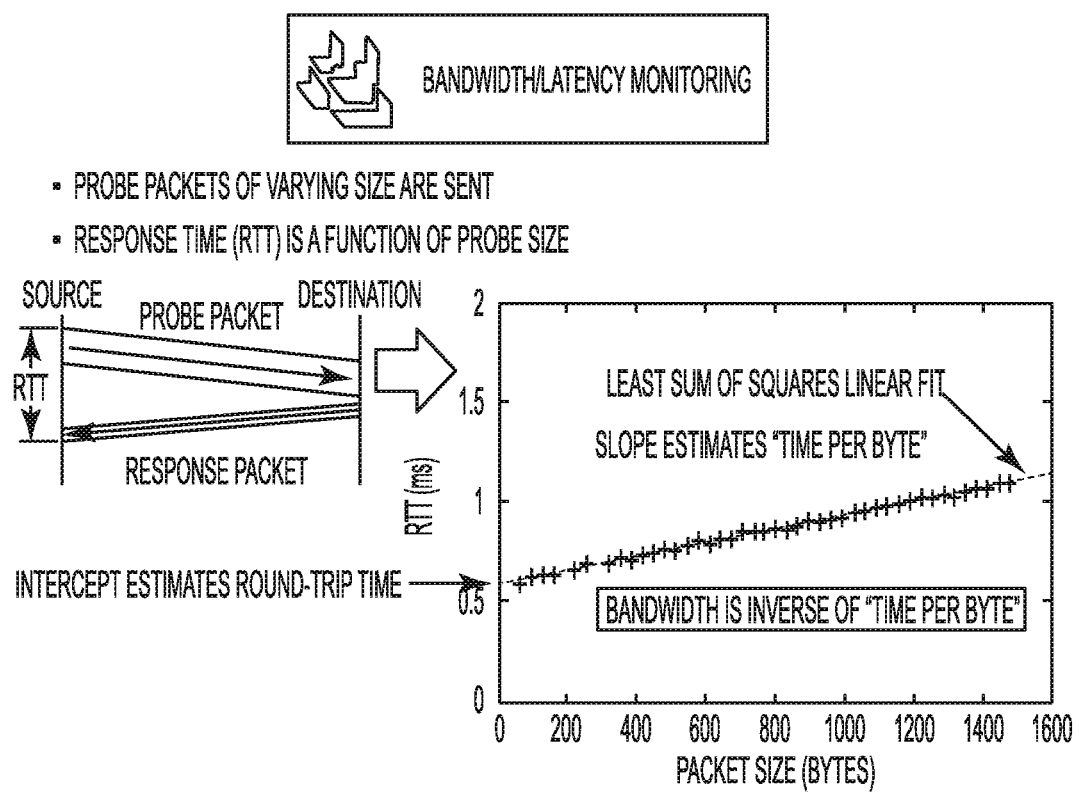
FIG. 33 is a diagram illustrating bandwidth and latency monitoring.

Bandwidth/latency monitoring is illustrated in FIG. 33 in which HART:

Uses existing network data as a probe packet

Sends probe packets of varying size

Response time (RTT) is a function of probe size

Uses existing network data as probe packet

Packet-Loss Sensing

Figure 34:
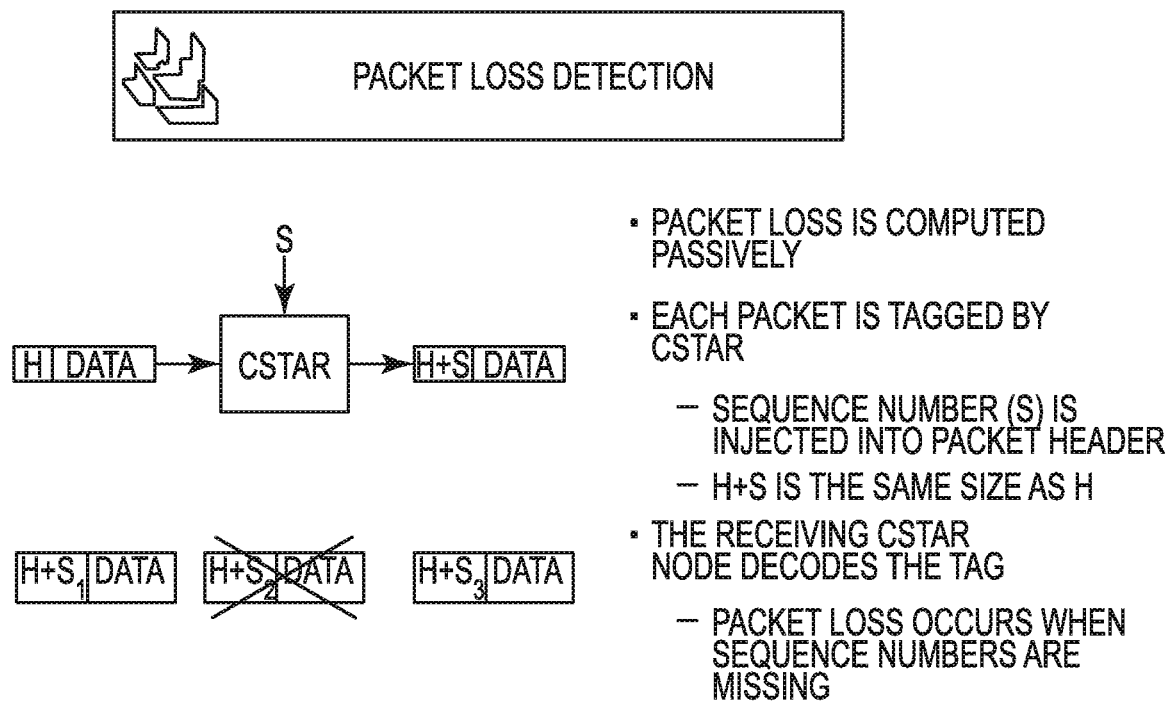
FIG. 34 is a diagram illustrating packet loss detection.

Packet loss is passively sensed using IP header identification and fragment offset fields that are currently unused Each packet is tagged a. IP identification field contains two octets of the HART routers IP address b. IP fragment-offset field contains a sequence number The receiving HART node decodes the tag a. Missing sequence numbers are indicative of packet loss b. A sliding window is utilized to account for out-of-order packets Packet loss detection is illustrated in FIG. 34 in which:

Packet loss is computed passively

Figure 35:
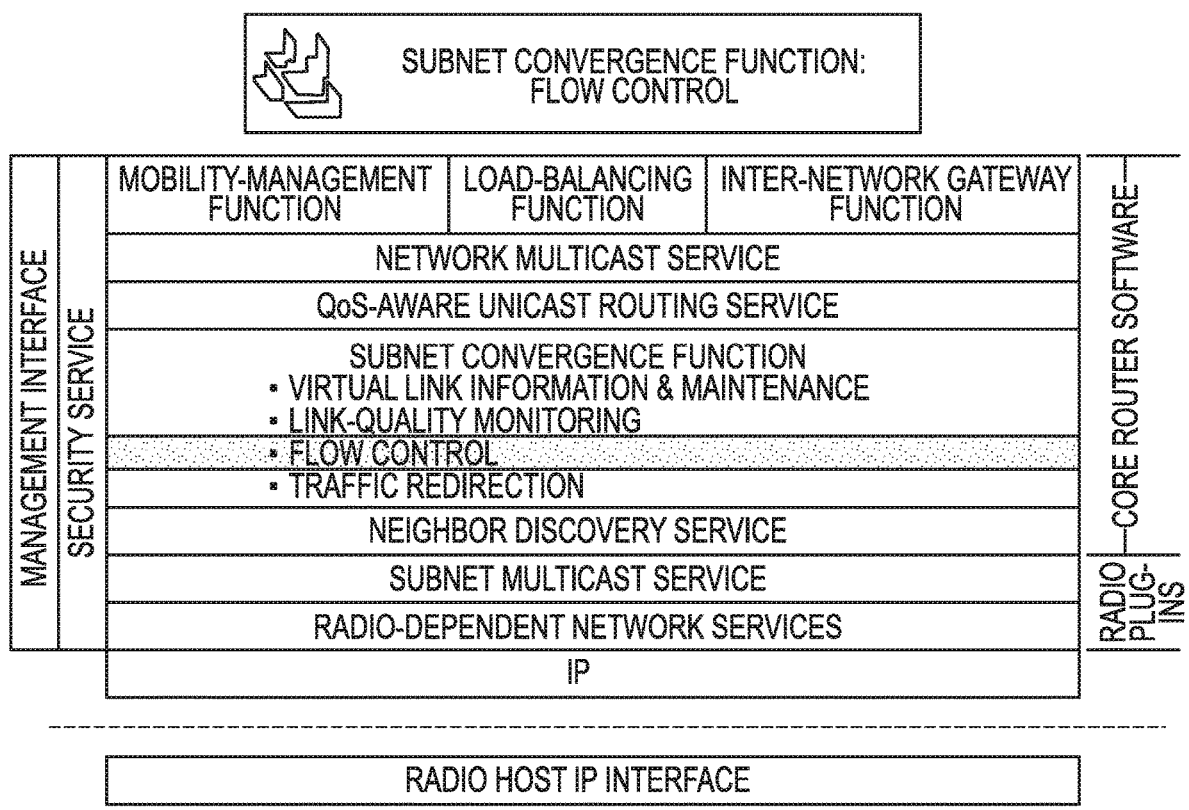
FIG. 35 and FIG. 36 are diagrams illustrating subnet convergence function utilizing flow control.
Figure 36:
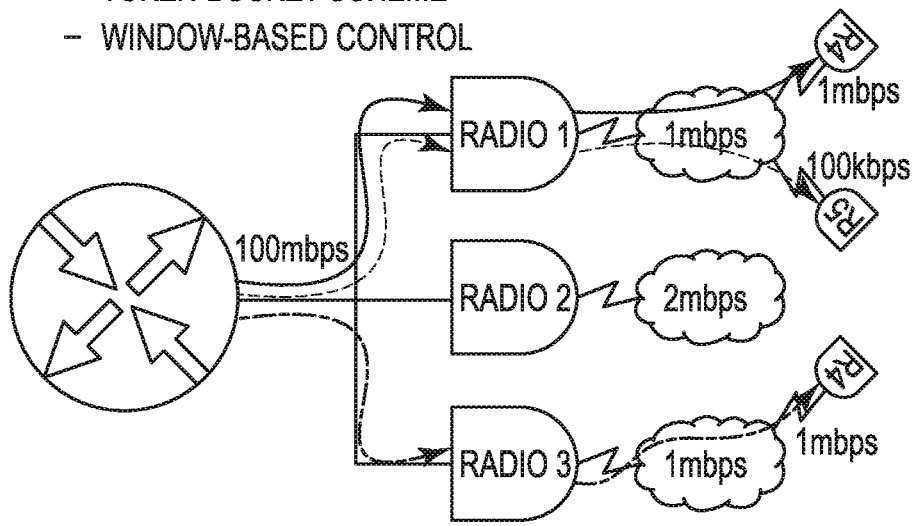
Figure 37:
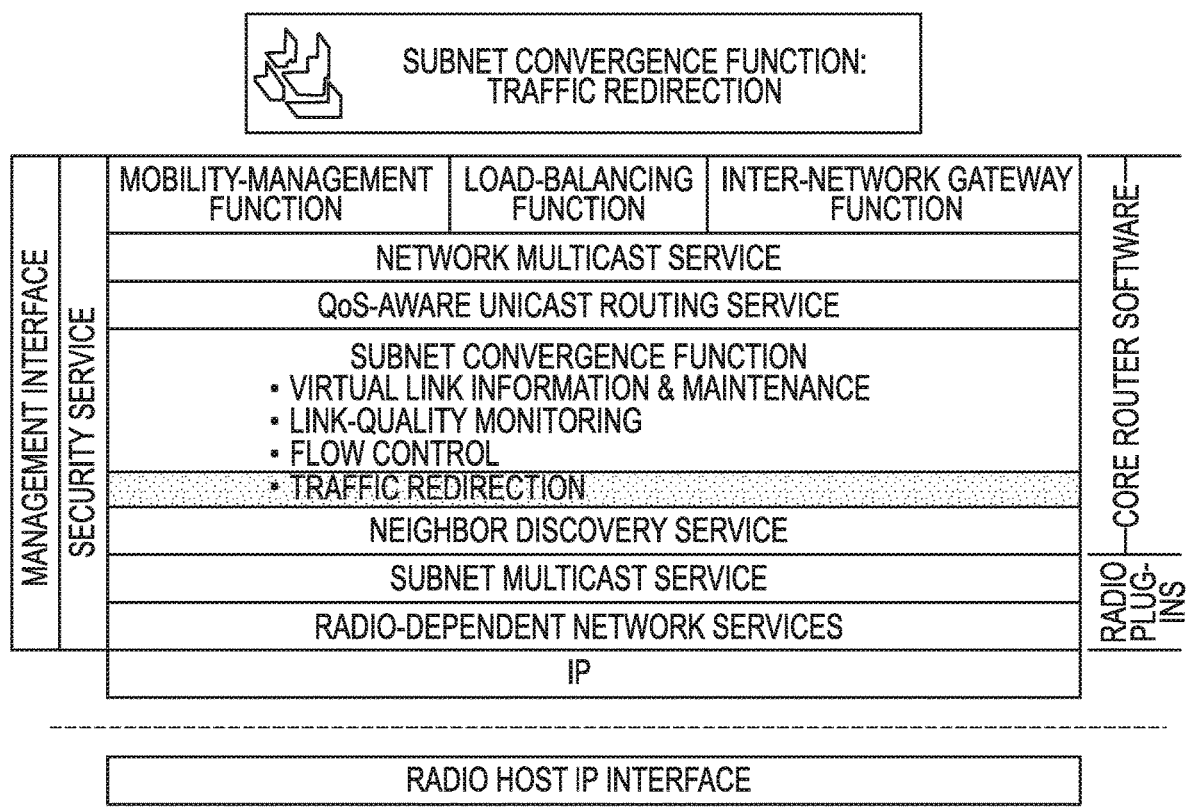
FIG. 37 and FIG. 38 are diagrams illustrating subnet convergence utilizing traffic redirection.
Figure 38:
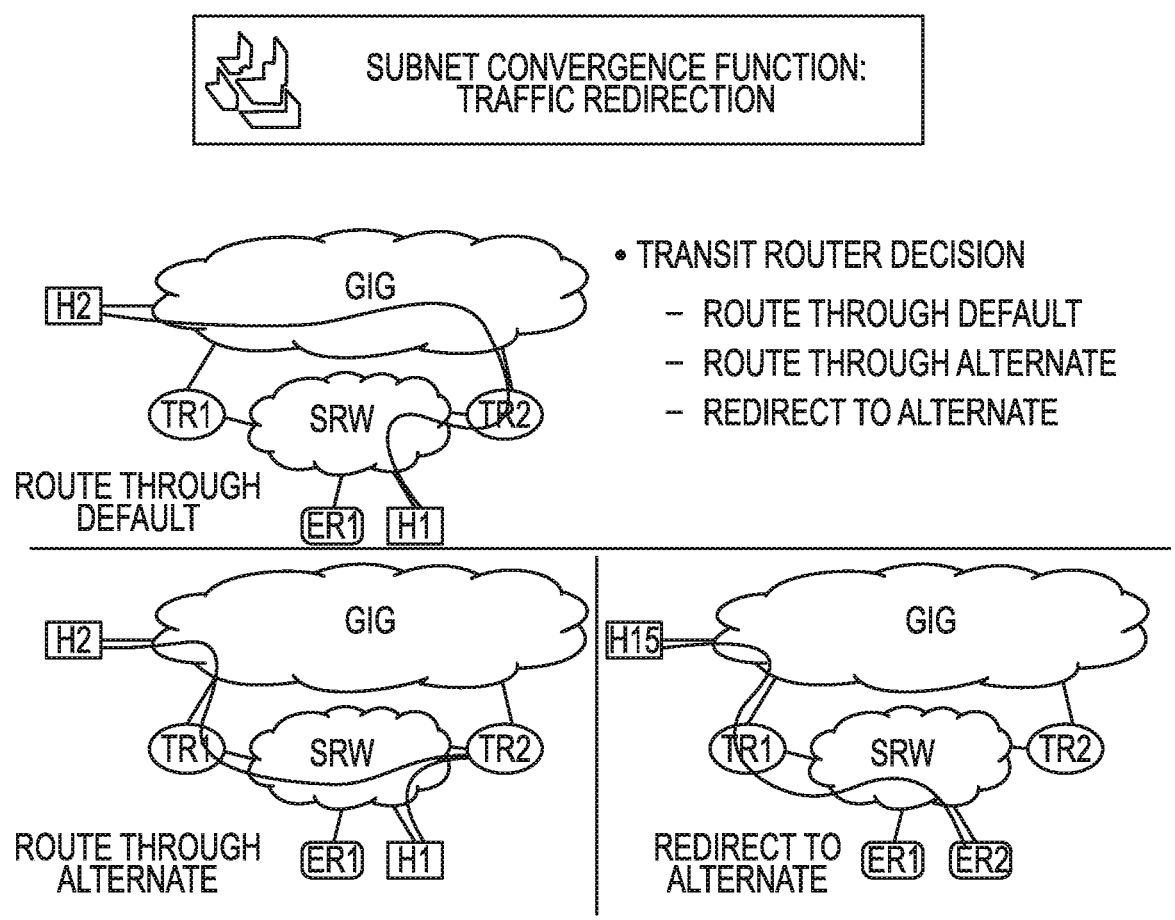
Figure 39:
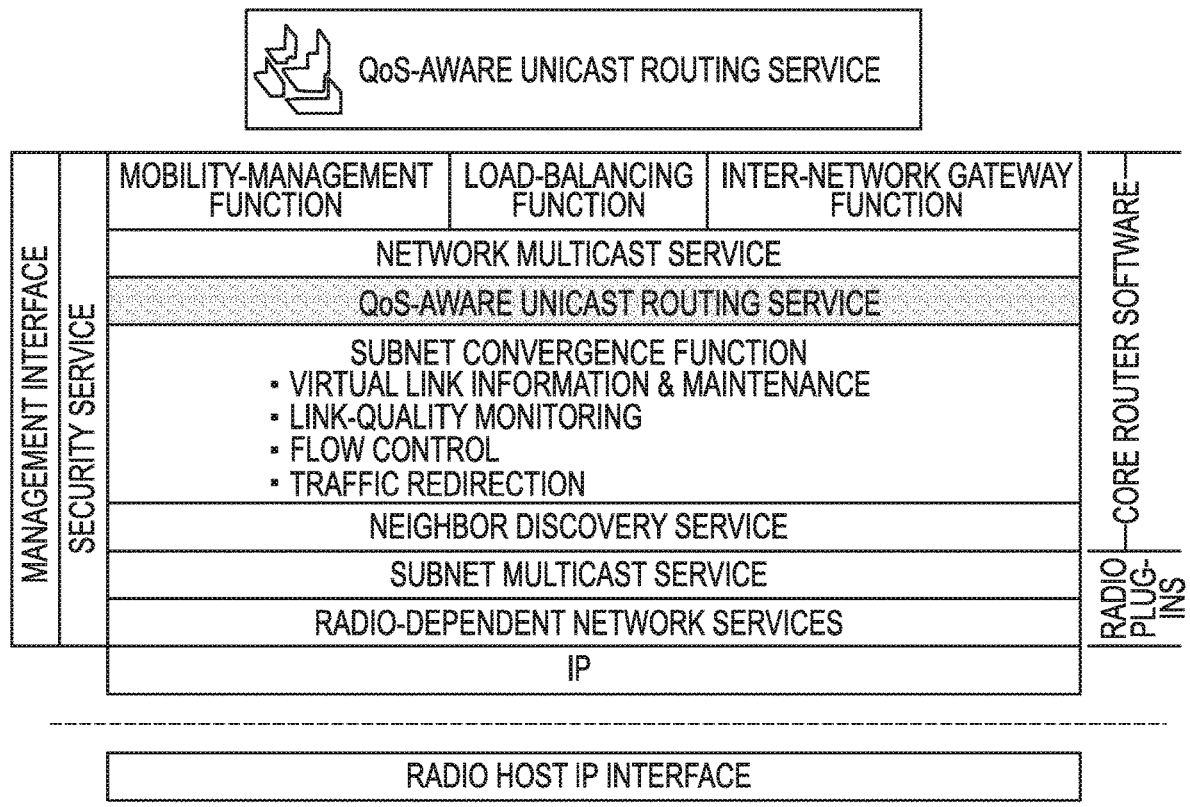
FIG. 39 and FIG. 40 are diagrams illustrating quality of service aware unicast routing service.
Figure 40:
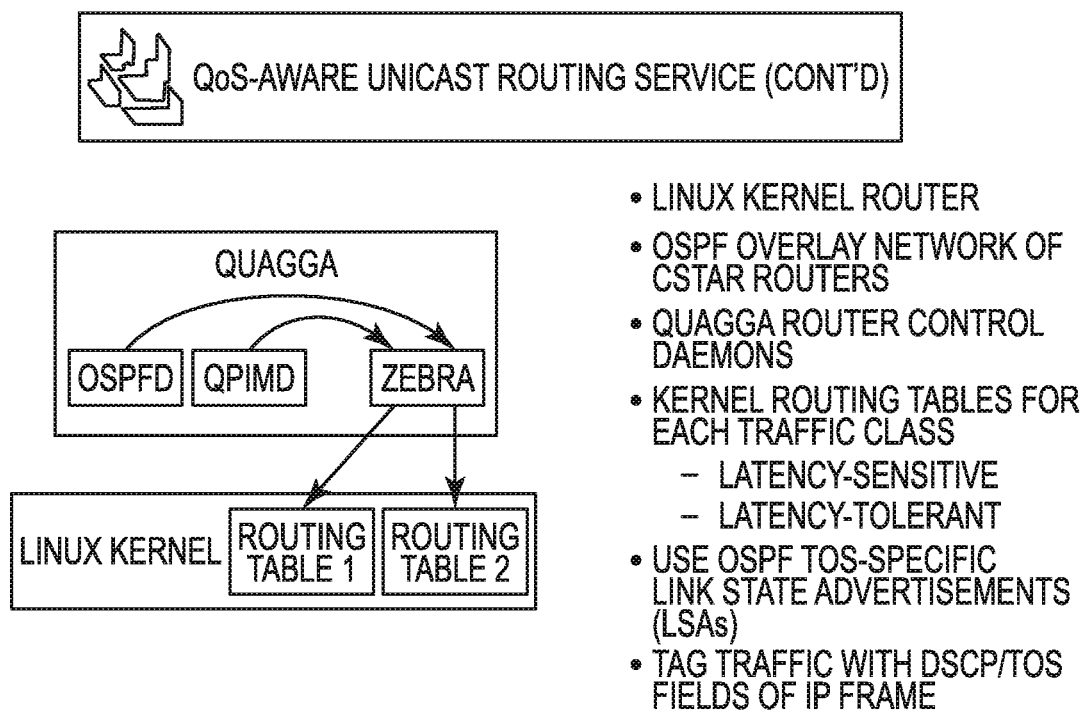
Figure 41:
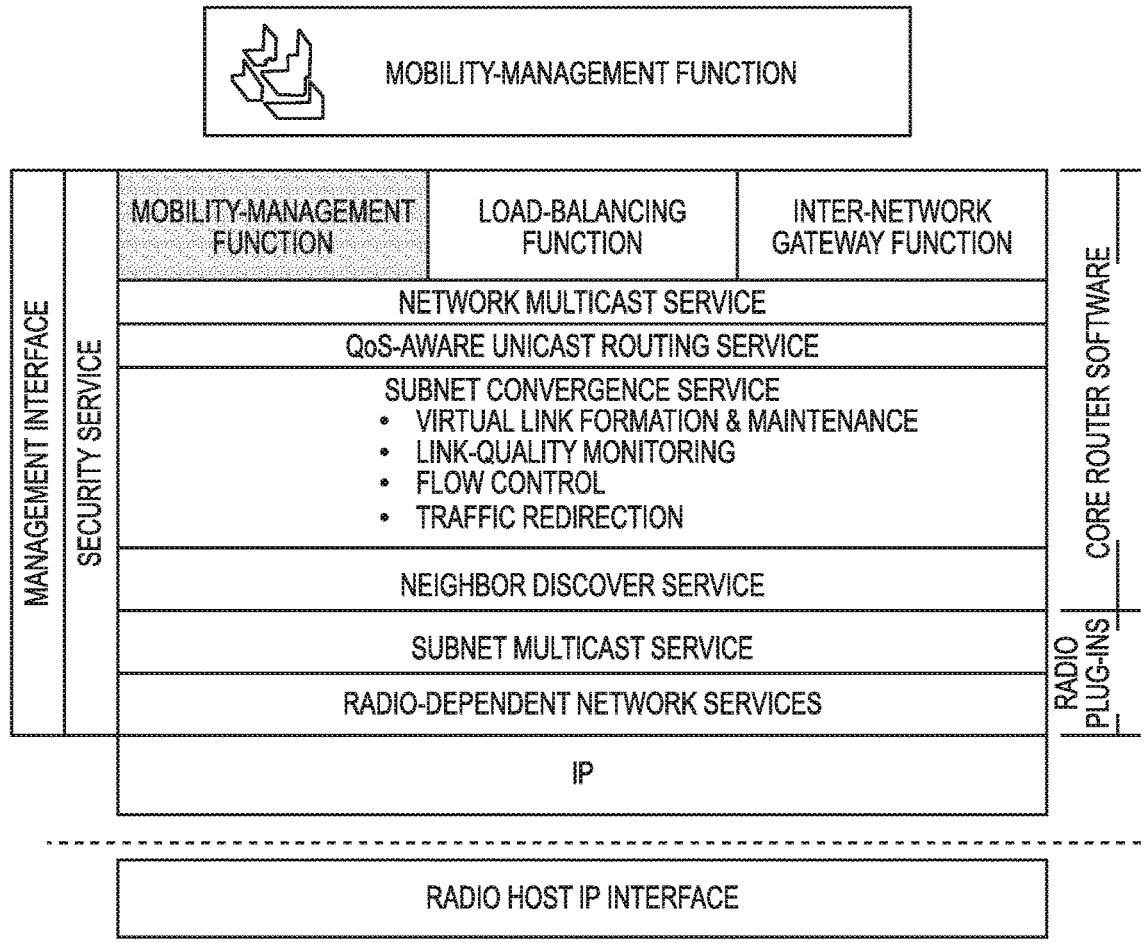
Figure 43:
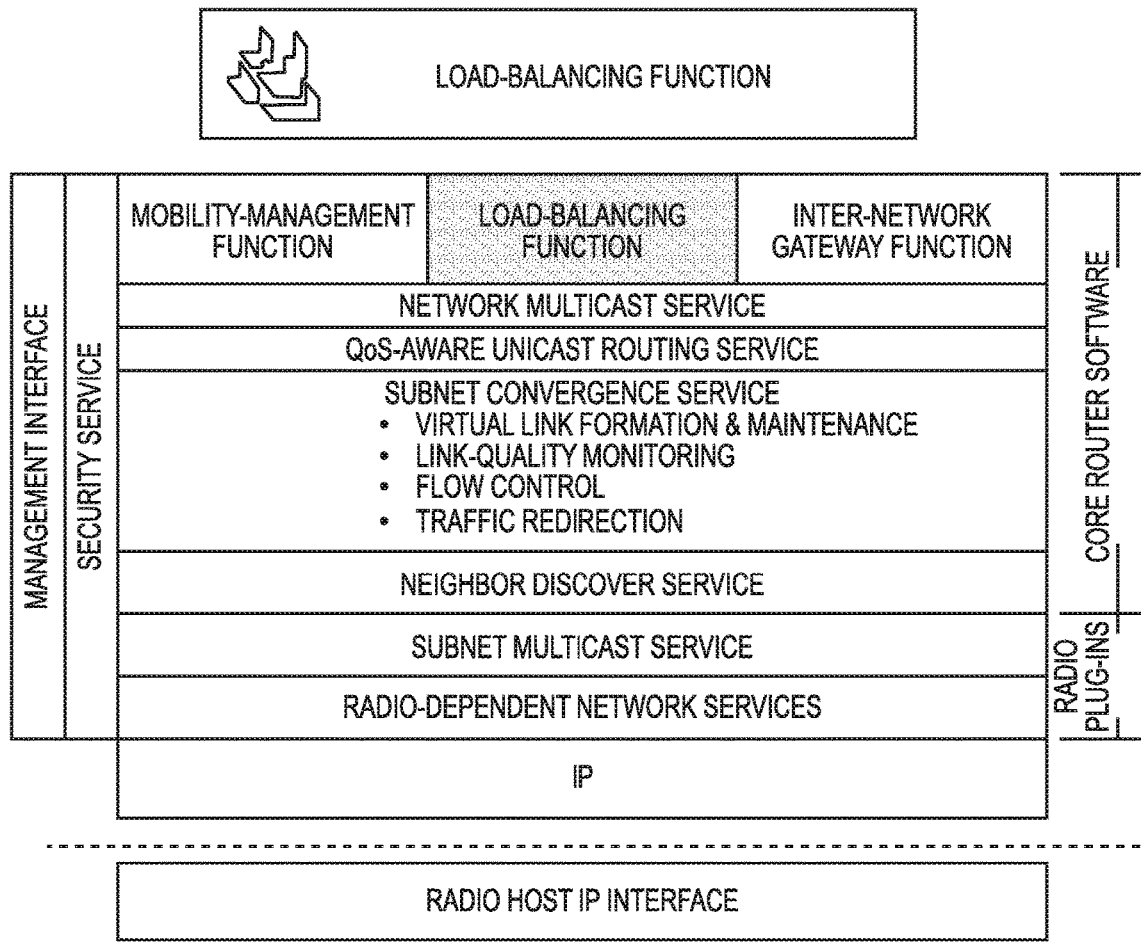
FIG. 43 and FIG. 44 are diagrams illustrating load balancing function.
Figure 44:
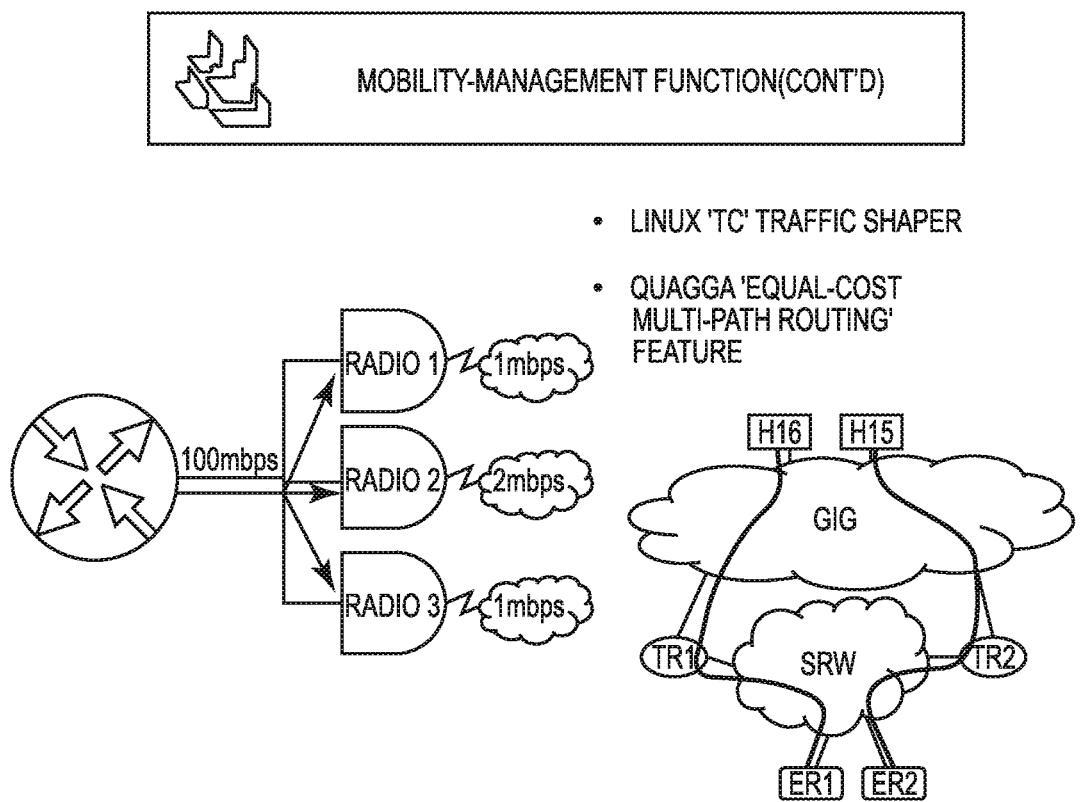
Figure 45:
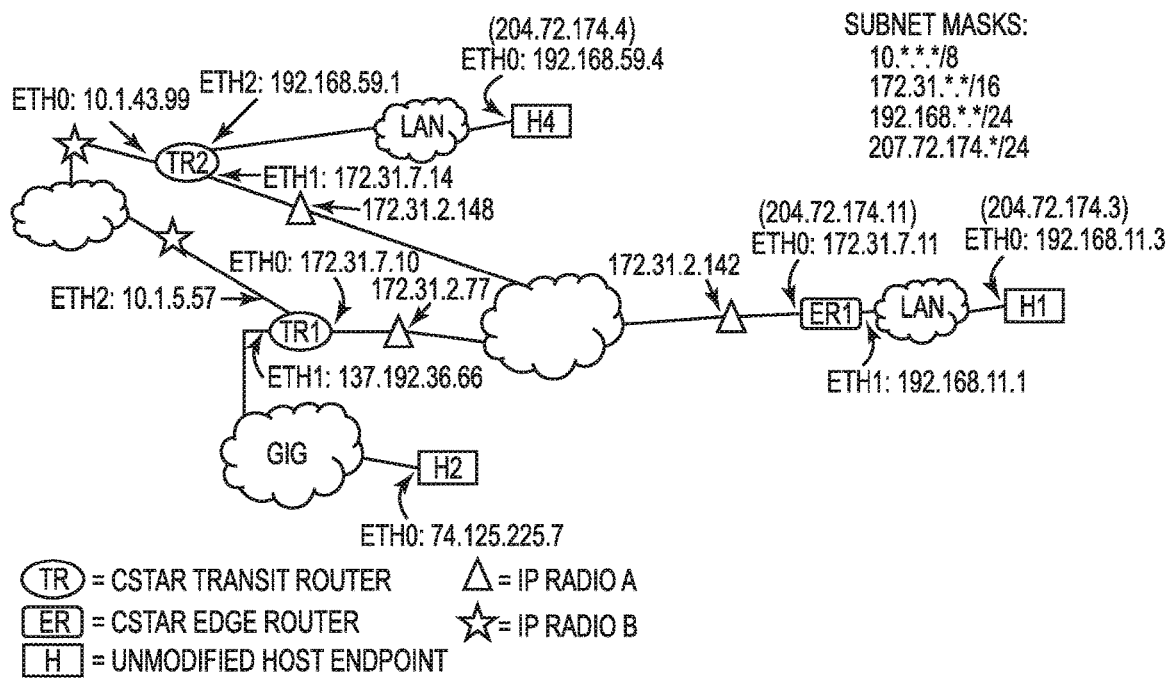
FIG. 45 is a diagram illustrating a test in which redundant paths between subnetworks are created and on the paths is impaired.
Figure 47:
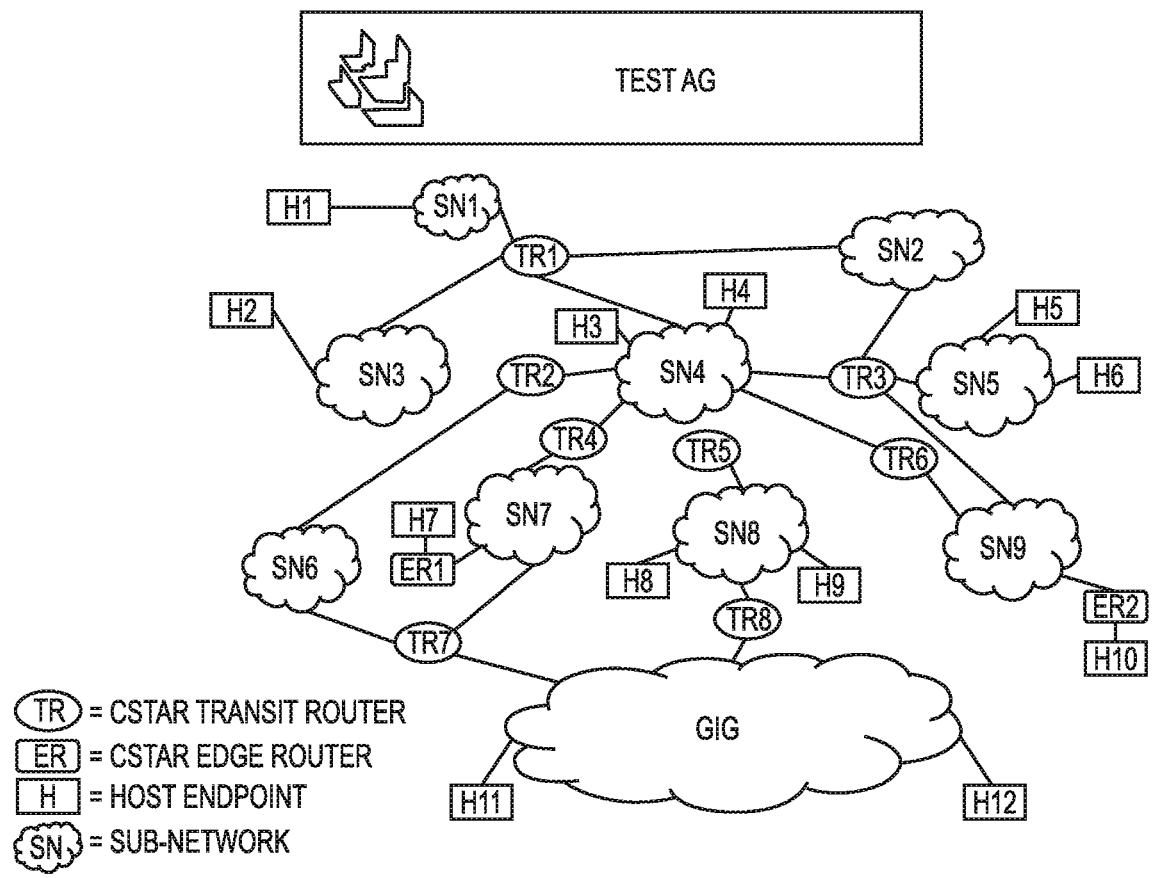
FIG. 47 is a diagram illustrating a test platform for network aware, traffic aware; proactive failover and load balancing.

Each packet is tagged by HART a. Sequence number (S) is injected into packet header
b. H+S is the same size as H
The receiving HART node decodes the tag
a. Packet loss occurs when sequence numbers are missing
Subnet convergence function: flow control is illustrated in FIG. 35 in which:
To prevent head-of-line blocking of packets within the radio
Network-level control of the rate at which packets are sent to attached radios
Adaptive per-virtual-link rate control based on dynamic sensing of virtual link
May augment radio-supported flow control (e.g., RFC 5578)
Subnet convergence function: flow control is further illustrated in FIG. 36 in which HART:
Prevents radio buffer overrun and packet loss due to head-of-line blocking
Sends at rate matched to receiver capability
a. Token-bucket scheme
b. Window-based control
Subnet convergence function: traffic redirection is illustrated in FIG. 37 in which:
HART provides redirection of an IP packet flow to a different next-hop than the current one for load balancing or for traffic-aware routing
Flow redirection based source and destination addresses of IP packets
Subnet convergence function: traffic redirection is further illustrated in FIG. 38 in which:
Transit Router Decision
a. Route Through Default
b. Route Through Alternate
c. Redirect To Alternate
Quality of service (QoS) aware unicast routing service is illustrated in FIG. 39 in which:
Interconnection of radio IP subnets into one HART network
OSPF-based core routing protocol for unicast routing over inter-router virtual links
Maintenance of multiple metrics per virtual link
Multiple routing tables, one per routing metric
Link-aware route selection
Traffic-aware route selection
a. And in FIG. 40 in which:
Linux kernel router
OSPF overlay network of HART routers
Quagga router control daemons
Kernel routing tables for each traffic class
a. Latency-sensitive
b. Latency-tolerant
Use OSPF TOS-specific Link State Advertisements (LSAs)
Tag traffic with DSCP/TOS fields of IP frame
Mobility-management function is illustrated in FIG. 41 in which:
a. Enable subnet-hopping of HART endpoints
b. Automatic detection of current radio subnet
c. Automatic selection of subnet-specific address for the endpoint
d. Mobility registry providing mapping between portable address of endpoint and its current subnet-specific address
e. AODV-based mechanism to enable routing to portable addresses in case the mobility registry is unreachable
f. And FIG. 42 in which:
HART "portable" IP address
Reachable on any subnet for which it has been configured
HART routers maintain reachability information about "portable" address to subnet-specific address mapping
Mobility registry maintains mapping between portable and subnet-specific addresses
Mobility registry "beacons" its presence using network-wide multicast
Transit router periodically registers the portable and subnet-specific addresses of nodes resident on any of its subnets
Transit router consults mobility registry if it does not have a mapping between the portable address and subnet-specific address for a packet it is forwarding
If the mobility registry is not reachable, the transit router invokes AODV to resolve the portable address of a packet
Load-balancing function is illustrated in FIG. 43 in which:
Network-optimized data transport
Distribution of traffic exiting an IP subnet across multiple egress links, if applicable
a. And in FIG. 44 in which:
Linux 'tc' traffic shaper
Quagga 'equal-cost multi-path routing' feature
Quality of Service (QoS) Overview
Goal to deliver predictable data services
Important for providing reliable services that are sensitive to bandwidth, latency and error rate
a. Voice
b. Video
Defined by a set of parameters that describe service level
a. Bandwidth
b. Buffer usage
c. Delay
d. etc.
Quality of Service (QoS) Overview
HART Black side QoS
a. DiffSery with DSCP translation between domains
KG-250X can provide Red side QoS
a. Red side service level maps to Black side DSCP
b. End-to-end QoS with HART
SRS complete, design in progress
Red side QoS Design
Integrated Services: Flow-based service level guarantees via RSVP
a. Red flow source and destination hosts initiate RSVP exchange
b. All Red side routers, including KG-250X, participates in the RSVP exchange
c. Establishes guaranteed level of service for the flow, or fails
i. Source host can try again for a lower level of service
Test AE (illustrated in FIG. 45) creates redundant paths between subnetworks within the network. One of the paths is impaired to exercise the router's ability to switch to the "better" redundant link.
Creates redundant paths between subnetworks within the HART network
One of the paths is impaired to exercise routers' ability to switch to the "better" redundant link
Test AF, illustrated in FIG. 46, simplifies test description by eliminating IP addressing specifics, recreates redundant links and verifies load balancing enabling multicast efficiency.
Simplifies test description by eliminating IP addressing specifics
Recreates redundant links
Verifies load balancing, multicast efficiency
Test AG, illustrated in FIG. 47, is network aware and traffic aware.

Figure 49:
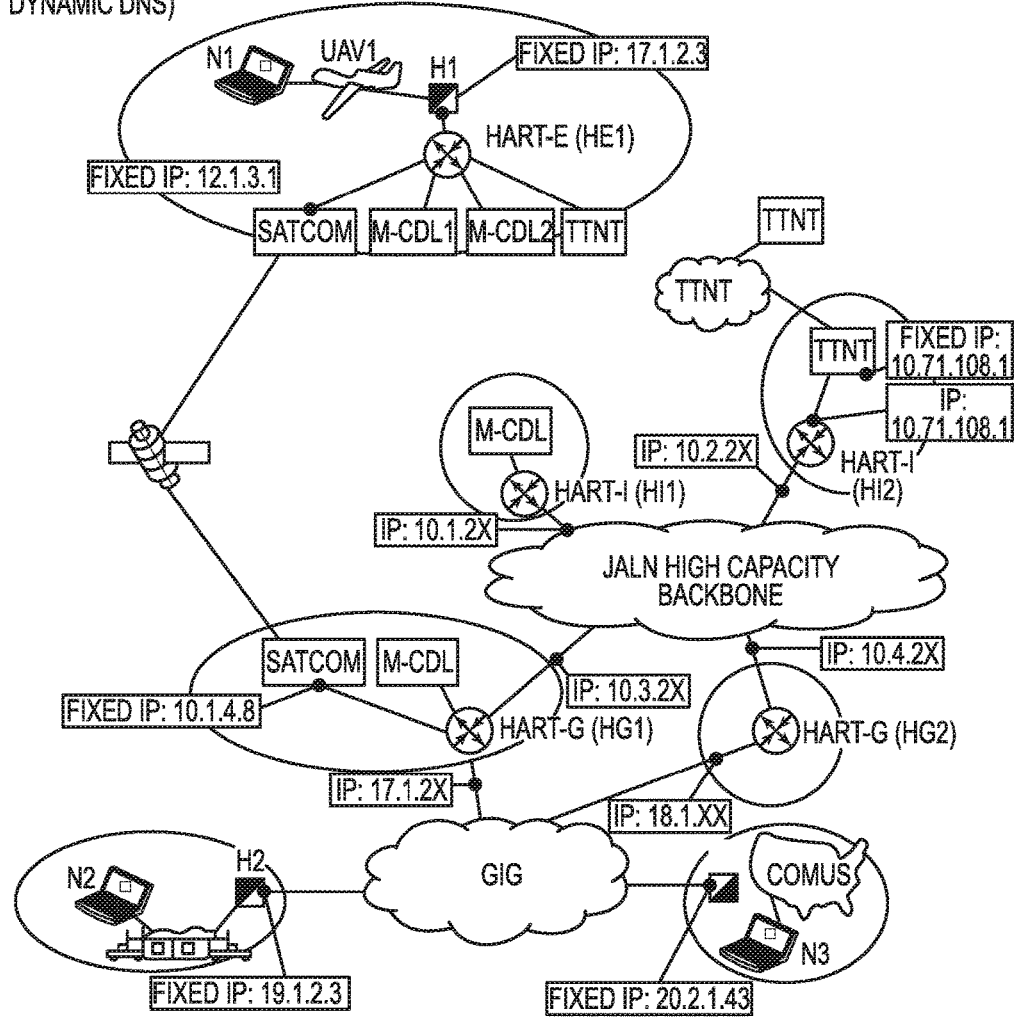
FIG. 49 is a diagram illustrating the use case of FIG. 48 when a node joins the network (step 1)
Figure 50:
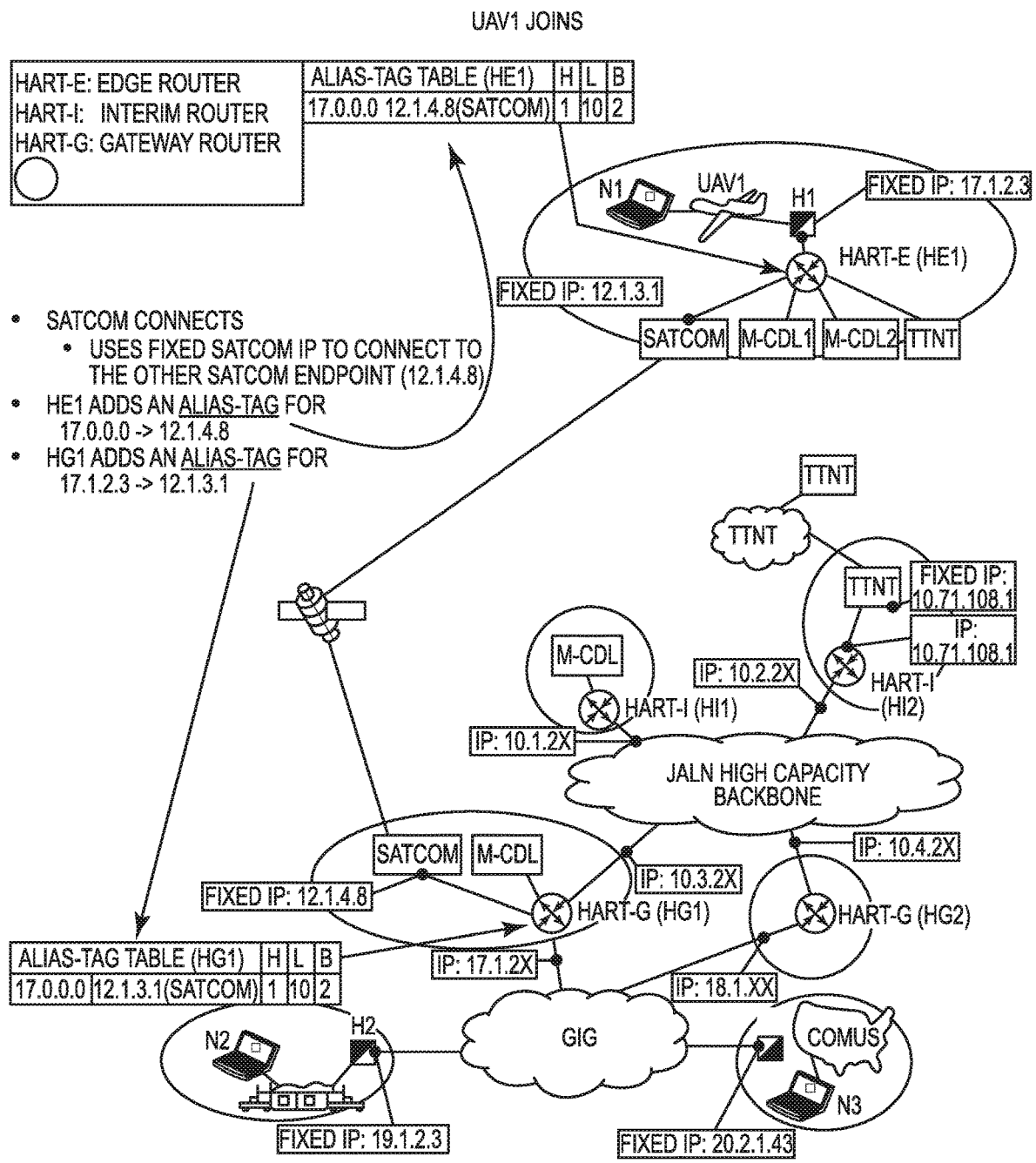
FIG. 50 is a diagram illustrating the use case of FIG. 48 when a node joins the network (step 2)
Figure 51:
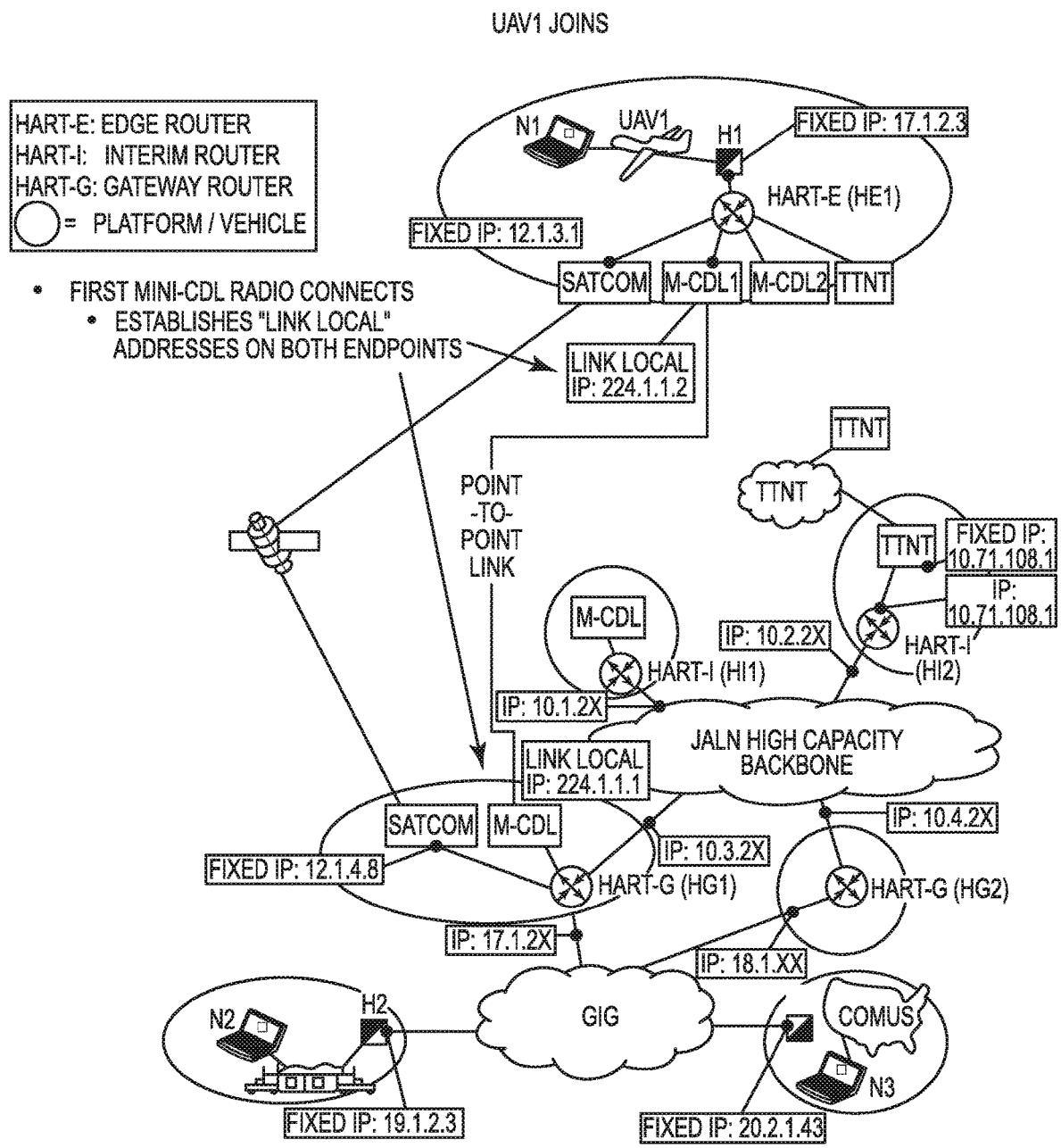
FIG. 51 is a diagram illustrating the use case of FIG. 48 when a node joins the network (step 3)
Figure 52:
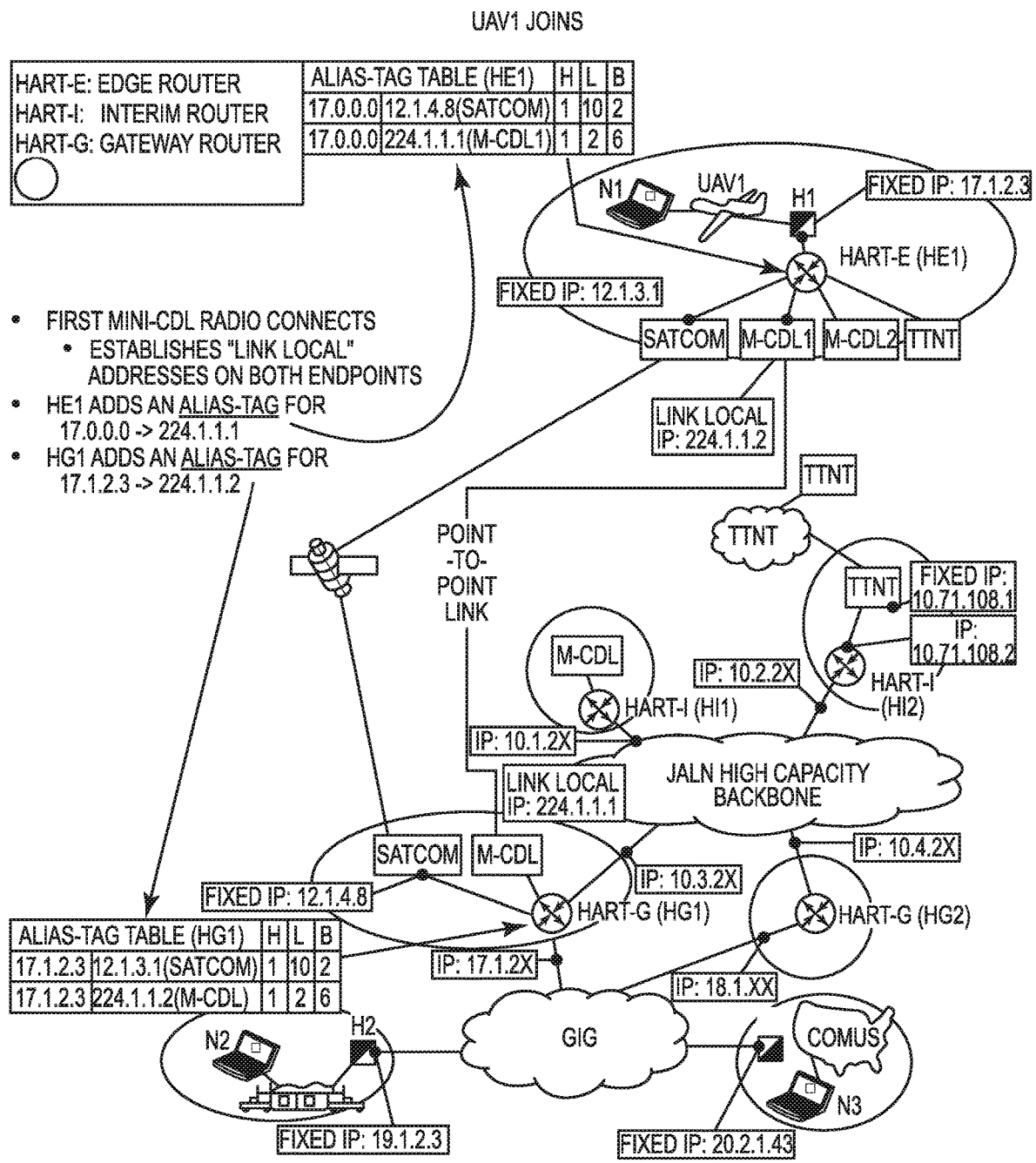
FIG. 52 is a diagram illustrating the use case of FIG. 48 when a node joins the network (step 4)
Figure 53:
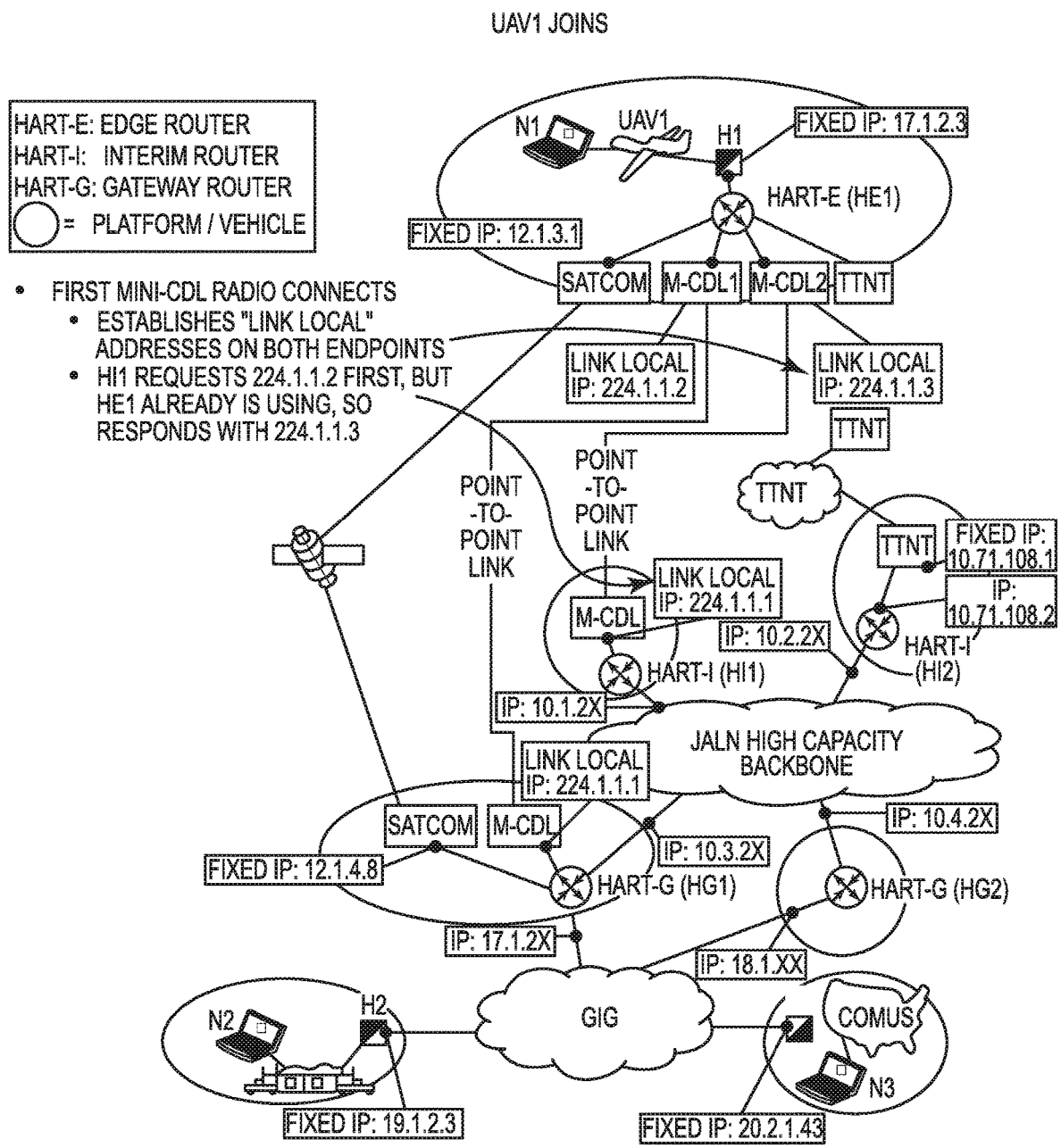
FIG. 53 is a diagram illustrating the use case of FIG. 48 when a node joins the network (step 5)
Figure 54:
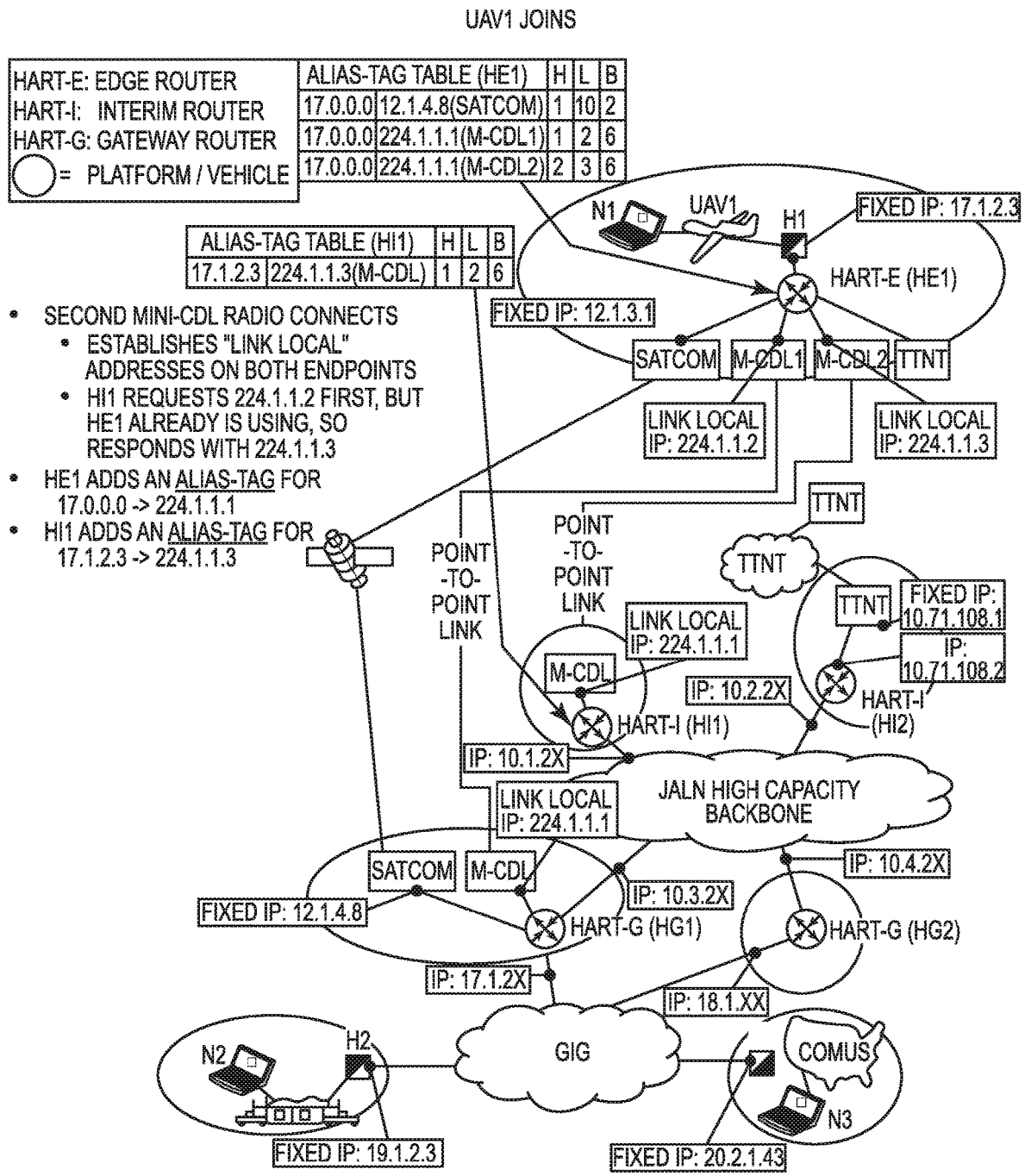
FIG. 54 is a diagram illustrating the use case of FIG. 48 when a node joins the network (step 6)
Figure 55:
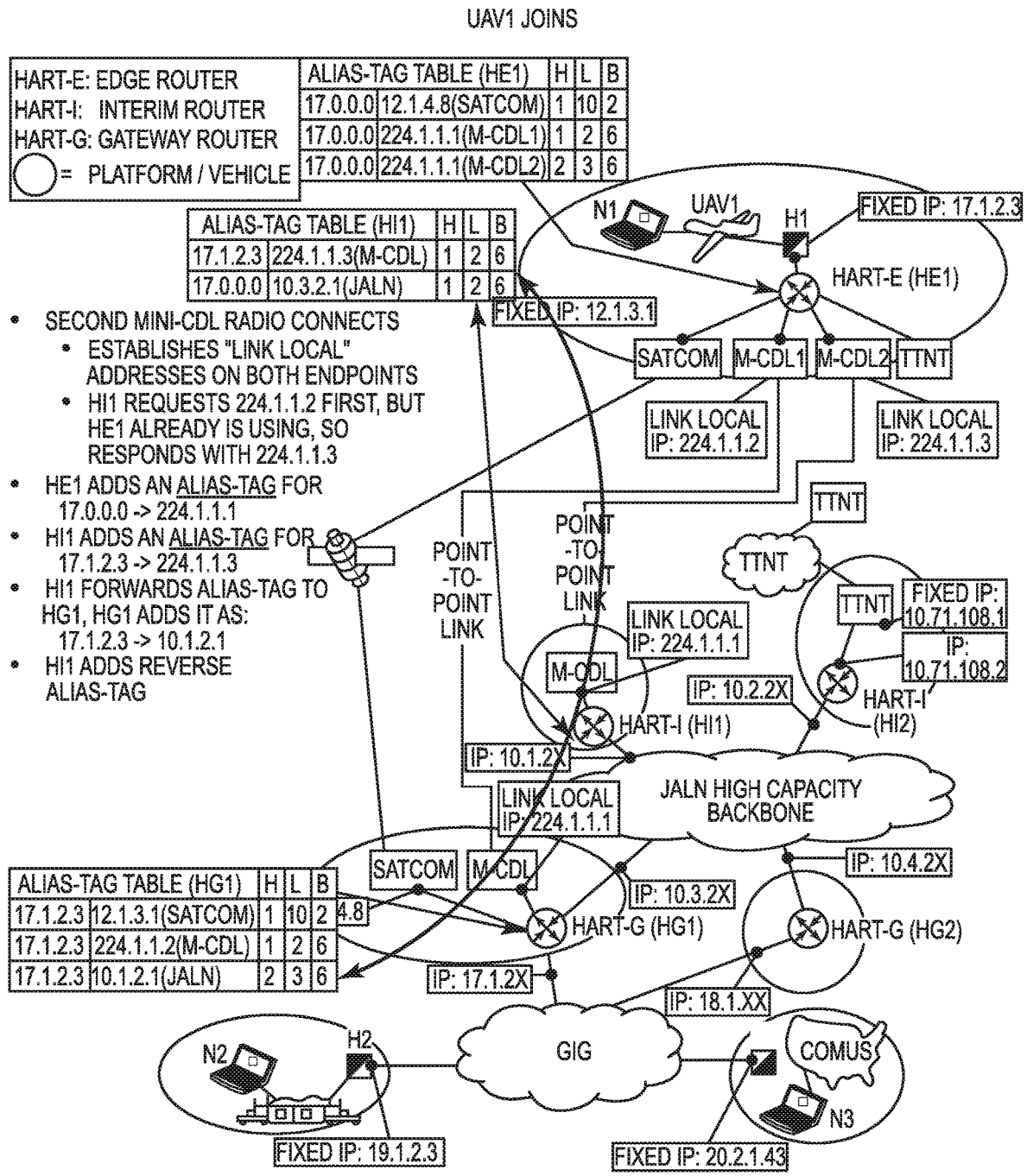
FIG. 55 is a diagram illustrating the use case of FIG. 48 when a node joins the network (step 7)
Figure 56:
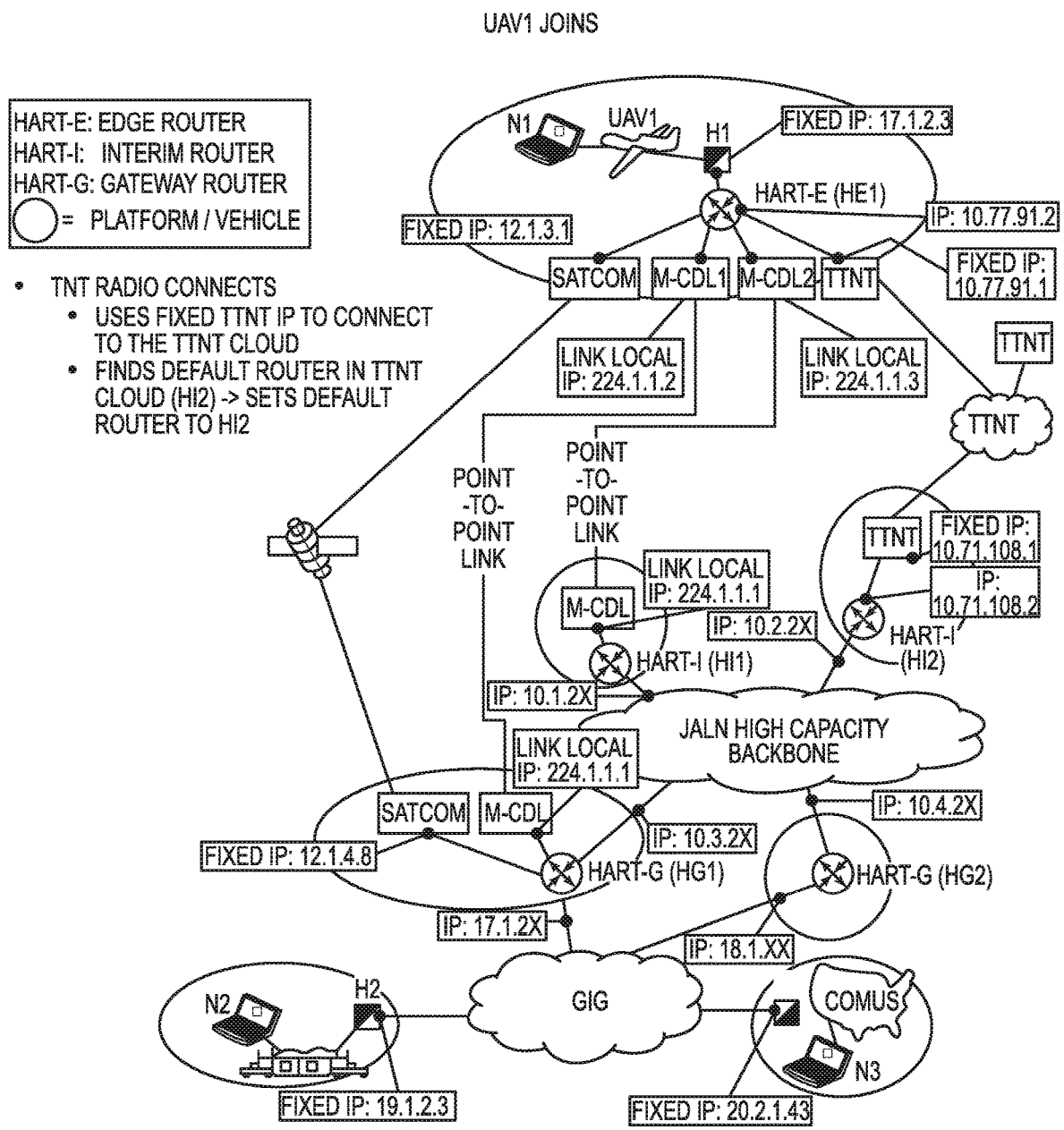
FIG. 56 is a diagram illustrating the use case of FIG. 48 when a node joins the network (step 8)
Figure 57:
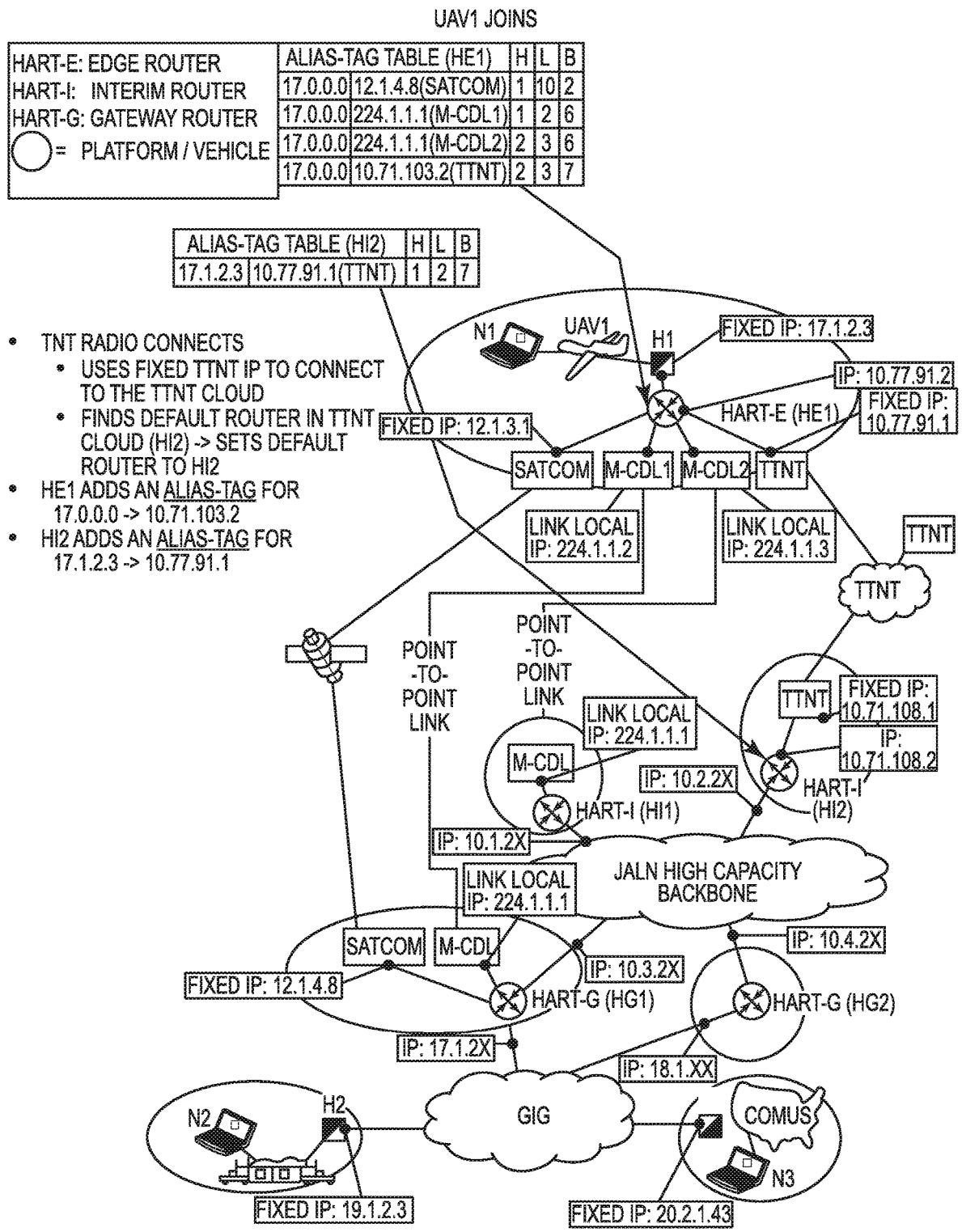
FIG. 57 is a diagram illustrating the use case of FIG. 48 when a node joins the network (step 9)
Figure 58:
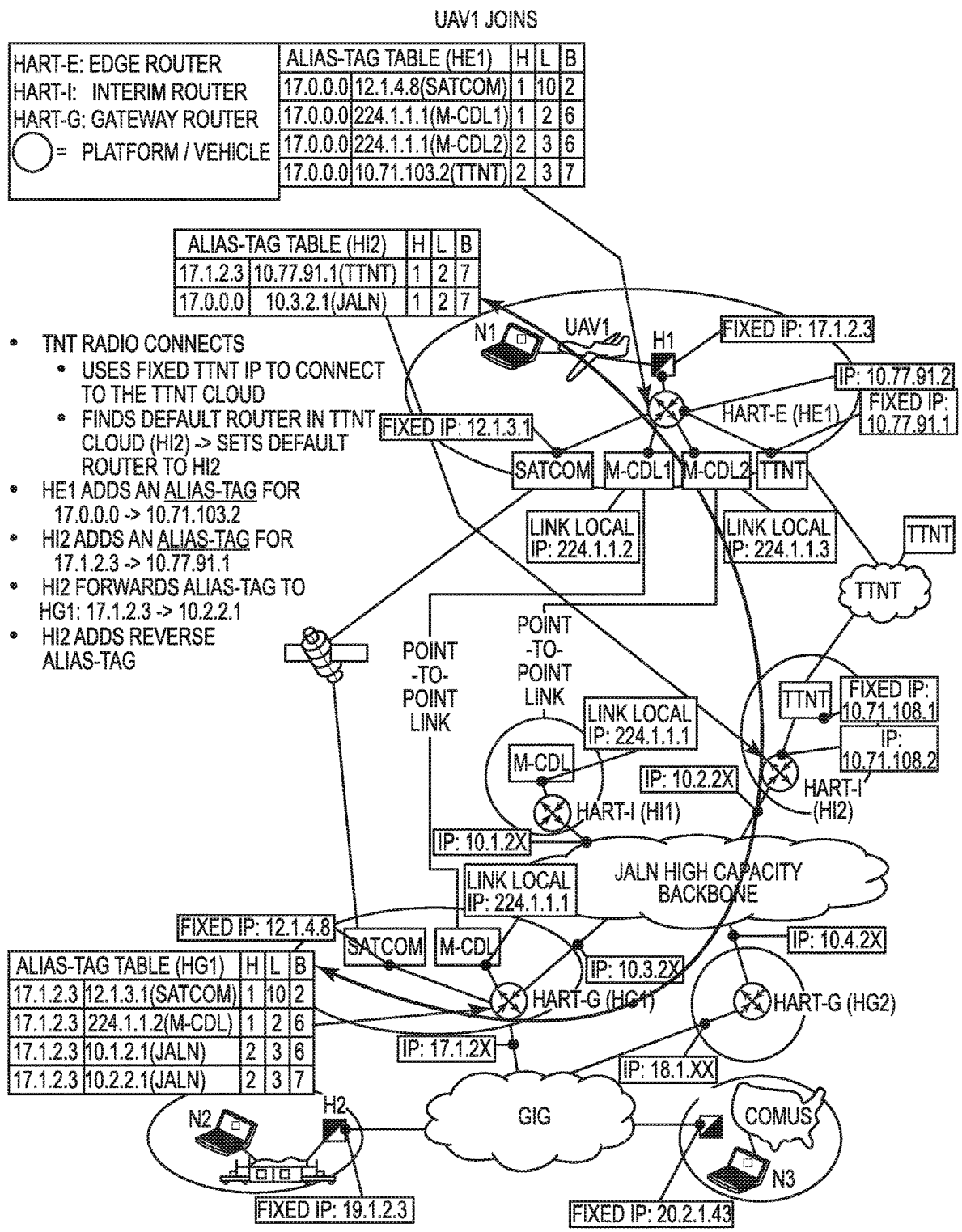
FIG. 58 is a diagram illustrating the use case of FIG. 48 when a node joins the network (step 10)
Figure 59:
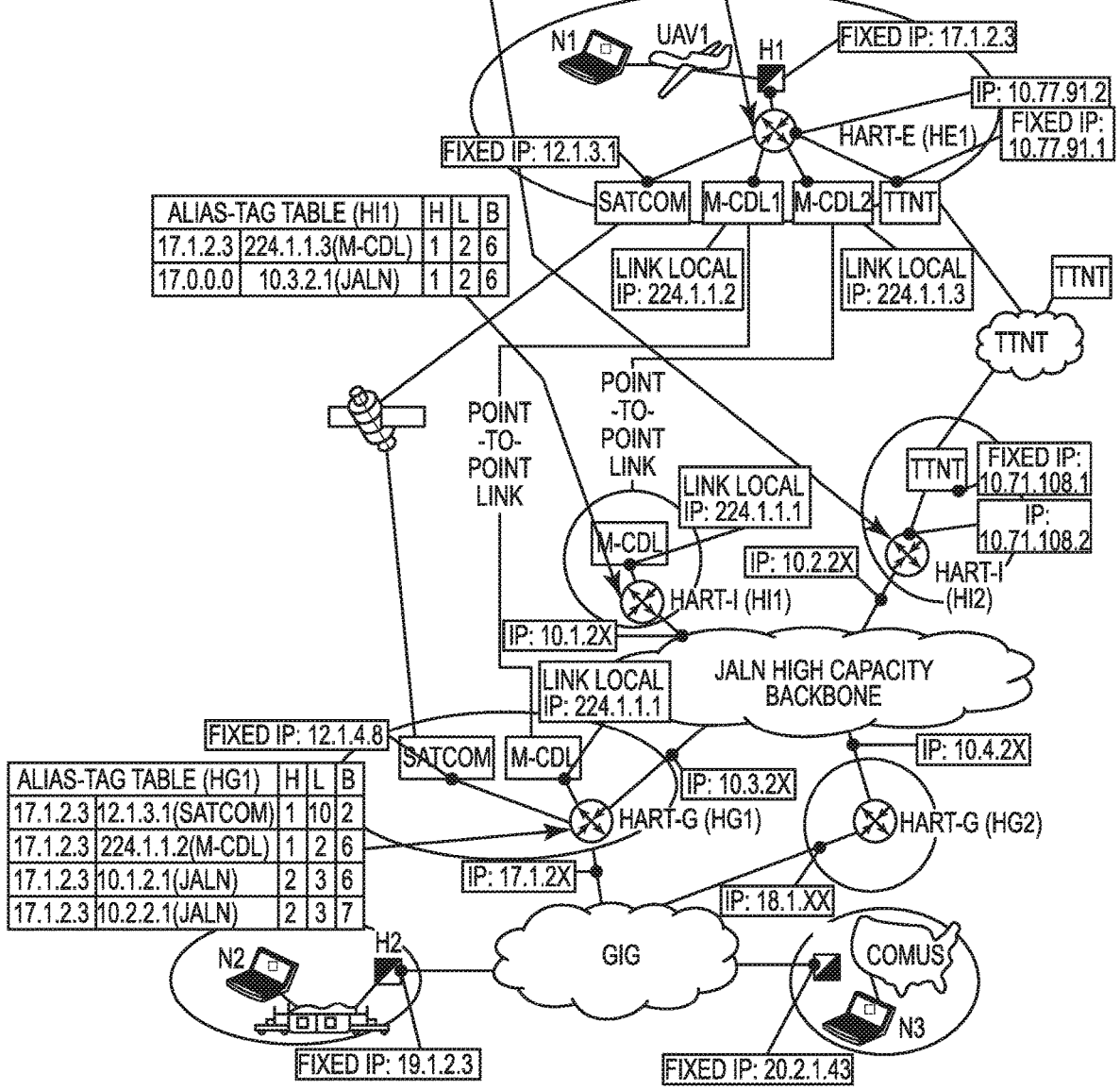
FIG. 59 is a diagram illustrating the use case of FIG. 48 when a node joins the network showing completed table entries.
Figure 60:
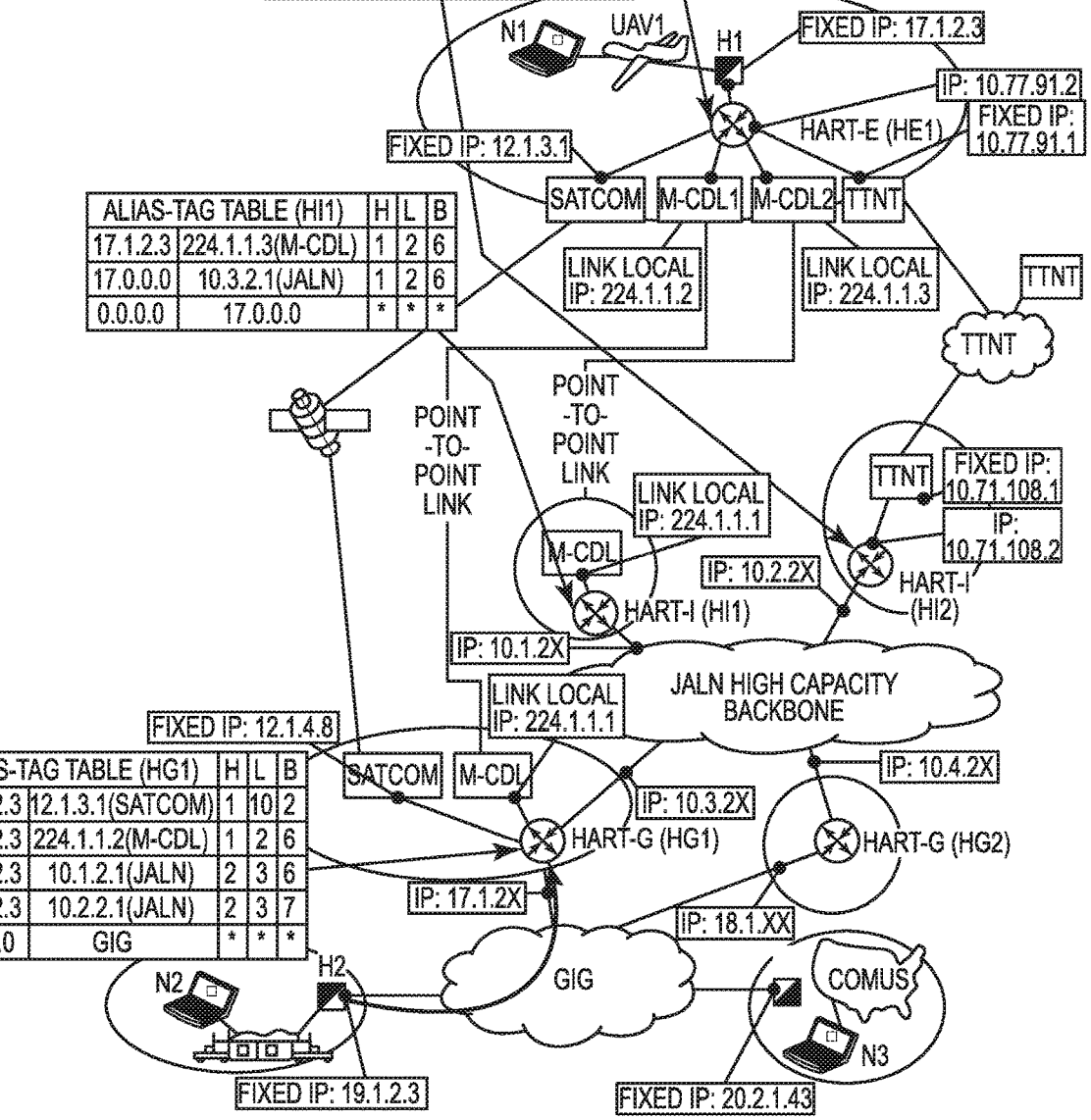
FIG. 60 is a diagram illustrating a use case of routing a packet (step 1)
Figure 61:
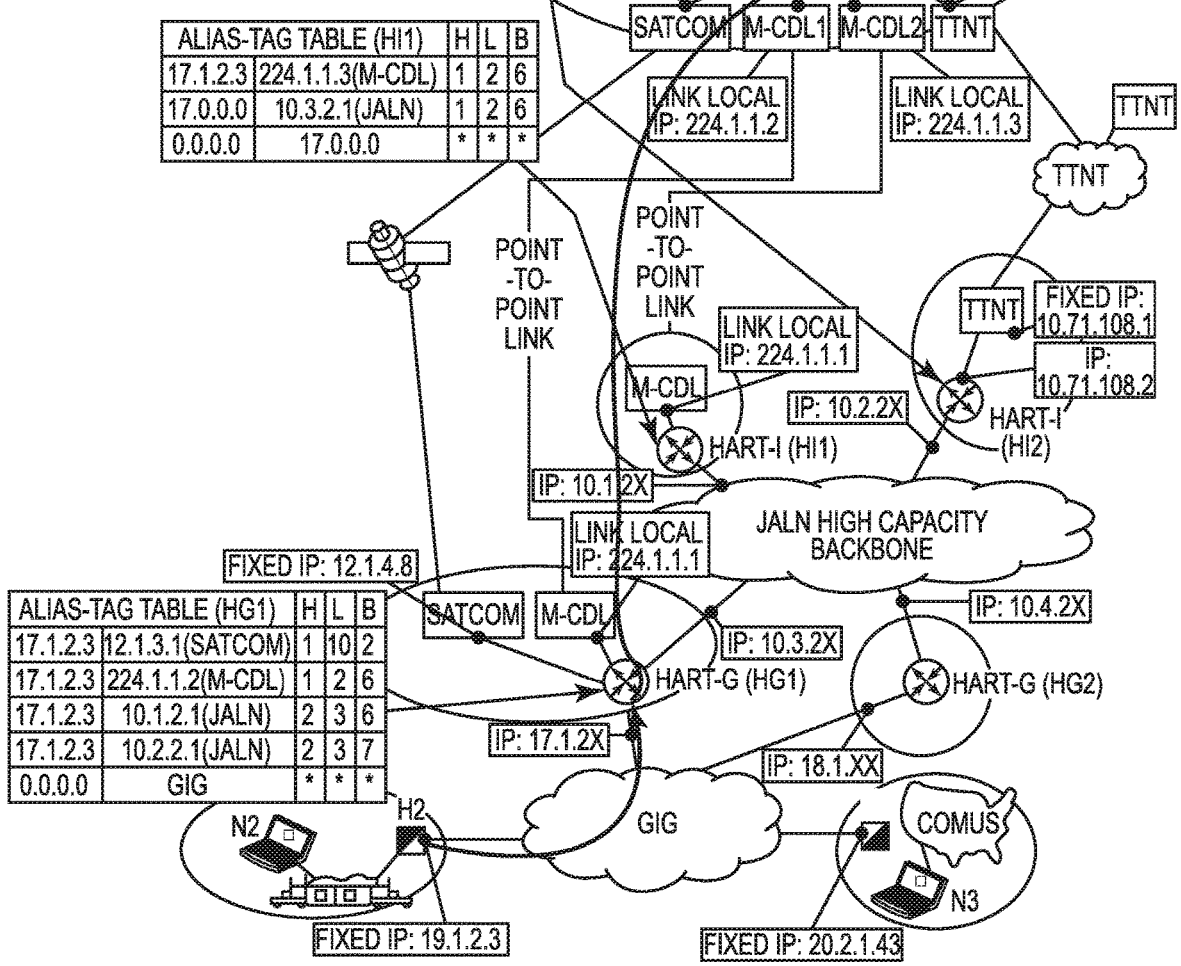
FIG. 61 is a diagram illustrating the use case of FIG. 60 routing a packet (step 2)
Figure 62:
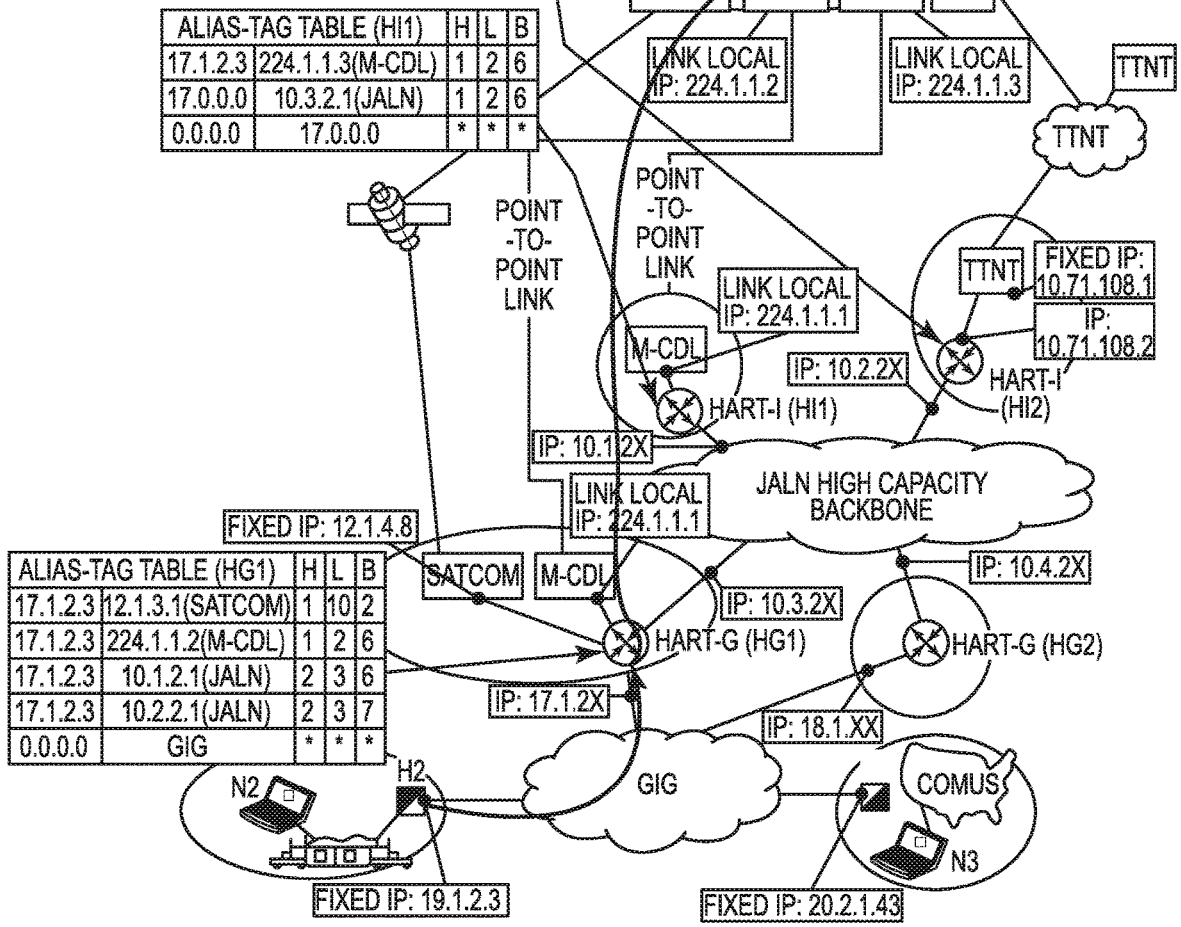
FIG. 62 is a diagram illustrating the use case of FIG. 60 routing a packet (step 3)
Figure 63:
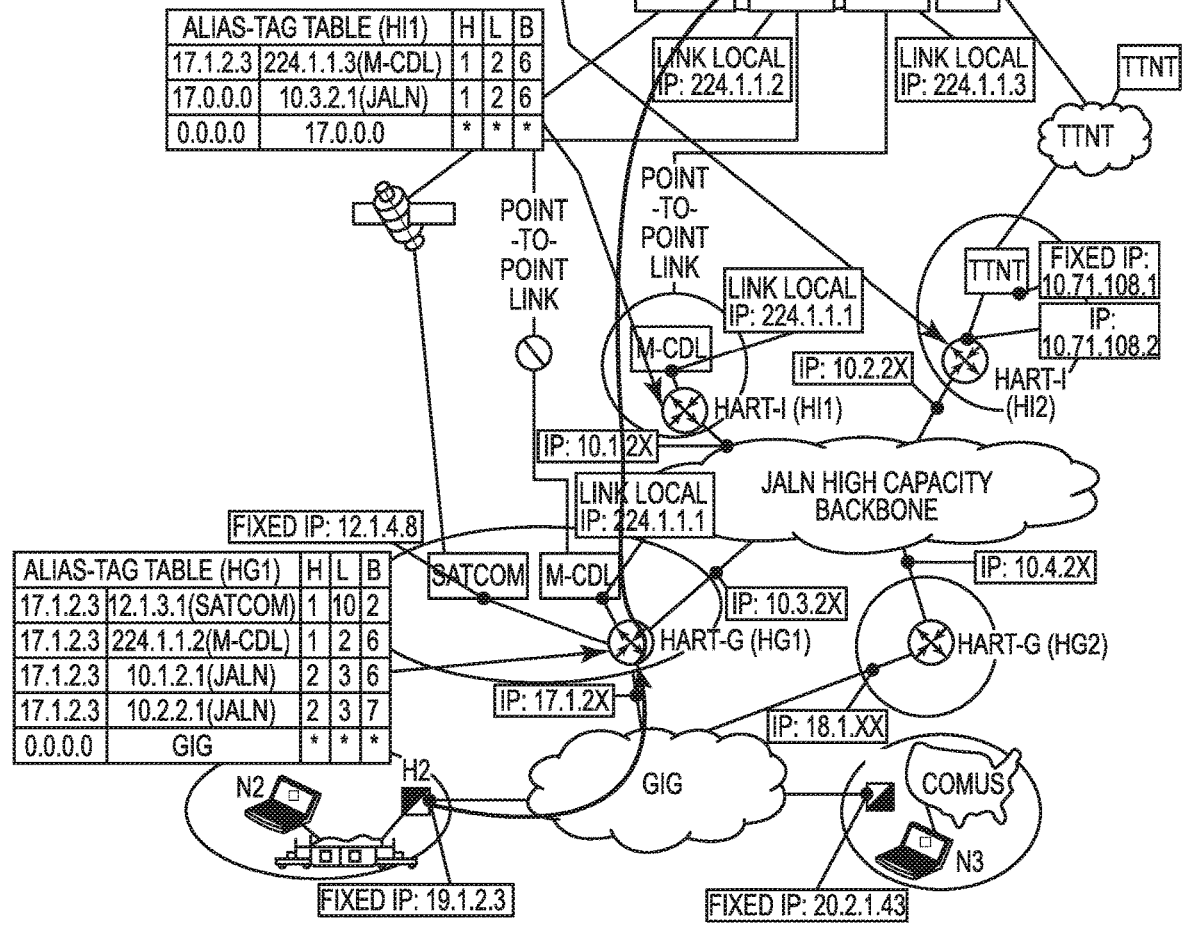
FIG. 63 is a diagram illustrating a use case of routing a packet.
Figure 64:
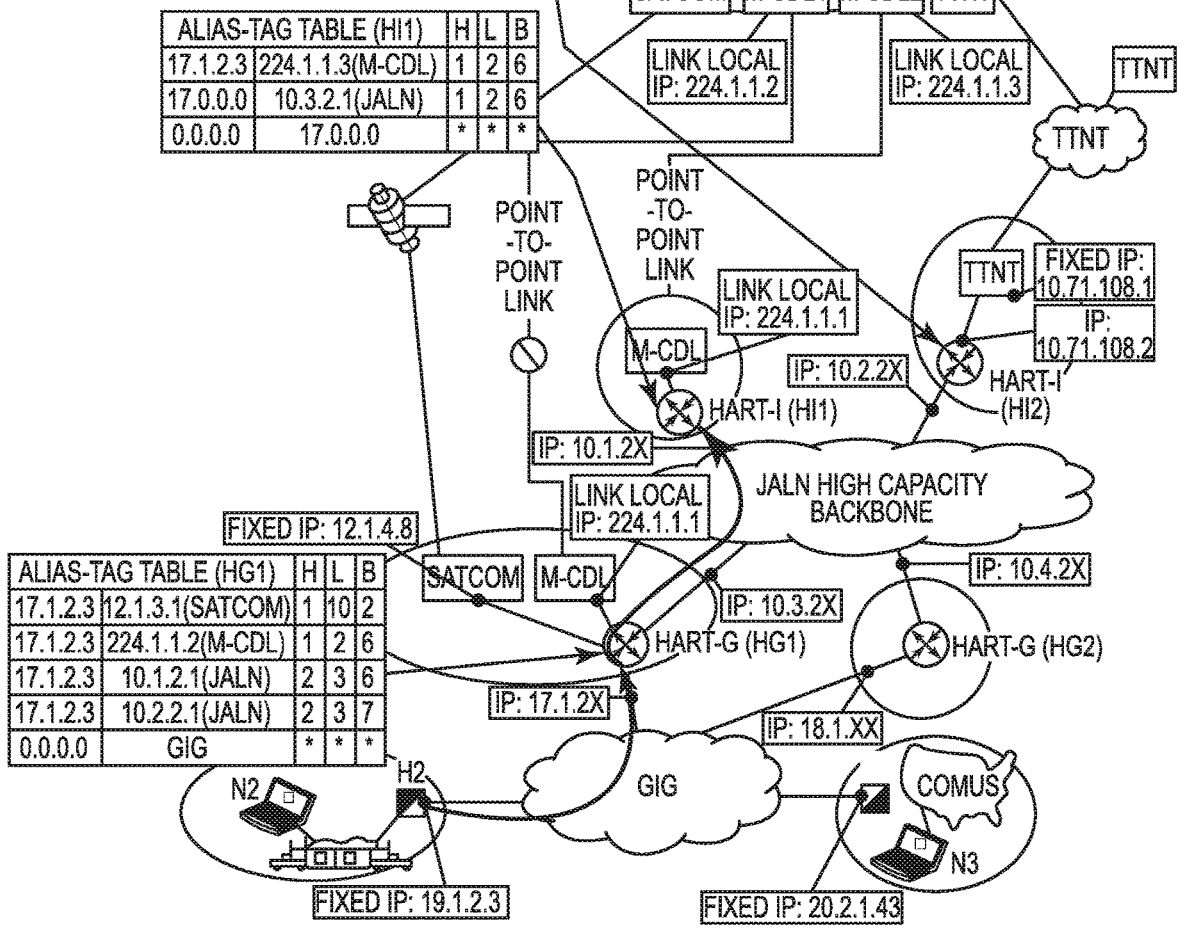
FIG. 64 is a diagram illustrating a use case of re-routing a packet (step 1)
Figure 65:
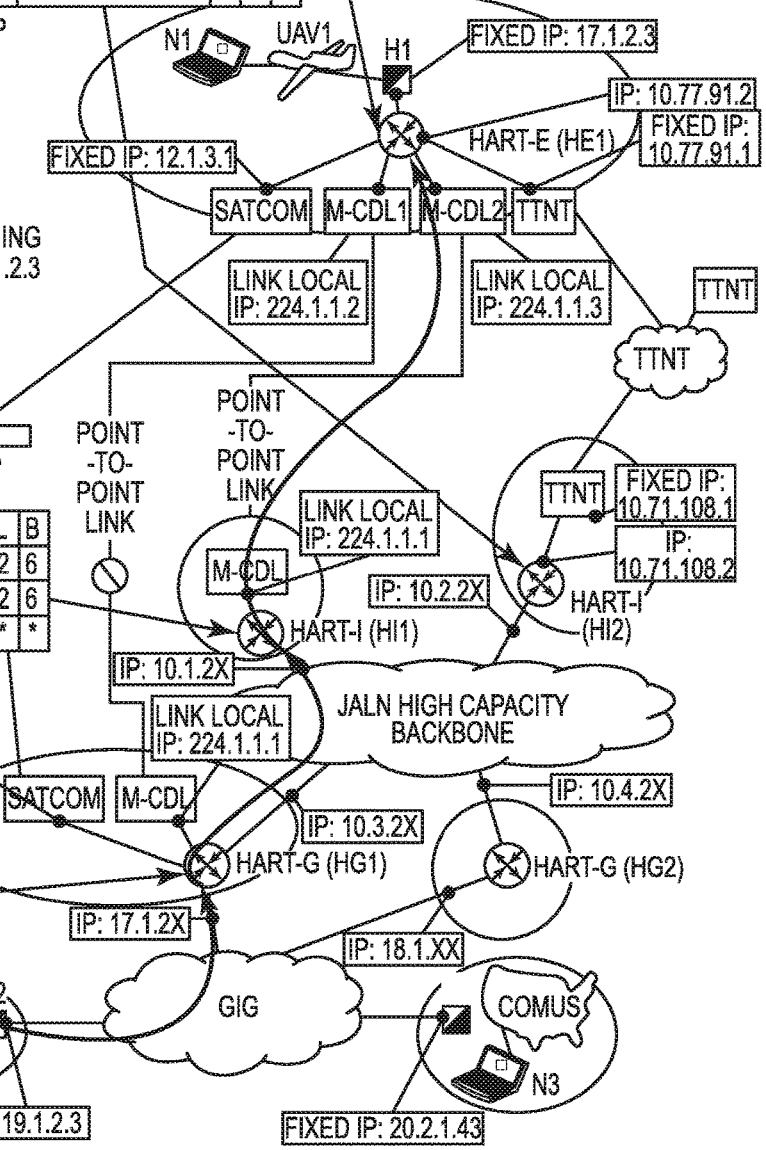
FIG. 65 is a diagram illustrating the use case of FIG. 64 re-routing a packet (step 2)
Figure 66:
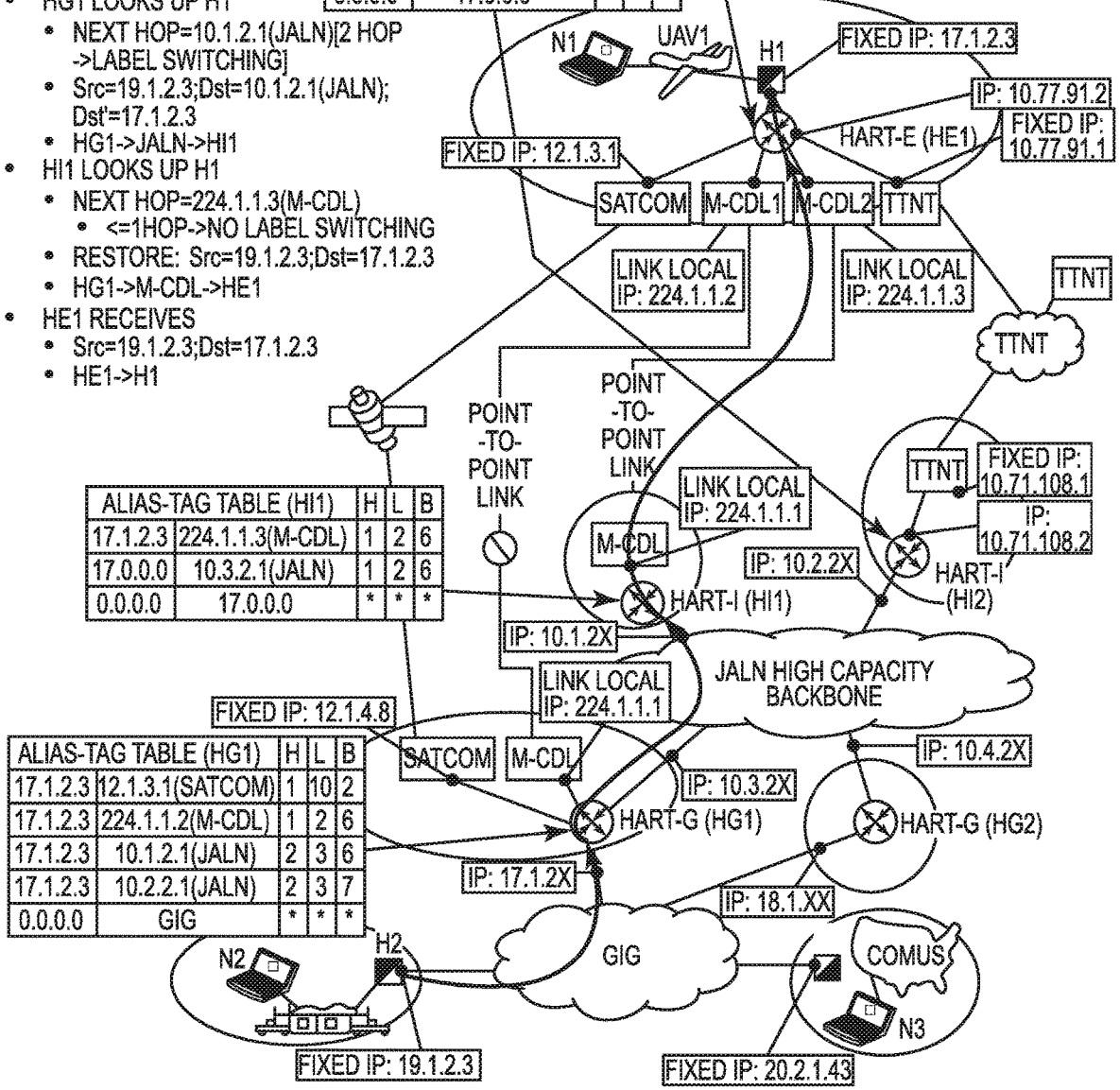
FIG. 66 is a diagram illustrating the use case of FIG. 64 re-routing a packet (step 3)

Network Aware:
  a. Automatically configured network communication, without manual configuration, between/among networks having differing IP protocols
    i. Hybrid routing with address switching
    ii. Multi-cast video feed
  Traffic Aware
  a. Choose network route, over a network having a path with a plurality of intermediate nodes, based, at least in part, on the type of traffic/message
    i. E.g., file transfer: choose route having a relatively high bandwidth
    ii. E.g., talk: choose route having relatively low latency
  b. Multiple routing tables based on different metrics
    i. E.g., Table I: based on bandwidth
    ii. E.g., Table II: based on latency
  c. IP header marked with type of traffic
    i. Uses the routing table based on the type of traffic
  Pro-active Failover
  a. Autonomous quality aware routing
  b. Switch from existing route to a new route prior to network communication failure
    i. i.e., before communication is lost
    ii. built-in fault tolerance
    a. If link (route) quality factor degrades below a [predetermined] threshold, then switch route before communication is lost
    i. E.g., miss two packets but one packet gets through
    a. Monitor quality of each individual link
    b. Detect and remember packet loss
  Load Balancing
  a. Apportions traffic over different routes based on [overall] network load, not just on an individual message
    i. Helps reduce network clogging
    ii. May result in a longer route for an individual message or some messages but [overall] network performance improves for all or more users
  Appendix A: Target IP Radios, Devices and Technologies to Integrate
  A. Primary integration technologies:
  a. TTNT: Tactical Targeting Network Technology
  IP Support: yes, radios provide IP support externally, and internally route at the lower network and mac layers
  Config API (read): SNMP
  Config API (write): SNMP
  Used for: Waveform developed for JTRS (Joint Tactical Radio System) for airborne networking. Similar to ANW (Airborne Networking Waveform). Used for MIDS (Multi-functional Information Distribution System) data traffic as well as other TCP/IP network traffic
  b. Mini-CDL: Miniature CDL Radio
  IP Support: yes, provides point-to-point links, used to create IP bridges
  Config API (read): custom API
  Config API (write): custom API
  Used for: Video and data links from mini and micro UAVs and UASes.
  a. NOTE: CDL waveform is not currently compatible with JTRS radios and cannot be used on them
  Background: Subset of CDL (Common Data Link) radio family, smaller form factor. CDL Family:
  a. TP-CDL: Team Portable CDL
  b. TCDL—Tactical Common Data Link. Used for: N-CDL, USQ-123, ATARS, BGPHES, CHBDL, SHARP, TIGDL I/II
  i. N-CDL: Networked CDL
  ii. TIGDL-II: Tactical Interoperable Ground Data Link II (2)
  c. MR-TCDL: Multi-Role Tactical CDL [ABE: Auxiliary Bandwidth Efficient; and Discovery]
  a. WiMax: Worldwide Interoperability for Microwave Access
  Config API (read): SNMP
  Config API (write): SNMP
  Used for: as a generic test radio (Similar properties to TTNT)
  a. FSO: Free Space Optical
  Config API (read): assumed SNMP
  Config API (write): assumed SNMP
  Used for: high bandwidth point-to-point links
  a. JCAN: Joint Capability for Airborne Networking Subnets
  Config API (read): BGP (BGP-MX) & SNMP
  Config API (write): BGP (BGP-MX) & SNMP
  Used for: Integrating legacy data links via an airborne gateway node
  a. ORCA: Optical RF Communications Adjunct
  Config API (read): assumed SNMP
  Config API (write): assumed SNMP
  Used for: Hybrid Optical and RF link (DARPA)
  a. BACN: Battlefield Airborne Communications Node
  Config API (read): BGP (BGP-MX) & SNMP
  Config API (write): BGP (BGP-MX) & SNMP
  Used for: Integrating legacy data links via an airborne gateway
  B. Other integration technologies
  a. QNT: Quint Networking Technology
  Config API (read): assumed SNMP
  Config API (write): assumed SNMP
  Used for: UASs, munitions
  c. ANW: Airborne Networking Waveform
  Config API (read): assumed SNMP
  Config API (write): assumed SNMP
  Background: Waveform developed for JTRS (Joint Tactical Radio System) for airborne networking. Similar to TTNT (Tactical Targeting Network Technology). Used for MIDS (Multi-functional Information Distribution System) data traffic as well as other TCP/IP network traffic
  a. aADNS: Airborne Automated Digital Network System
  Config API (read): assumed SNMP
  Config API (write): assumed SNMP
  a. ASSDL: Airborne Single Slot Data Link
  Config API (read): assumed SNMP
  Config API (write): assumed SNMP
  a. GBS/TGRS: Global Broadcast Service
  Config API (read): assumed SNMP
  Config API (write): assumed SNMP
  Uses: TGRS: Transportable ground receive suite for GBS
  a. MUOS: Mobile User Objective System
  Config API (read): assumed SNMP
  Config API (write): assumed SNMP
  Used for: JTRS waveform for SatCom (BLOS)
  a. SRW: Soldier Radio Waveform
  Config API (read): assumed SNMP
  Config API (write): assumed SNMP
  Used for: JTRS waveform
  a. WNW: Wideband Networking Waveform
  Config API (read): assumed SNMP
  Config API (write): assumed SNMP
  Used for: JTRS waveform
  Uses: OFDM, BEAM, AJ, LPI/D a. CMDL: Compact Multi-Band Data Link
Config API (read): assumed SNMP
Config API (write): assumed SNMP
a. SNR: Subnet Relay
Config API (read): assumed SNMP
Config API (write): assumed SNMP
Used for: ad hoc for maritime RF
Uses: HFIP (IP over HF [High Frequency—3 to 30 MHz])
a. TSAT: Transformational Satellite Communications System
Config API (read): assumed SNMP
Config API (write): assumed SNMP
Used for: Used for: HC3 (2)
a. HNW: Highband Network Waveform
Config API (read): assumed SNMP
Config API (write): assumed SNMP
Used for: HNR: Highband Network Radio, and WIN-T Waveform. WIN-T (Warfighter Information Network-Tactical)
b. NCW: Network-Centric Waveform
Config API (read): assumed SNMP
Config API (write): assumed SNMP
Used for: WIN-T Waveform. WIN-T (Warfighter Information Network-Tactical)
c. DISN: Defense Information System Network
Config API (read): BGP (BGP-MX) & SNMP
Config API (write): BGP (BGP-MX) & SNMP
Used for: NIPRnet (Non-Classified IP Router Network), SIPRnet (Secret IP Router Network)
Appendix B: Use Cases of HART Behavior
Use Case 1: Mixed HART Routers (TTNT, SatCom, and Mini-CDL)
Initial Setup
Definitions of some terms in the figures:
HART-Edge Router: No Routing, endpoint node only (little/no storage)
HART-Interim Router: Routing, maintains tables for routing (to and from), may include storage
HART-Gateway Router: Routing, Provides links to external and/or non-tactical networks (GIG, Internet, etc.)
Alias-tag Tables:
a. H: number of hops
b. L: Latency
c. B: Bandwidth
Initial setup process (FIG. 48):
HG1 detects GIG and declares "I'm a gateway router"
a. Broadcasts itself as "default route" to GIG.
HG2 detects GIG and declares "I'm a gateway router"
a. Broadcasts itself as "default route" to GIG.
HI1 detects no GIG and declares "I'm an Interim router" (default)
a. Receives "default route" from JALN (HG1 and HG2, for specified subnets)
HI2 detects no GIG and declares "I'm an Interim router" (default)
a. Receives "default route" from JALN (HG1 and HG2, for specified subnets)
b. Becomes "default router" for TTNT radio subnet to link them to GIG (thru JALN)
Node Joins a Mixed HART Network
When a Node Joins (FIG. 49)—Step 1:
Establish each link from that node to the existing network
Add alias-tags at various endpoints in the network to enable label switching (faster than routing) (This is the HART Dynamic DNS)
Step 2, FIG. 50:
SatCom connects: Uses fixed SatCom IP to connect to the other SatCom endpoint (12.1.4.8)
HE1 adds an alias-tag for 17.0.0.0->12.1.4.8
HG1 adds an alias-tag for 17.1.2.3->12.1.3.1
Step 3, FIG. 51:
First Mini-CDL Radio Connects
a. Establishes "link local" addresses on both endpoints
Step 4, FIG. 52:
HE1 adds an alias-tag for 17.0.0.0->224.1.1.1
HG1 adds an alias-tag for 17.1.2.3->224.1.1.2
Step 5, FIG. 53:
Second Mini-CDL Radio connects
a. Establishes "link local" addresses on both endpoints
b. HI requests 224.1.1.2 first, but HE1 already is using, so responds with 224.1.1.3
Step 6, FIG. 54:
HE1 adds an alias-tag for 17.0.0.0->224.1.1.1
HI1 adds an alias-tag for 17.1.2.3->224.1.1.3
Step 7, FIG. 55:
HI1 forwards alias-tag to HG1, HG1 adds it as: 17.1.2.3->10.1.2.1
HI1 adds reverse alias-tag
Step 8, FIG. 56:
TTNT Radio connects
a. Uses fixed TTNT IP to connect to the TTNT cloud
b. Finds default router in TTNT cloud (HI2)->sets default router to HI2
Step 9, FIG. 57:
HE1 adds an alias-tag for 17.0.0.0->10.71.103.2
HI2 adds an alias-tag for 17.1.2.3->10.77.91.1
Step 10, FIG. 58:
HI2 forwards alias-tag to HG1: 17.1.2.3->10.2.2.1
HI2 adds reverse alias-tag
Completed Table Entries are illustrated in FIG. 59:
Packet Routing, Rerouting and Return
Routing Step 1 (FIG. 60):
Packet leaves H2
a. Packet: Src=19.1.2.3; Dst=17.1.2.3; Data
b. H2→GIG→HG1
Routing Step 2 (FIG. 61):
HG1 looks up H1
a. Next hop=224.1.1.2(M-CDL): <=1 hop→no label switching
b. Packet: Src=19.1.2.3; Dst=17.1.2.3; Data
c. HG1→M-CDL→HE1
Routing Step 3 (FIG. 62):
HE1 receives
a. Packet: Src=19.1.2.3; Dst=17.1.2.3; Data
b. HE1→H1
Error occurs in M-CDL1 link (FIG. 63):
Re-Routing Step 1 (FIG. 64):
HG1 looks up H1
a. Next hop=10.1.2.1(JALN): 2 hop 4 label switching
b. Packet: Src=19.1.2.3; Dst=10.1.2.1 (JALN); Dst'=17.1.2.3; Data
c. HG1→JALN→HI1
Re-Routing Step 2 (FIG. 65):
HI1 looks up H1
a. Next hop=224.1.1.3(M-CDL): <=1 hop→no label switching
b. Restore packet: Src=19.1.2.3; Dst=17.1.2.3; Data
c. HG1→M-CDL→HE1
Re-Routing Step 3 (FIG. 66):
HE1 receives
a. Packet: Src=19.1.2.3; Dst=17.1.2.3; Data
b. HE1→H1

Figure 67:
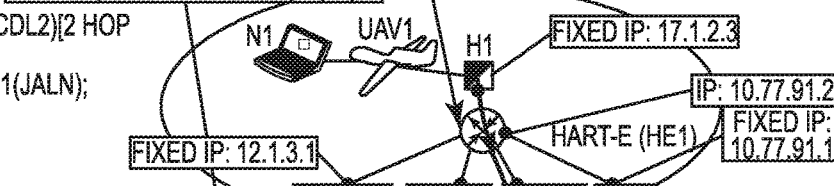
FIG. 67 is a diagram illustrating a use case of routing a packet illustrating a return path.

Return Path (FIG. 67):
Packet leaves H1
a. Packet: Src=17.1.2.3; Dst=19.1.2.3; Data
b. H1→HE1
HE1 looks up H2
a. Next hop=224.1.1.1(M-CDL2)
i. 2 hop→label switching
b. Packet: Src=17.1.2.3; Dst=224.1.2.1 (JALN); Dst'=19.1.2.3; Data
c. HE1→M-CDL2→HI1
HI1 looks up H2
a. Next hop=10.3.2.1(JALN)
i. <=1 hop→no label switching
b. Restore Packet: Src=17.1.2.3; Dst=19.1.2.3; Data
c. HI1→JALN→HG1
HG1 receives
a. Packet: Src=17.1.2.3; Dst=19.1.2.3; Data
b. HG1→GIG→H2

Figure 68:
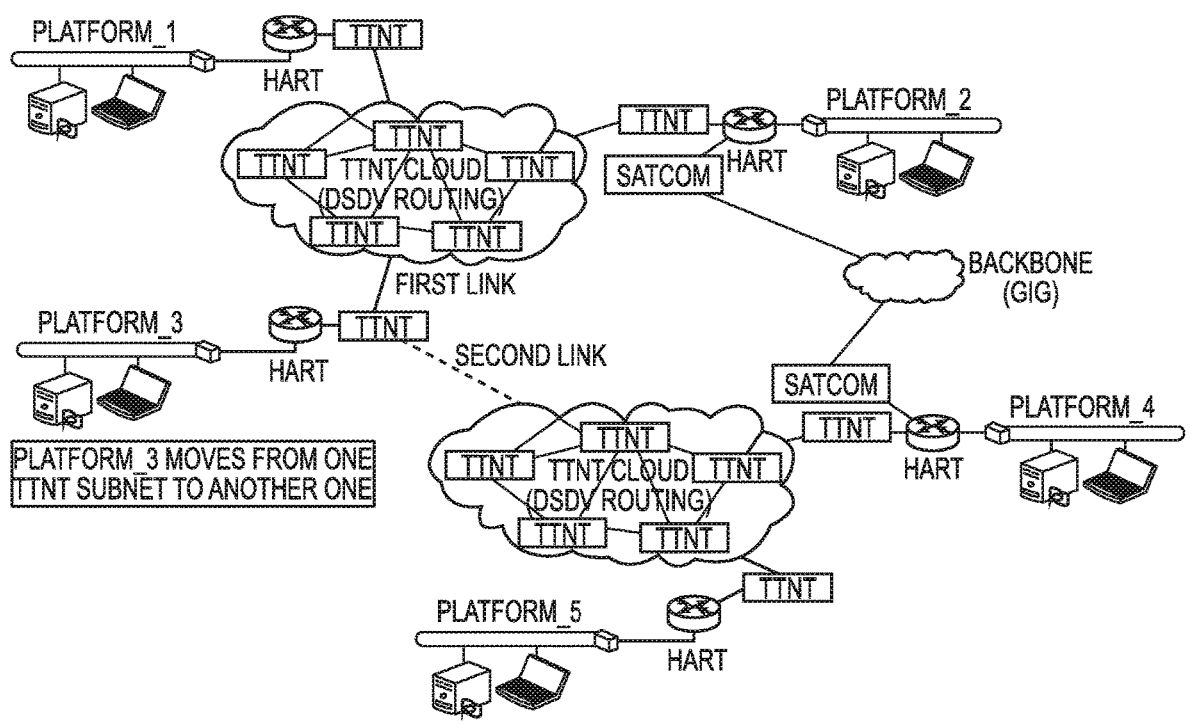
FIG. 68 is a diagram illustrating a use case of routers constructed in accordance with an embodiment of the present invention showing a node moving from one TTNT subnet to another TTNT subnet.

Use Case 2: Node Moves from One TTNT Subnet to Another TTNT Subnet
Initial Setup (FIG. 68):
All nodes start at "I'm an Interim router" (default)
Platforms 1,3 & 5 all detect no GIG, so keep: "I'm an Interim router"
a. TTNT addresses are fixed, use in name exchanges . . .
b. Start exchanging name with other HART routers to build alias tables
  i. Platform 1 alias table:
    1. To get to "Platform 3" send out local-TTNT to "TTNT-P3"
    2. To get to "Platform 2" send out local-TTNT to "TTNT-P2"
  ii. Platforms 3 and 5 follow similar table entries
Platforms 2 & 4 detect GIG and change from "interim" to: "I'm a gateway router"
a. GIG found through SatCom
  i. Platform 2 becomes TTNT gateway for top TTNT cloud (1,2,3, others) (Figure B-21)
  ii. Platform 4 becomes TTNT gateway for bottom TTNT cloud (4,5, others) (FIG. 68)
b. Set Default route entry to:
  i. To get to "GIG/Default" send out local-SatCom to "remote-SatCom-Hub"
c. TTNT addresses are fixed, use in name exchanges (include "I'm default router")
d. Start exchanging name with other HART routers to build alias tables
  i. Platform 1 alias table becomes:
    1. To get to "Platform 3" send out local-TTNT to "TTNT-P3"
    2. To get to "Platform 2" send out local-TTNT to "TTNT-P2"
    3. To get to "GIG/Default" send out local-TTNT to "TTNT-P2"
  ii. Platforms 3 and 5 follow similar table entries
  iii. Platform 2 alias table:
    1. To get to "Platform 3" send out local-TTNT to "TTNT-P3"
    2. To get to "Platform 1" send out local-TTNT to "TTNT-P1"
    3. To get to "GIG/Default" send out local-SatCom to "remove-SatCom-Hub"
  iv. Platforms 4 follows similar table entries
  v. HART gateways exchange alias tables
    1. Platform 2 alias table adds:
      a. To get to "Platform 4" send out local-SatCom to "Satcom-P4"
      b. To get to "Platform 5" send out local-SatCom to "Satcom-P4"
    2. Platform 4 alias table adds:
      a. To get to "Platform 1" send out local-SatCom to "Satcom-P2"
      b. To get to "Platform 2" send out local-SatCom to "Satcom-P2"
      c. To get to "Platform 3" send out local-SatCom to "Satcom-P2"

Figure 69:
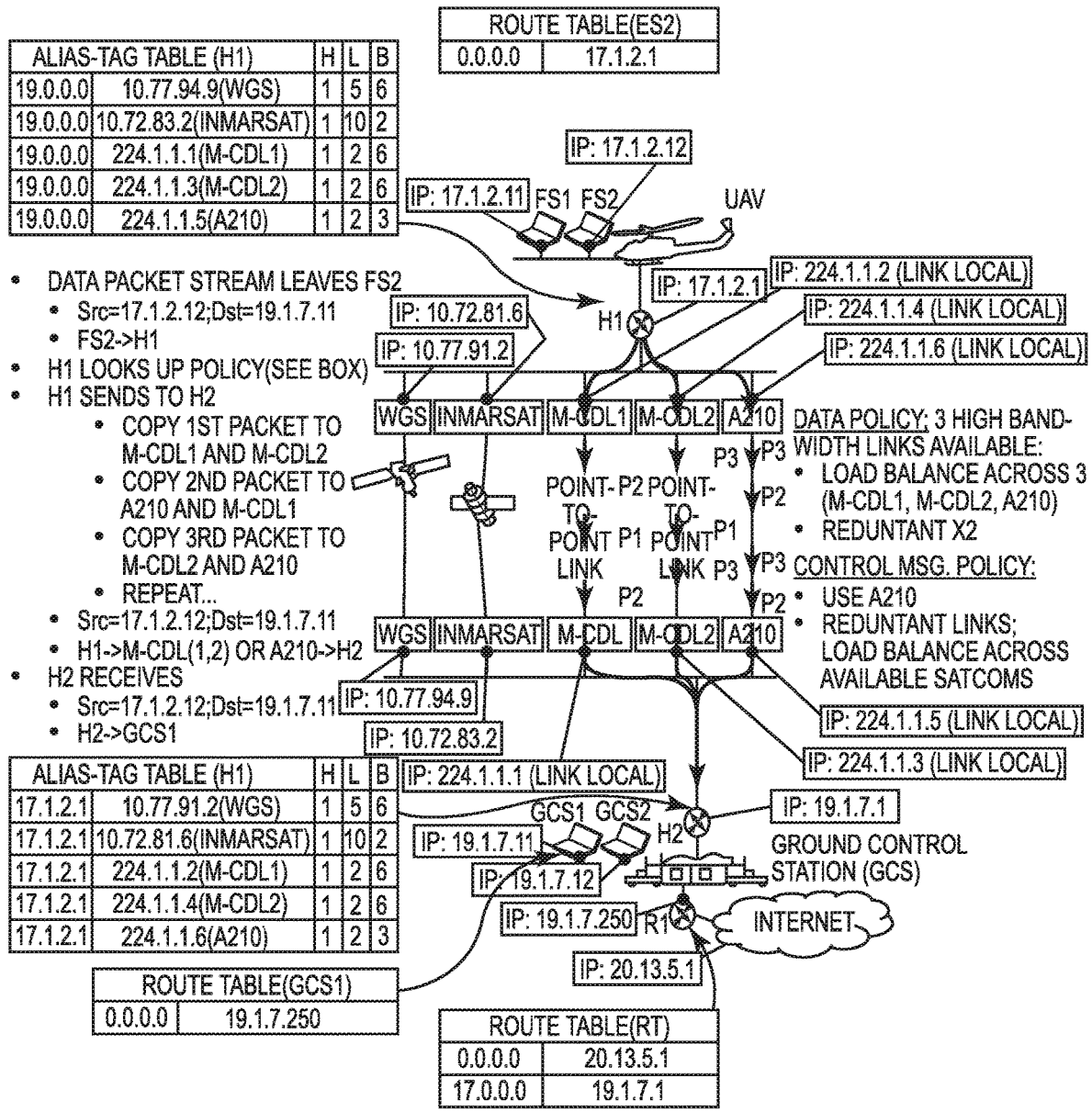
FIG. 69 is a diagram illustrating a use case of routers constructed in accordance with an embodiment of the present invention showing routing using replication and balancing.

Route a Packet from Platform 1 to Platform 3 (FIG. 68):
Packet leaves P1: Src=P1; Dst=P3; Data
a. Send to P1-HART
@P1-HART
a. Table lookup, P3 goes thru TTNT to address TTNT-P3
b. Change packet: Src=P1; Dst=TTNT-P3; DstSv=P3; Data—swaps Dst to DstSv and sets next hop to TTNT-P3
c. Goes out TTNT to TTNT-P3
TTNT-P3 forwards up to local Router (P3-HART)
@P3-HART: Src=P1; Dst=P3; Data—swaps DstSv back to Dst, forwards to P3
@P3: Src=P1; Dst=P3; Data Route a Packet from Platform 1 to Platform 5 (FIG. 68):
Packet leaves P1: Src=P1; Dst=P3; Data
a. Send to P1-HART
@P1-HART
a. Table lookup, P5—not found, send to default
b. Default goes thru TTNT to address TTNT-P2
c. Change packet: Src=P1; Dst=TTNT-P2; DstSv=P5; Data—swaps Dst to DstSv and sets next hop to TTNT-P2
d. Goes out TTNT to TTNT-P2
TTNT-P2 forwards up to local Router (P2-HART)
@P2-HART
a. Table lookup, P5—found, send out SatCom to P4
b. Change packet: Src=P1; Dst=Satcom-P4; DstSv=P5; Data—sets Dst to next hop to P4
c. Goes out SatCom to Satcom-P4
Satcom-P4 forwards up to local Router (P4-HART)
@P4-HART
a. Table lookup, P5 goes thru TTNT to address TTNT-P5
b. Change packet: Src=P1; Dst=TTNT-P5; DstSv=P5; Data—swaps Dst to DstSv and sets next hop to TTNT-P5
c. Goes out TTNT to TTNT-P5
TTNT-P5 forwards up to local Router (P5-HART)
@P5-HART: Src=P1; Dst=P5; Data—swaps DstSv back to Dst, forwards to P3
@P5: Src=P1; Dst=P5; Data Use Case 3: Routing Data on a HART Network Using Replication and Load Balancing
Steps 1-3 (FIG. 69):
Data Packet stream leaves FS2
a. Src=17.1.2.12; Dst=19.1.7.11
b. FS2→H1
H1 looks up policy for data traffic:
a. Load balance across 3 (M-CDL1, M-CDL2, A210)
b. Redundant x2
H1 sends to H2
a. Src=17.1.2.12; Dst=19.1.7.11
  i. Copy $1^{st}$ packet to M-CDL1 and M-CDL2
  ii. Copy $2^{nd}$ packet to A210 and M-CDL1
  iii. Copy $3^{rd}$ packet to M-CDL2 and A210
  iv. Repeat . . .
a. H1→M-CDL(1,2) & A210→H2
H2 receives
a. Src=17.1.2.12; Dst=19.1.7.11
b. H2→GCS1

GCS1 receives

Link Fault while Routing Data Across the HART Network

Figure 70:
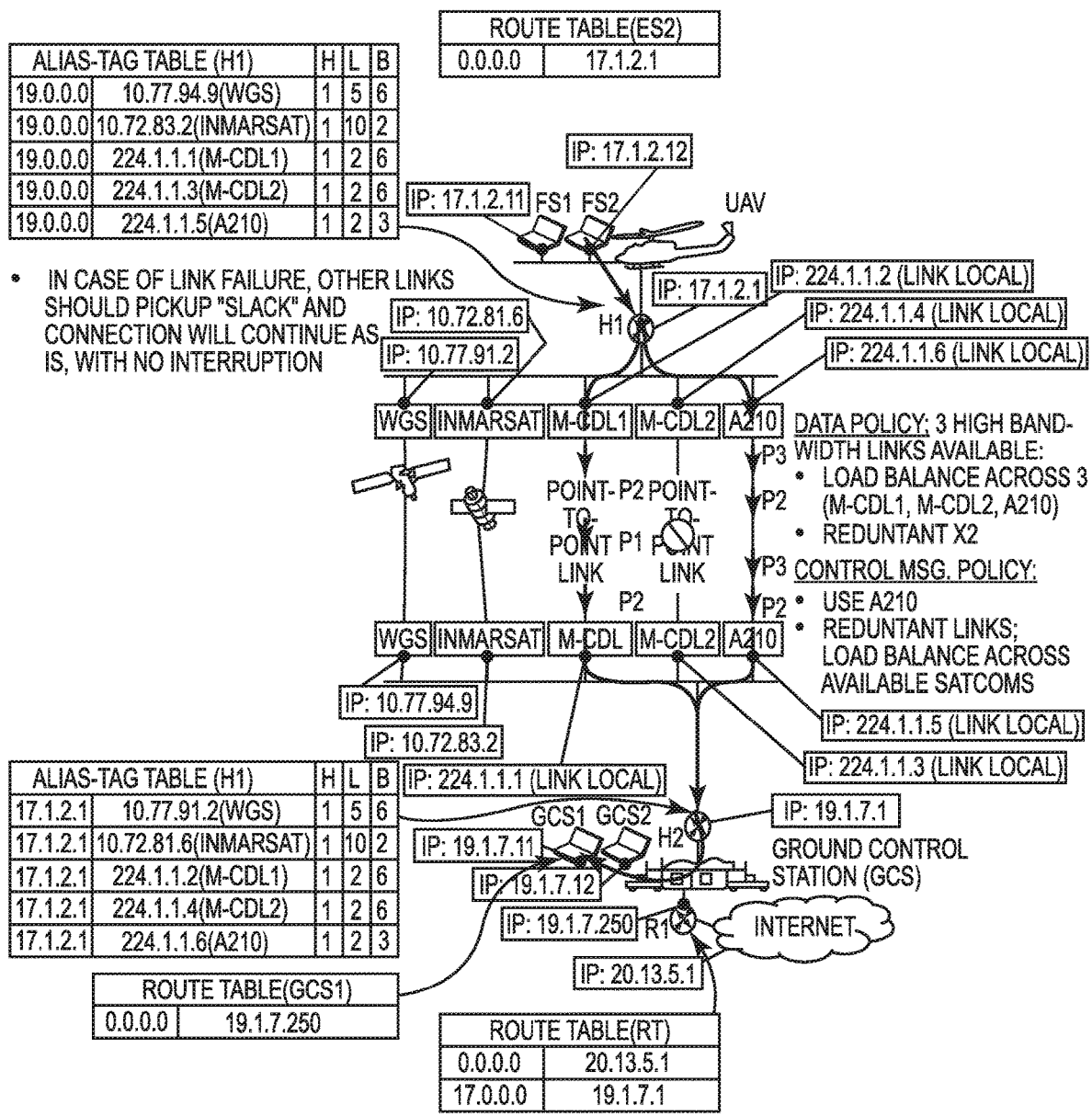
FIG. 70 is a diagram illustrating a use case of routers constructed in accordance with an embodiment of the present invention showing a link fault while routing data.

In case of link failure, other links should pick up "slack" and connection will continue as is with no interruption (FIG. 70).

Routing Control Messages Across the HART Network

Figure 71:
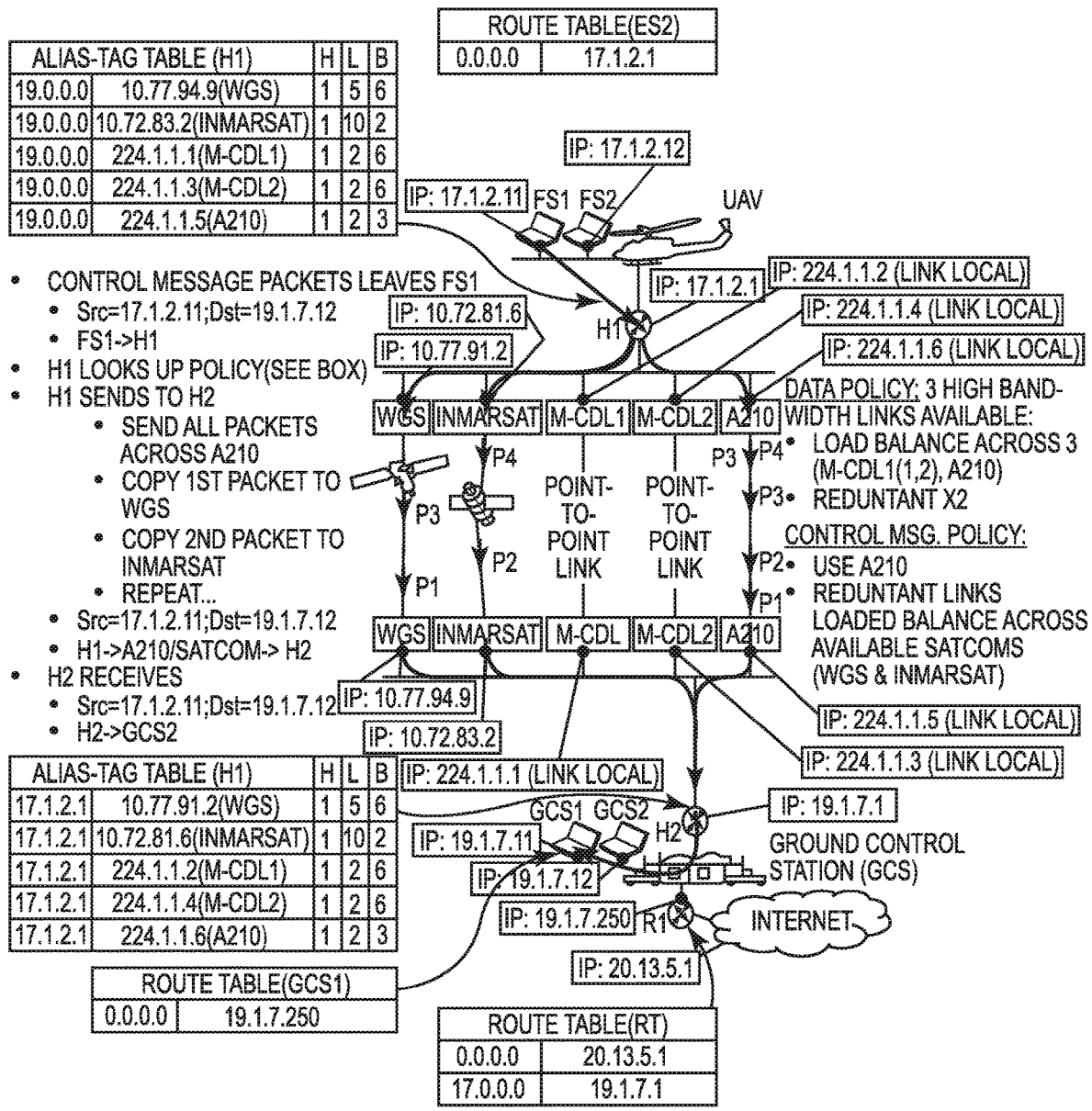
FIG. 71 is a diagram illustrating a use case of routers constructed in accordance with an embodiment of the present invention showing routing of control messages.

Steps 1-4 (FIG. 71):

Control message Packets leave FS1
a. Src=17.1.2.11; Dst=19.1.7.12
b. FS1→H1

H1 looks up policy (control message traffic):
a. Send all packets across A210
b. Replicate control packets across alternating SatCom links (WGS and Inmarsat).

H1 sends to H2
i. Src=17.1.2.11; Dst=19.1.7.12
ii. Send all packets across A210
iii. Copy $1^{st}$ packet to WGS
iv. Copy $2^{nd}$ packet to Inmarsat
v. Repeat . . .
a. H1→A210/SatCom→H2

H2 receives
a. Src=17.1.2.11; Dst=19.1.7.12
b. H2→GCS2

GCS2 receives

Link Fault while Routing Control Messages Across the HART Network

Figure 72:
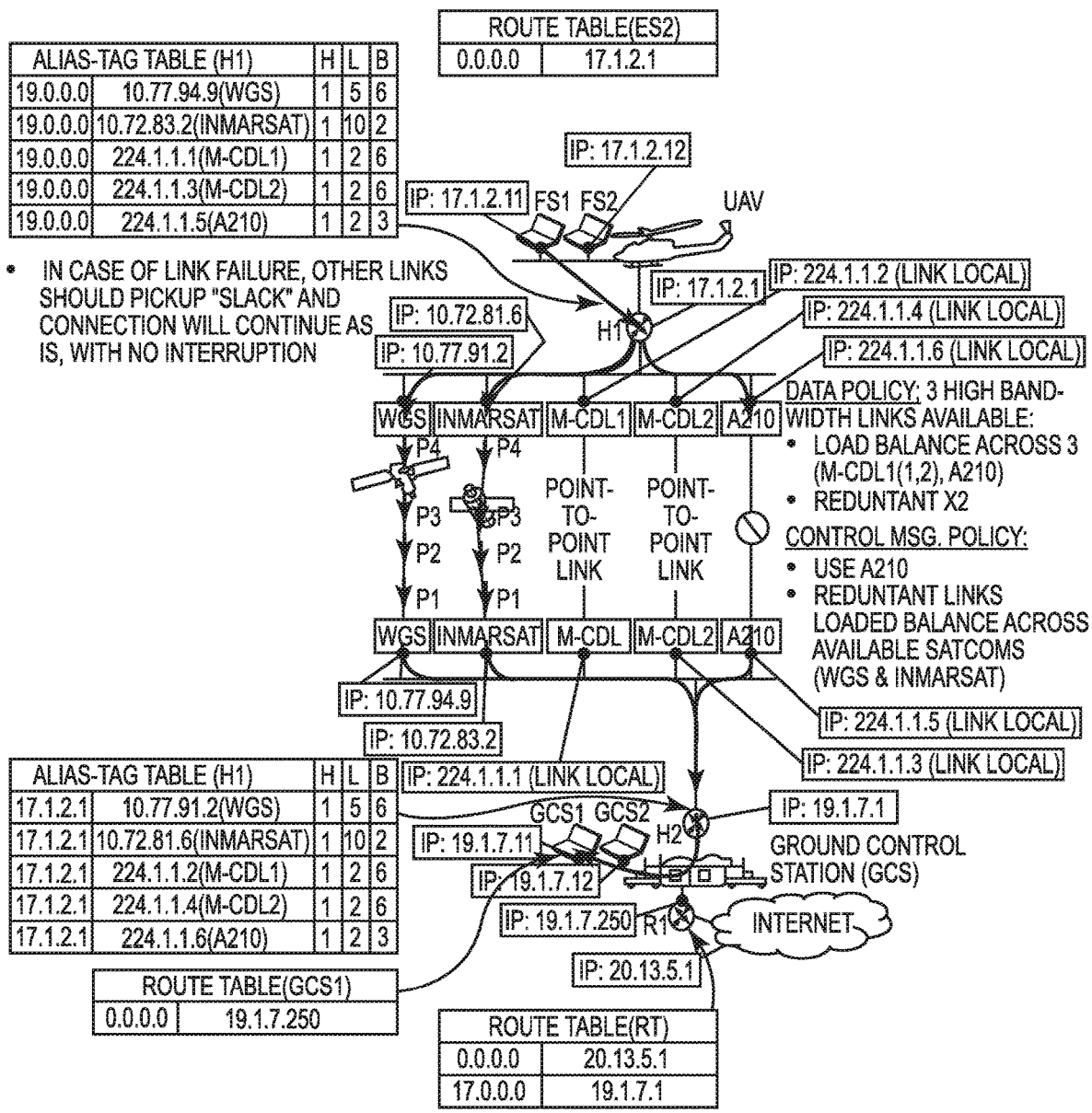
FIG. 72 is a diagram illustrating a use case of routers constructed in accordance with an embodiment of the present invention showing routing of control messages with link failure.

In case of link failure, other links should pick up "slack" and the connection will continue as is, with no interruption (FIG. 72).

Glossary

AN: Airborne Network
API: Application Programming Interface
ARC: HARTs Autonomous Router Configuration
AS(es): Autonomous System(s)—a collection of connected Internet Protocol (IP) routing devices under one common network controller
AXP: Cisco Application Extension Platform, an add-on card installed in a Cisco router
BACN: Battlefield Airborne Communications Node
BGP: Border Gateway Protocol—Protocol used to route between Autonomous Systems
BGP-MX: Border Gateway Protocol
COTS: Commercial Off-the-Shelf
CT: Ciphertext—Black side of red/black network
DCI: HARTs Device Configuration Interface
DISN: Defense Information System Network
DNS: Domain Name Service
DSCP: DiffSery Code Point
FSOC: Free Space Optics Communications
GCS: Ground Control Station
GIG: Global Information Grid
GUI: Graphical User Interface
HAIPE(s): High Assurance Internet Protocol Encryptor—a Type 1 encryption device that complies with the National Security Agency's HAIPE IS (High Assurance Internet Protocol Interoperability Specification).
HART: Hybrid Autonomous Router for Tactical Networks
HART-E: HART-Edge Router
HART-G: HART-Gateway Router
HART-I: HART-Interior Router
HAS-flag: HART Address Switching flag
INE: Inline Network Encryptor—broad term for HAIPE-like devices
IP: Internet Protocol
JALN: Joint Aerial Layer Network
JCAN: Joint Capability for Airborne Networking subnets
LQM: Link Quality Metric
M-CDL:Mini-CDL
Mini-CDL: Miniature Common Data Link Radio
OSPF: Open Shortest Path First (OSPF) is an adaptive routing protocol for Internet Protocol (IP) networks.
PT: Plaintext—Red side of red/black network
QNT: Quint Networking Technology (QNT) program is a Defense Advanced Research Projects Agency-led (DARPA) technology program to produce a very small and modular digital communications system for a variety of ground and airborne applications.
RIP: Routing Information Protocol (RIP) is a distance-vector routing protocol, which employs the hop count as a routing metric.
SatCom: A Satellite Communication link
SNMP: Simple Network Management Protocol
TCP/IP: Transport Control Protocol for Internet Protocol, a collection of protocols for routing data on an IP network.
TAT: HART Topology and Address Tracking
TTNT: Tactical Targeting Network Technology
TRL: Technology Readiness Level
UAV: Unmanned Aerial Vehicle
UAS: Unmanned Aircraft Systems
WNW: Wideband Networking Waveform

What is claimed is:

1. A method of routing an Internet Protocol (IP) packet from a routing device comprising:
receiving a first IP packet having a first IP header and a first IP data field, the first IP packet having a final destination corresponding to a destination device communicatively coupled to the routing device via a network route including at least two hops between the routing device and the final destination;
generating a second IP packet having a second IP header and a second IP data field, wherein the second IP data field is a copy of the first IP data field, wherein a destination IP address field in the second IP header includes an IP address of a next hop on the network route, wherein the second IP packet does not include an IP address of the final destination; and
sending the second IP packet on the network route.

2. The method of routing of claim 1, comprising:
including a flag in an options field of the second IP header, the flag indicating that the destination IP address of the second IP header includes an IP address of a next hop on the network route instead of an IP address of the final destination of the second IP packet.

3. The method of routing of claim 1, wherein the first IP header includes a destination IP address field having the IP address of the final destination of the first IP packet therein, wherein a number of bytes of the second IP header is equal to a number of bytes of the first IP header.

4. A method of routing an Internet Protocol (IP) packet from a routing device comprising:
receiving a first IP packet having a first IP header and a first IP data field, the first IP packet having a final destination corresponding to a destination device communicatively coupled to the routing device via at least one network route;
saving an association between one or more next hops of the at least one network route and a conversation of the first IP packet;
after receiving the first IP packet, receiving a second IP packet in the conversation of the first IP packet, wherein the second IP packet has a second IP header and a second IP data field, the second IP header including a destination IP address field having an IP address of the routing device therein, wherein the second IP packet does not include an IP address of the final destination of the second IP packet;

generating a third IP packet having a third IP header and a third IP data field, wherein the third IP data field is a copy of the second IP data field, wherein a destination IP address field in the third IP header includes an IP address of one of the one or more next hops on the at least one network route; and sending the third IP packet.

5. The method of claim 4, wherein saving an association between one or more next hops of the at least one network route and a conversation of the first IP packet includes:

saving an association between the final destination of the first IP packet and the conversation of the first IP packet; and maintaining a table of one or more next hops for the at least one network routes between the routing device and the final destination.

6. The method of claim 5, wherein saving an association between the final destination and the conversation includes saving data flow identifying information from the first IP packet along with an association between the final destination and the data flow identifying information.

7. The method of claim 6 comprising:

associating the second IP packet with the one or more next hops on the at least one network route by identifying which saved data flow identifying information matches data flow identifying information of the second IP packet.

8. The method of claim 6, wherein the data flow identifying information includes one or more of a value in a security parameter index of the first IP packet, a value in a differentiated services code point (DSCP) field of the first IP packet, a value in a source IP address field of the first IP packet, a value in a destination IP address field of the first IP packet, a value in a source port field of the first IP packet, a value in a destination port field of the first IP packet, and a flag in an options field of the first IP packet.

9. The method of claim 4, wherein the first IP header includes a destination IP address field having an address of the routing device therein, the first IP header including an options field having the IP address of the final destination therein.

10. The method of claim 9, comprising:

generating a fourth IP packet having a fourth IP header and a fourth IP data field, wherein the fourth IP data field is a copy of the first IP data field, wherein a destination IP address field in the fourth IP header includes an IP address of one of the one or more next hops on the at least one network route, wherein an options field of the fourth IP header includes the IP address of the final destination; and sending the fourth IP packet.

11. A method of routing an Internet Protocol (IP) packet from a routing device comprising:

receiving a first IP packet having a first IP header and a first IP data field, the first IP packet having a final destination corresponding to a destination device communicatively coupled to the routing device via at least one network route;

saving first data flow identifying information from the first IP packet along with an association between the final destination and the first data flow identifying information;

maintaining a table of one or more next hops for the at least one network route between the routing device and the final destination;

after receiving the first IP packet, receiving a second IP packet, wherein the second IP packet has a second IP header and a second IP data field, the second IP header including a destination IP address field having an IP address of the routing device therein, wherein the second IP packet does not include an IP address of the final destination of the second IP packet;

determining one or more next hops for the second IP packet by comparing second data flow identifying information from the second IP packet with at least the first data flow identifying information;

if the second data flow identifying information matches the first data flow identifying information:

generating a third IP packet having a third IP header and a third IP data field, wherein the third IP data field is a copy of the second IP data field, wherein a destination IP address field in the third IP header includes an IP address of one of the one or more next hops on the at least one network route to the final destination of the first IP packet; and sending the third IP packet.

12. The method of claim 11, wherein the first data flow identifying information includes one or more of a value in a security parameter index of the first IP packet, a value in a differentiated services code point (DSCP) field of the first IP packet, a value in a source IP address field of the first IP packet, a value in a destination IP address field of the first IP packet, a value in a source port field of the first IP packet, a value in a destination port field of the first IP packet, and a flag in an options field of the first IP packet, wherein the second data flow identifying information includes one or more of a value in a security parameter index of the second IP packet, a value in a differentiated services code point (DSCP) field of the second IP packet, a value in a source IP address field of the second IP packet, a value in a destination IP address field of the second IP packet, a value in a source port field of the second IP packet, a value in a destination port field of the second IP packet, and a flag in an options field of the second IP packet.

13. The method of claim 11, wherein the first IP header includes a destination IP address field having an IP address of the routing device therein, the first IP header including an options field having an IP address of the final destination therein.

14. The method of claim 11, comprising:

generating a fourth IP packet having a fourth IP header and a fourth IP data field, wherein the fourth IP data field is a copy of the first IP data field, wherein a destination IP address field in the fourth IP header includes an IP address of one of the one or more next hops on the at least one network route; and sending the fourth IP packet.

15. The method of claim 11, wherein the third IP header does not include an IP address of the final destination.

16. A routing module comprising:

a non-transitory processor readable medium having software stored thereon, the software, when executed by one or more processing devices, configured to:

receive a first IP packet having a first IP header and a first IP data field, the first IP packet having a final destination corresponding to a destination device communicatively coupled to the routing device via at least one network route;

save first data flow identifying information from the first IP packet along with an association between the final destination and the first data flow identifying information;

maintain a table of one or more next hops for the at least one network routes between the routing device and the final destination;

after receiving the first IP packet, receive a second IP packet, wherein the second IP packet has a second IP header and a second IP data field, the second IP header including a destination IP address field having an IP address of the routing device therein, wherein the second IP packet does not include an IP address of the final destination of the second IP packet;

determine one or more next hops for the second IP packet by comparing second data flow identifying information from the second IP packet with at least the first data flow identifying information;

if the second data flow identifying information matches the first data flow identifying information:

generate a third IP packet having a third IP header and a third IP data field, wherein the third IP data field is a copy of the second IP data field, wherein a destination IP address field in the third IP header includes an IP address of one of the one or more next hops on the at least one network route to the final destination of the first IP packet; and send the third IP packet.

17. The routing module of claim 16, wherein the first data flow identifying information includes one or more of a value in a security parameter index of the first IP packet, a value in a differentiated services code point (DSCP) field of the first IP packet, a value in a source IP address field of the first IP packet, a value in a destination IP address field of the first IP packet, a value in a source port field of the first IP packet, a value in a destination port field of the first IP packet, and a flag in an options field of the first IP packet, wherein the second data flow identifying information includes one or more of a value in a security parameter index of the second IP packet, a value in a differentiated services code point (DSCP) field of the second IP packet, a value in a source IP address field of the second IP packet, a value in a destination IP address field of the second IP packet, a value in a source port field of the second IP packet, a value in a destination port field of the second IP packet, and a flag in an options field of the second IP packet.

18. The routing module of claim 16, wherein the routing module is an add-on card for a router.

19. The routing module of claim 16, wherein the routing module is a program product.

20. The routing module of claim 16, wherein the routing module is a network appliance.

* * * * *